(12) United States Patent
Yamamoto et al.

(10) Patent No.: US 11,507,134 B2
(45) Date of Patent: Nov. 22, 2022

(54) AUDIOVISUAL DEVICE WITH TILTABLE DISPLAY

(71) Applicant: Amazon Technologies, Inc., Seattle, WA (US)

(72) Inventors: Kei Yamamoto, Cupertino, CA (US); Eric Nguyen, Santa Clara, CA (US); Paul Drucker, Escondido, CA (US); Manqi Xu, Sunnyvale, CA (US); Miyuki Matsumoto, Palo Alto, CA (US); Weston Skye, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 16/996,011

(22) Filed: Aug. 18, 2020

(65) Prior Publication Data

US 2021/0397214 A1    Dec. 23, 2021

Related U.S. Application Data

(60) Provisional application No. 63/041,891, filed on Jun. 20, 2020.

(51) Int. Cl.
*G06F 1/16* (2006.01)
*F16M 11/12* (2006.01)
(Continued)

(52) U.S. Cl.
CPC ......... *G06F 1/1605* (2013.01); *F16M 11/126* (2013.01); *F16M 11/18* (2013.01); *G06F 1/181* (2013.01); *G06F 3/167* (2013.01)

(58) Field of Classification Search
None
See application file for complete search history.

(56) References Cited

U.S. PATENT DOCUMENTS 5,604,663 A * 2/1997 Shin .................. G06F 1/1632
361/679.43
5,947,440 A * 9/1999 Cho ..................... G06F 1/1605
248/917

(Continued)

FOREIGN PATENT DOCUMENTS

EP            3336687 A1    6/2018
NO    WO 2018022764 A1    2/2018

OTHER PUBLICATIONS

International Search Report and Written Opinion for PCT App No. PCT/US21/35360, dated Aug. 19, 2021, 239 pages.

(Continued)

*Primary Examiner* — Xanthia C Cunningham
(74) *Attorney, Agent, or Firm* — Lee & Hayes, P.C.

(57) ABSTRACT

A device may include a display, a housing, a base, and a hinge operably coupling the display and the housing. The hinge may be moveable over a range of positions. One or more loudspeakers are disposed in the housing. A motor couples to the housing and is configured to rotate the housing and the display. The base is configured to remain stationary during actuation of the motor. In some instances, the device may include a camera and one or more microphones for determining a position of a user. The motor may actuate in a direction of the user to provide increase audio and/or visual experiences.

20 Claims, 26 Drawing Sheets

(51) Int. Cl.
*F16M 11/18* (2006.01)
*G06F 3/16* (2006.01)
*G06F 1/18* (2006.01)

(56) References Cited

U.S. PATENT DOCUMENTS

| | | | | |
|---|---|---|---|---|
| 6,053,410 | A * | 4/2000 | Wike, Jr | G07G 1/0018 |
| | | | | 235/462.43 |
| 6,062,478 | A * | 5/2000 | Izaguirre | G06F 1/16 |
| | | | | 235/462.43 |
| 6,168,124 | B1 * | 1/2001 | Matsuoka | F16M 11/10 |
| | | | | 248/176.1 |
| 7,567,431 | B2 * | 7/2009 | Brooks, Jr | G07B 17/00193 |
| | | | | 705/401 |
| 7,738,238 | B2 * | 6/2010 | Liu | H04N 5/64 |
| | | | | 361/679.01 |
| 8,121,329 | B2 * | 2/2012 | Groset | H04R 5/02 |
| | | | | 381/334 |
| 8,145,821 | B2 * | 3/2012 | Mead | G06F 1/1632 |
| | | | | 361/679.55 |
| 8,159,818 | B2 * | 4/2012 | Riddiford | B60R 11/0258 |
| | | | | 361/679.55 |
| 8,422,206 | B2 * | 4/2013 | Fu | F16M 13/00 |
| | | | | 361/679.01 |
| 8,681,113 | B1 * | 3/2014 | Wu | G06F 1/166 |
| | | | | 345/173 |
| 9,891,666 | B2 * | 2/2018 | Buss | H01R 13/6315 |
| 10,448,520 | B2 * | 10/2019 | Tak | H04R 1/02 |
| 10,551,873 | B2 * | 2/2020 | Han | G06F 1/1632 |
| 10,739,822 | B2 * | 8/2020 | Choi | G06F 1/1632 |
| 2005/0270732 | A1 * | 12/2005 | Titzler | G06F 1/16 |
| | | | | 248/920 |
| 2008/0093528 | A1 * | 4/2008 | Tsai | F16M 11/22 |
| | | | | 361/679.06 |
| 2008/0175427 | A1 * | 7/2008 | Chen | H04R 1/025 |
| | | | | 381/387 |
| 2008/0266783 | A1 * | 10/2008 | Mills | G06F 1/1632 |
| | | | | 361/679.44 |
| 2011/0170256 | A1 * | 7/2011 | Lee | F16M 11/18 |
| | | | | 361/679.44 |
| 2011/0303742 | A1 * | 12/2011 | Huang | G06K 7/10881 |
| | | | | 235/375 |
| 2012/0014056 | A1 * | 1/2012 | Chen | G06F 1/1632 |
| | | | | 361/679.41 |
| 2014/0268542 | A1 * | 9/2014 | Moon | H01R 13/44 |
| | | | | 361/679.41 |
| 2016/0050494 | A1 * | 2/2016 | McCorkle | G10H 1/0083 |
| | | | | 381/334 |
| 2016/0147268 | A1 * | 5/2016 | Wang | G06F 1/187 |
| | | | | 361/679.21 |
| 2017/0278477 | A1 | 9/2017 | Jeong et al. | |
| 2017/0344064 | A1 * | 11/2017 | Kim | G06F 1/181 |
| 2018/0098439 | A1 * | 4/2018 | Tak | H04R 1/24 |
| 2018/0154514 | A1 * | 6/2018 | Angle | G05D 1/021 |
| 2018/0174584 | A1 * | 6/2018 | Chih | G10L 15/22 |
| 2019/0213550 | A1 * | 7/2019 | Karadayi | H04N 7/142 |
| 2019/0278954 | A1 * | 9/2019 | Eun | G06F 1/16 |
| 2019/0369593 | A1 * | 12/2019 | Murakami | G06F 3/165 |
| 2019/0381671 | A1 * | 12/2019 | Yeo | B25J 11/0005 |
| 2020/0103939 | A1 * | 4/2020 | Hsu | H04R 5/027 |
| 2020/0112786 | A1 * | 4/2020 | Castro | G10L 15/28 |
| 2021/0303041 | A1 * | 9/2021 | Minnehan | H04R 1/025 |

OTHER PUBLICATIONS

Eadicicco, Lisa; "This New Computer Wants to be the Ultimate AI Assistant for the Home," Jan. 5, 2017, Time, downloaded from https://time.com/4623002/baidu-home-robot-assistant-2017/?utm_source=email&utm_medium=email&utm_campaign=email-share-article&utm-term=tech_gadgets; 3 pages.

* cited by examiner

AUDIOVISUAL DEVICE WITH TILTABLE DISPLAY

CROSS REFERENCE TO RELATED APPLICATIONS

This application claims priority to U.S. Provisional Application No. 63/041,891, filed Jun. 20, 2020, entitled "Audiovisual Electronic Devices," the entirety of which is herein incorporated by reference.

BACKGROUND

Homes are becoming more connected with the proliferation of computing devices, such as desktop and laptop computers, tablets, entertainment systems, and portable communication devices. As these computing devices continue to evolve, many different ways have been introduced to allow users to interact with the computing devices, such as through touch, gestures, and speech. With speech interaction, the computing devices may be operated essentially "hands free."

To implement speech interaction, the computing devices are commonly equipped with a microphone to receive voice input from a user and a loudspeaker to emit audible responses to the user. However, existing computing devices often sacrifice sound characteristics for a compact form factor.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
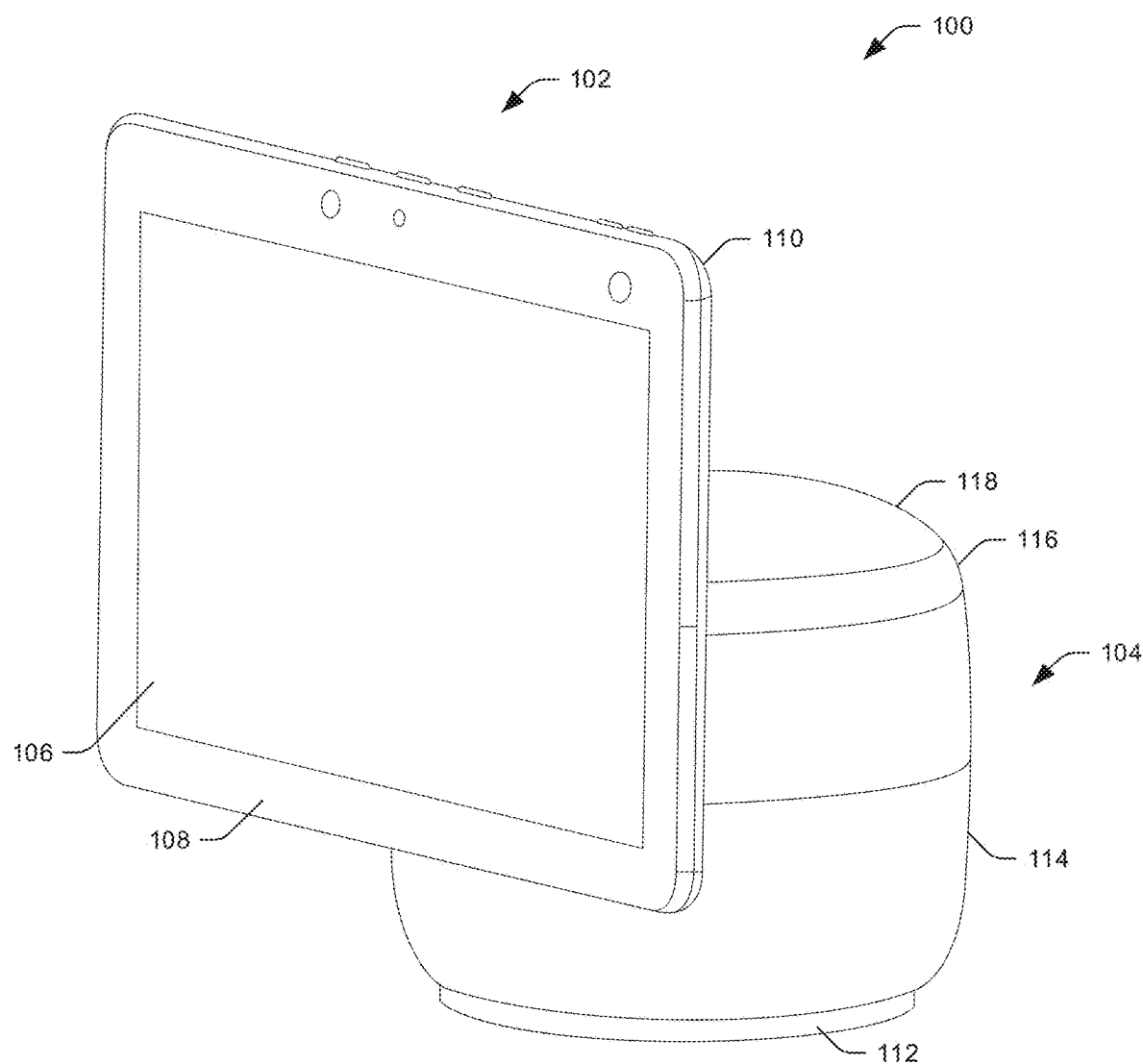
FIG. 1 illustrates a perspective view of example electronic device, according to an embodiment of the present disclosure. As shown, the electronic device may include a display for presenting content to users. The display, or other portions of the electronic device, may be configured to swivel to increase audio and/or visual presentation.
Figure 1:
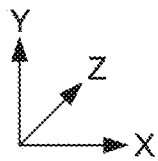

This patent application describes an electronic device with improved audio and visual characteristics. In some instances, the electronic device according to this application may include a display that presents content. The display may hingedly couple to a housing to tilt at varying degrees and provide a range of viewing angles. Additionally, the electronic device may include a motor that rotates the display. One or more loudspeakers may reside within the housing and are arranged to output sound in different directions relative to the electronic device. The one or more loudspeakers may rotate during a rotation of the display. In some instances, the electronic device may be configured determine a position of a user within an environment to reposition the display and the loudspeakers toward the user. The tilting and/or rotational movement of the display may provide new forms of audiovisual interaction and increase user experiences.

In some instances, the electronic device may include separate sub-assemblies that when assembled, form the electronic device. For example, the electronic device may include a display sub-assembly and a housing sub-assembly. The display sub-assembly and the housing sub-assembly may operably couple to one another via a hinge or other pivotable member. The hinge is capable of being pivoted to tilt the display sub-assembly at varying degrees.

In some instances, the display sub-assembly may include a display, a camera (or imaging device), microphones, and one or more buttons. The display may present content to the user, such as video and/or image content, and in some instances, may be touch sensitive and capable sensing touch input from the user. The camera may capture images within an environment in which the electronic device resides. In some instances, a shutter or other mechanism may be slid over the camera to obstruct the camera and/or provide privacy.

The display may include an articulated display that is moveable over a range of vertical positions, such as between zero and forty degrees. The display may be tilted at varying degrees depending on user preferences. In some instances, a user may grasp the display to tilt the display at varying degrees or one or more motors may the display.

The microphones, meanwhile, may capture user speech, user commands, and so forth from the user. In some instances, the microphones may be oriented in patterns or configurations on the electronic device and corresponding audio signals generated by the microphones may be used to determine a direction of speech input. For example, a first microphone may be oriented towards a front of the display, a second microphone and/or a third microphone may be oriented towards a top of the display (or electronic device), and a fourth microphone may be oriented towards a back of the display. In some instances, the four microphones may be arranged in a diamond shaped pattern for capturing user speech in different directions. This pattern may be helpful in discerning a direction of speech input. Speech processing techniques, such as beamforming, time of arrival (ToA), etc. may be used to determine the direction of speech input and determine a location of the user within the environment.

The one or more buttons may control an operation of the electronic device. The buttons may be located at the top of the electronic device, such as on the top of the display, and may include to a power button, volume buttons, sync buttons, or any other type of button or control. The buttons may be mechanical (e.g., having physically movable components) and/or electronic (e.g., capacitive sensors, optical sensors, resistive sensors, or the like).

In some instances, the housing sub-assembly may include a housing, one or more loudspeakers, and a motor. The housing may be cylindrically shaped and may provide a platform to which components of the electronic device couple, or within which components reside. For example, the one or more loudspeakers may couple to and/or be disposed within the housing. In some instances, the electronic device may include three loudspeakers. A first loudspeaker may be arranged to emit sound towards a top of the housing (or the electronic device) and may include a subwoofer loudspeaker. In some instances, the first loudspeaker may be offset from a central longitudinal axis of the electronic device to counterbalance a weight of the display, which may couple to a front of the housing. The first loudspeaker may be disposed closer to a back of the electronic device to counteract a weight of the display and prevent the electronic device tipping over.

A second loudspeaker and a third loudspeaker may be oriented around the first loudspeaker and may radially emit sound away from the electronic device. The second loudspeaker and/or the third loudspeaker may include tweeter loudspeakers. In some instances, the second loudspeaker and/or the third loudspeaker may be oriented downward towards a surface on which the electronic device rests (or downward from a top of the housing and/or the electronic device). Additionally, or alternatively, the second loudspeaker and/or the third loudspeaker may be oriented outward, away from the display. The downward and/or outward orientation of the second loudspeaker and/or the third loudspeaker may limit or prevent sound being projected into a back or rear surface of the display. Avoiding the display in this manner may allow sound to emit outward from the electronic device. In some instances, the placement of the loudspeakers on or about the electronic device, as well as their respective type, may provide a stereo or surround-sound effect when audio is output from the loudspeakers.

The motor may provide the housing, the display, or other portions of the electronic device with rotational movement. In some instances, the motor may include a brushless direct current (DC) motor having a rotational portion and a stationary portion. The housing may couple to the rotational portion such that the housing rotates with the rotational portion when the motor is powered. The base may couple to the stationary portion and remain stationary as the motor rotates. This permits the base to remain secure on a surface which the electronic device resides.

In some instances, the motor may be configured to rotate substantially 360 degrees or substantially 180 degrees in both clockwise and counterclockwise directions relative to a zero point (or reference point). In some instances, the motor may be configured to rotate 352 degrees, and in such instances, the motor may rotate 176 degrees to either side of a reference point or in clockwise and counterclockwise directions. In some instances, as the electronic device may have a limited degree of rotational movement and may not be configured to rotate 360 degrees, the electronic device may include one or more sensors that sense a position of the motor. The sensor may include an optical sensor that measures an angular position of the motor. An optical index, for example, may mount to the stationary portion of the motor and the sensor may mount to the rotational portion of the motor. As the motor rotates the sensor may image the optical index to determine a position of the motor (or housing). The position of the motor may be used to indicate a remaining degree of rotation in clockwise and/or counterclockwise directions. In some instances, encoders and/or hull effect sensors may be additionally or alternatively used to determine the position of the motor and/or the housing.

The motor may also include a passageway, chimney, or channel, extending through the motor to provide a space in which wires may route between the housing and the base. For example, the base may include a power PCB that receives power from a wall outlet or plug in and which couples to one or more PCBs within the housing. As the housing is located on an opposing side of the motor (or coupled to the rotational portion) the wires may be wrapped or configured to resist torsional or rotational movement. For example, the wires may include helical wires, the wires may include clocksprings, flexible printed circuit (FPCs), and/or the wires may be overmolded for increased strength. In some instances, slip rings may be used as well and may replace routing of some of the wires. In some instances, the stationary portion of the motor may include the passageway and the rotational portion may be configured to rotate around the stationary portion (or the passageway). One or more bushings and/or bearings may be used for assisting in the rotational movement. Additionally, in some instances, springs may be disposed on opposing sides of the bearings to provide stiffness, stability, or prevent translation in one or more degrees.

In some instances, the electronic device may track the user as the user moves throughout the environment. For example, as the user moves about the environment, the motor may rotate the housing such that the display and the loudspeakers are oriented (e.g., centered) on the user. In some instances, the audio captured by the microphones may be analyzed to determine the direction of the user. Additionally, or alternatively, the camera may capture images and the image data may be analyzed to determine the location of the user. As the user moves about the environment the housing and the display may rotate to provide the user with improved audio characteristics.

As the electronic device is configured to move, the electronic device may include biasing members (e.g., springs) to reduce vibrations being transferred throughout the electronic device. These vibrations may impact a quality of images obtained. The hinge, for example, may be rigidly held in place to prevent vibrations being imparted to the camera. Additionally, covers of the electronic device may be securely held in place to prevent rattling. The biasing members may also prevent against the loudspeakers imparting vibrations to other portions of the electronic device.

In some instances, a chassis or grill may surround at least a portion of the housing, such as sides of the housing. The grill may conceal components of the electronic device, such as the loudspeakers, the motor, wires, PCBs, and so forth. Additionally, a top cover may be disposed over the first loudspeaker and couple to a top of the housing. The grill and the top cover may provide the electronic device with a smooth and aesthetic appearance. The grill and/or the top cover, in some instances, may include a fabric material to allow sound generated by the loudspeakers to pass therethrough. Additionally, in some instances, the grill and/or the top cover may be interchangeable to give the electronic device varying appearances.

Introduced above, the electronic device may be configured to support speech interactions with one or more users and respond to user requests. For instance, a user may verbally request the electronic device perform a particular task, such as to play music. The one or more microphones may capture sound associated with the user speech. In some examples, the user may indicate a request by prefacing the request with a predefined keyword, such as a wake word or trigger expression. The electronic device may capture user speech and may process the user speech to identify a command. Speech processing, such as automatic speech recognition (ASR), natural language understanding (NLU), and speech synthesis may also be performed. However, in some instances, one or more remotely coupled computing device may perform the speech processing and transmit a response (or data) back to the electronic device. Upon identifying the command, the electronic device may output a response, cause actions to be performed (e.g., playing music or ordering movie tickets), or elicit feedback from the user. In some instances, content identified in this manner may be played through the display and/or the loudspeakers of the electronic device. However, the electronic device may also be configured to provide the content to peripheral devices such as Bluetooth loudspeakers or other peripherals that are nearby or in wired or wireless communication with the electronic device.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates a perspective view of an electronic device 100. In some instances, the electronic device 100 may include a display sub-assembly 102 and a housing sub-assembly 104 that are operably coupled together via one or more hinges (discussed herein).

The display sub-assembly 102 may include a display 106 configured to present content (e.g., images, video, etc.). The display 106 may include any suitable display, such as a LCD, plasma, organic light emitting diode (OLED), etc. The display 106, in some instances, may include a ten inch display and may be rectangular shaped. Additionally, the display 106 may be touch sensitive and capable of receiving touch input from users (e.g., pressing, touching, swiping, etc.).

The display 106 may include a bevel 108 disposed around a perimeter of the display 106. Behind the bevel 108 (Z-direction) may be one or more cameras, microphones, infrared (IR) sensors, and so forth. The camera, for example, may be configured to capture images and/or video within an environment in which the electronic device 100 resides. In some instances, the camera may include a 13 megapixel (MP) camera having a 110 degree wide field of view (horizontal field of view). The camera may also be capable of digitally panning and zooming. The microphones may capture speech input from users within the environment (e.g., voice command). A rear cover 110 may conceal a back of the display 106 and/or other components of the display sub-assembly 102.

The display 106, or the display sub-assembly 102, is shown being rectangular shaped. In some instances, a long edge of the display 106 may be disposed in a same direction, or parallel to, a surface (e.g., center) on which the electronic device 100 resides. Alternatively, in some instances, the display 106 may include other shapes, such as circular, square, ovular, and so forth.

The housing sub-assembly 104 includes a base 112 that provides a stand on which the electronic device 100 sits or rests. A housing, discussed herein, may reside beneath a grill 114, a band 116, and a top cover 118. The grill 114, the band 116, and/or the top cover 118 may couple to the housing and provide the electronic device 100 with an aesthetic appearance. In this sense, the grill 114, the band 116, and the top cover 118 may conceal the housing, or stated alternatively, the housing may reside beneath or be covered by the grill 114, the band 116, and the top cover 118. However, as discussed herein, the electronic device 100 may include one or more loudspeakers and the grill 114 and/or the top cover 118 include materials (e.g., loudspeaker fabric) that allows sound generated by the electronic device 100 to pass through the grill 114 and/or the top cover 118. For example, a loudspeaker may reside beneath the top cover 118 (Y-direction).

Collectively, the grill 114, the band 116, and/or the top cover 118 may form an exterior surface 120 of the electronic device 100, or an exterior surface of the housing sub-assembly 104. As shown in FIG. 1, the exterior surface may be cylindrical or substantially cylindrical-shaped. However, in some instances, the exterior surface may be shaped differently, such as being hexagonal, spherical, rectangular, and/or any combination thereof. The exterior surface may be a smooth, uniform, or continuous surface to give the electronic device 100 an aesthetic appearance.

Noted above, the display sub-assembly 102 and the housing sub-assembly 104 may be operably coupled together to permit the electronic device 100 to move, pan, rotate, and/or swivel about one or more axes. For example, the display 106 may tilt about the X-axis to provide varying viewing angles. In some instances, tilting of the display 106 may come by way of a hinge that connects the display sub-assembly 102 and the housing sub-assembly 104. In some instances, a user may manually grasp the display 106 and force the display 106 to tilt upward and downward, about the X-axis. This movement may accommodate viewing angles of the user and provide improved experiences when viewing content on the display 106. In some instances, the display 106 may be tilted between zero and forty degrees in the vertical direction.

Additionally, the electronic device 100 may be configured to rotate about the Y-axis. For example, the electronic device 100 may include one or more motors that rotate the display 106. The base 112, however, may remain stationary on the surface in which the electronic device 100 resides. In such instances, portions of the housing sub-assembly 104, such as the housing, may couple (e.g., mount to) the motor and correspondingly, when the motor rotates the housing may rotate as well. Given the coupling of the display 106 (or the display sub-assembly 102) to the housing, the display 106 may rotate as well. In some instances, the display 106 may rotate around the Y-axis substantially 360 degrees. In some instances, the display 106 may rotate around the Y-axis by less than 360 degrees, such as 352 degrees. Additionally, or alternatively, the electronic device 100 may have a hard stop for prevent over rotation and/or for operating within the rotational degrees.

In some instances, the motor may rotate the display 106 based on a location of the user within the environment. For example, as the user maneuvers about the environment, the electronic device 100 may determine the position of the user and locate the display according to, or based on, a position of the user. In some instances, the position of the user may be determined via the camera (e.g., image analysis) and/or using beamforming or ToA techniques. For example, as user speech is received via microphones, a direction of the sound may be determined and the motor may rotate the display 106 towards the sound. Both the tilting and/or rotational movement of the display 106, may provide new forms of audio-visual interaction with the user. For example, the loudspeakers may be oriented towards the user to provide better audio characteristics for sound being outputted.

In some instances, the electronic device 100 may include a light indicator that indicates an operational status. For example, the light indicator may be illuminated statically (e.g., one or more of the light sources illuminated continuously) or dynamically (e.g., one or more of the light sources flashing simultaneously, illuminating one or more of the light sources sequentially, alternating which light sources are illuminated, etc.). Additionally, the light indicator may take a wide range of visual appearances by varying which light sources are on/off, the respective colors of the light sources, and the timing of activating the light sources. The light indicator may be located along a top of the display 106, edges of the display 106, etc.

The electronic device 100, or components thereof, may be manufactured from a plurality of materials including plastic, metal, components, and/or combinations thereof. Additionally, the electronic device 100, or components thereof, may be manufactured using a plurality of manufacturing processes, such as injection molding, cast molding, blow molding, stamping, and/or a combination thereof.

Figure 2:
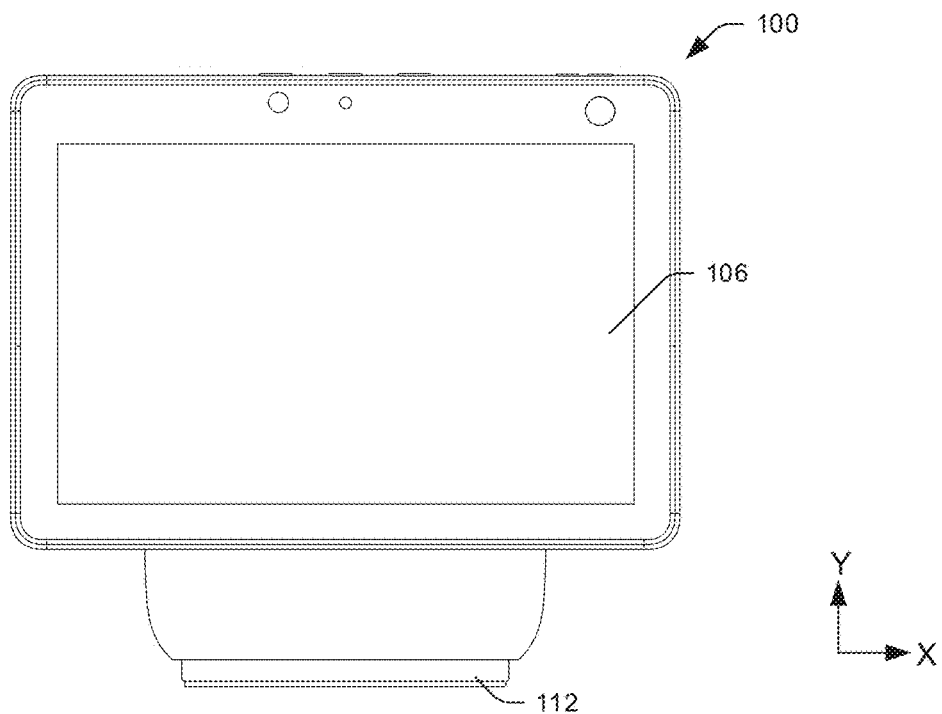
FIG. 2 illustrates a front view of the electronic device of FIG. 1, according to an embodiment of the present disclosure.

FIG. 2 illustrates a front view of the electronic device 100. Discussed above, the display 106 may include a generally rectangular shape. Additionally, FIG. 2 illustrates that the display 106 may reside above (Y-direction) the base 112 to vertically dispose the display 106 above a surface of the environment on which the electronic device 100 resides.

Figure 3:
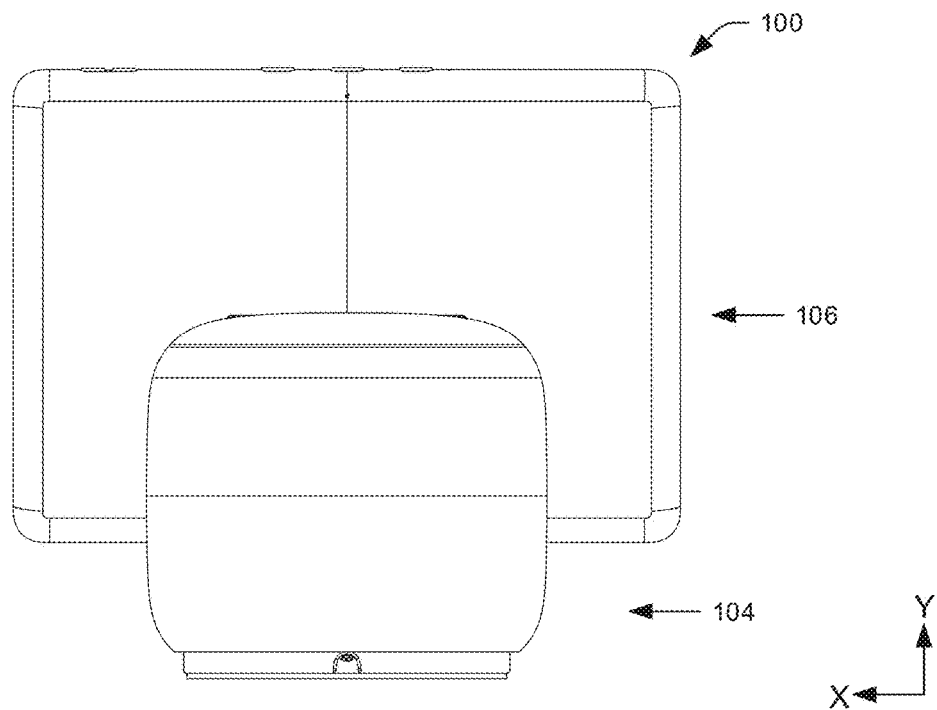
FIG. 3 illustrates a back view of the electronic device of FIG. 1, according to an embodiment of the present disclosure.

FIG. 3 illustrates a back view of the electronic device 100, showing the generally cylindrical shape of the housing sub-assembly 104. In some instances, the display 106 may couple to the housing sub-assembly 104 along a central longitudinal axis of the housing sub-assembly 104 to center the display 106 and the housing (X-direction). The housing sub-assembly 104 may also couple to a center of the display sub-assembly 102 along one or more additional planes (Y-plane).

Figure 4:
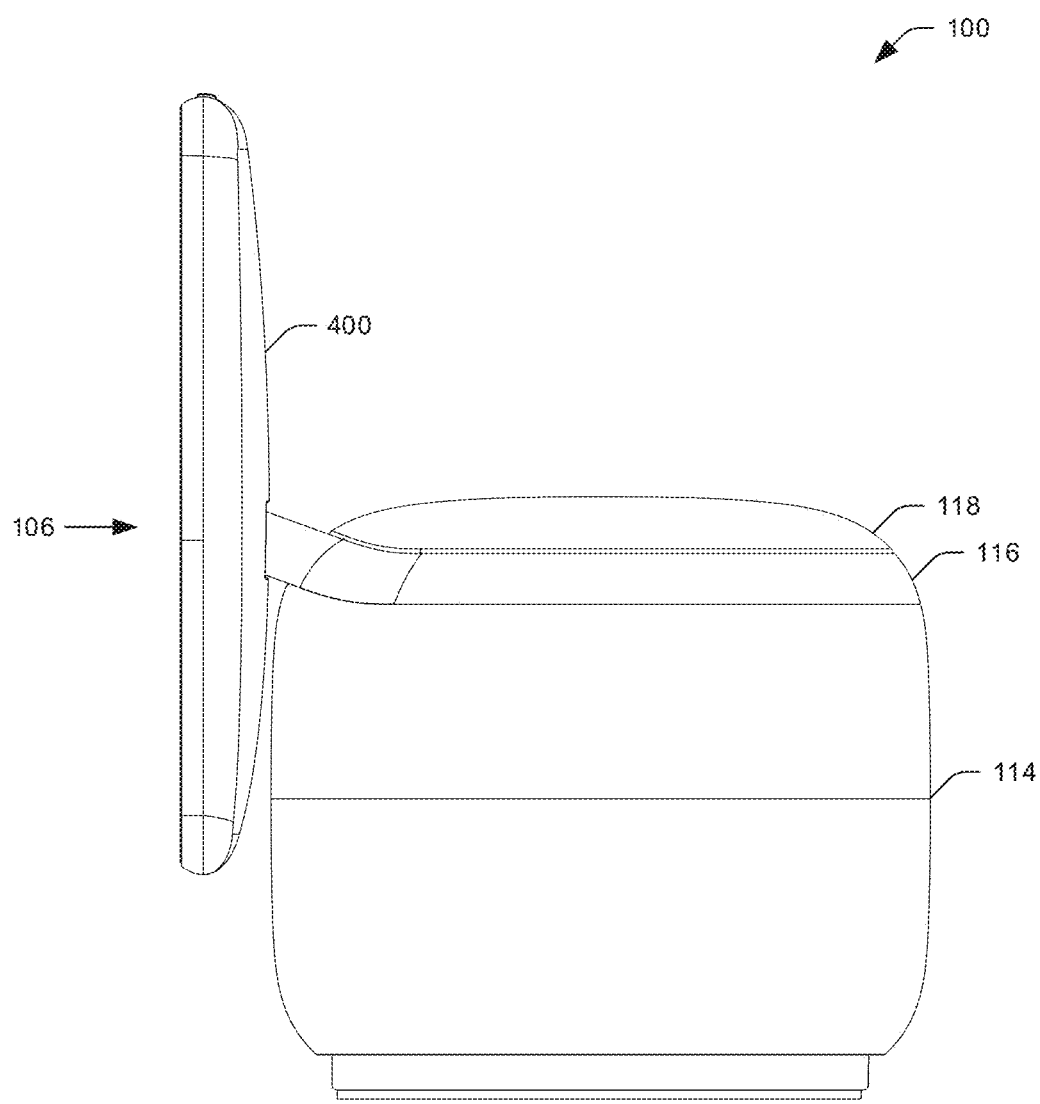
FIG. 4 illustrates a side view of the electronic device of FIG. 1, according to an embodiment of the present disclosure.

FIG. 4 illustrates a side view of the electronic device 100. As shown, the electronic device 100 includes the grill 114, the band 116, and the top cover 118. The band 116 is interposed (Y-direction) between the grill 114 and the top cover 118 and includes a generally circular shape that wraps around an exterior of the housing sub-assembly 104. The band 116, in some instances, may include a flange 400 that extends in a direction of the display 106 and which conceals the hinge of the electronic device 100. That is, the hinge that couples the display sub-assembly 102 and the housing sub-assembly 104 may at least be partially disposed within (e.g., beneath, under, etc.) the band 116.

Figure 5:
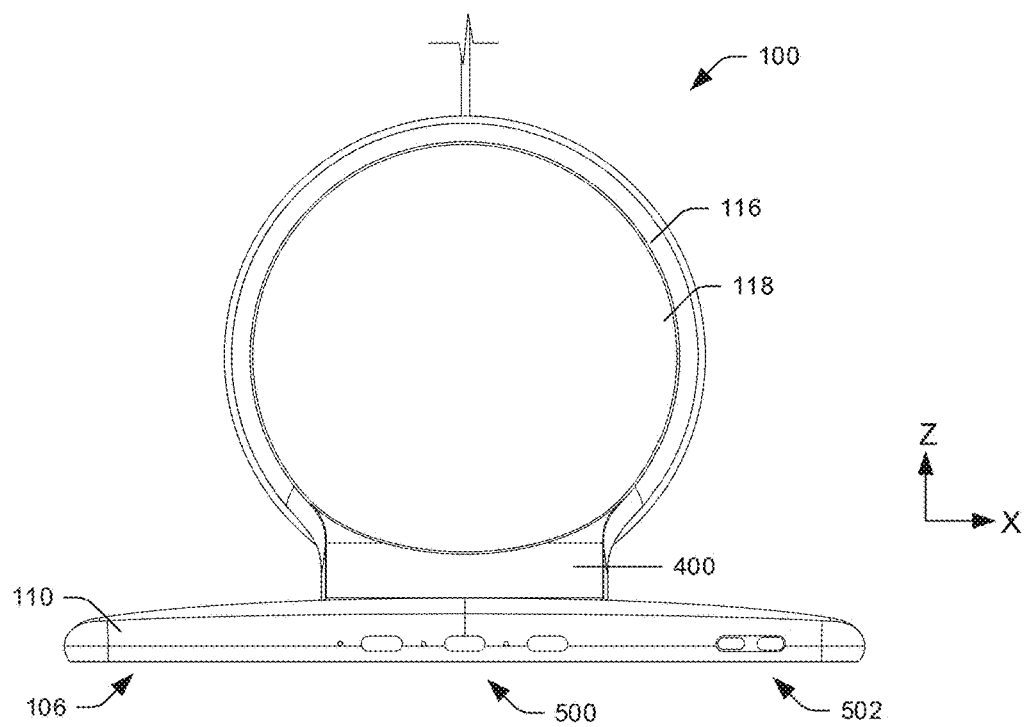
FIG. 5 illustrates a top view of the electronic device of FIG. 1, according to an embodiment of the present disclosure.

FIG. 5 illustrates a top view of the electronic device 100, showing buttons 500 of the display sub-assembly 102, a shutter 502 of the display sub-assembly 102, the band 116, and the top cover 118.

The buttons 500 may be arranged or aligned along a top of the rear cover 110 and may be spaced apart from one another. In some instances, the buttons 500 may be mechanical buttons or electrical buttons (e.g., capacitive switch, etc.). In some instances, the buttons 500 may have symbols that visually indicate their associated function. While the electronic device 100 is shown including a certain number of buttons 500 (e.g., three), the electronic device 100 may include more than or less than three buttons 500. Additionally, or alternatively, the buttons 500 may be located elsewhere on the electronic device 100, such as through the top cover 118, a front of the display 106 (or the rear cover 110), etc.

The shutter 502 is shown being disposed proximate to one side along the top of the electronic device 100, or to a side of the rear cover 110. In some instances, the shutter 502 may include a switch, handle, or knob that is moveable between a first position and a second position within a channel (e.g., in the X-direction). The knob may travel within the channel between the first position and the second position. In the first position, the knob may be extended to a left-most position, for example, and permit images to be captured by the camera of the electronic device 100. Alternatively, in the second position, the knob may be extended to a right-most position to restrict the camera capturing images. In the second position, the shutter 502 may be disposed within a path or field of view of the camera. For example, the shutter 502 may comprise a plate, screen, or cover that physically obstructs the camera capturing images within the environment. Additionally, or alternatively, when the knob is extended to the second position, a switch of the electronic device 100 may be activated to turn off the camera or otherwise prevent the camera imaging the environment.

The band 116 is shown surrounding or encircling at least part of a housing of the electronic device 100. The band 116 further includes the flange 400 that extends towards the display 106. The flange 400 may, in some instances, conceal the hinge of the electronic device 100. Additionally, as introduced above and as discussed below, the flange 400 (and the hinge) may be of sufficient length (Z-direction) to dispose the display 106 away from the housing sub-assembly 104 to permit the display 106 to tilt at varying angles. That is, to permit the display 106 to tilt the hinge may dispose the display 106 away from the housing. As such, the flange 400 of the band 116 may include a sufficient length to conceal portions of the hinge.

The top cover 118 is further shown residing above the band (Y-direction) and may conceal one or more loudspeakers of the electronic device 100 (e.g., woofer loudspeakers). The one or more loudspeakers disposed beneath the top cover 118 may emit sounds towards a top of the electronic device 100.

Figure 6:
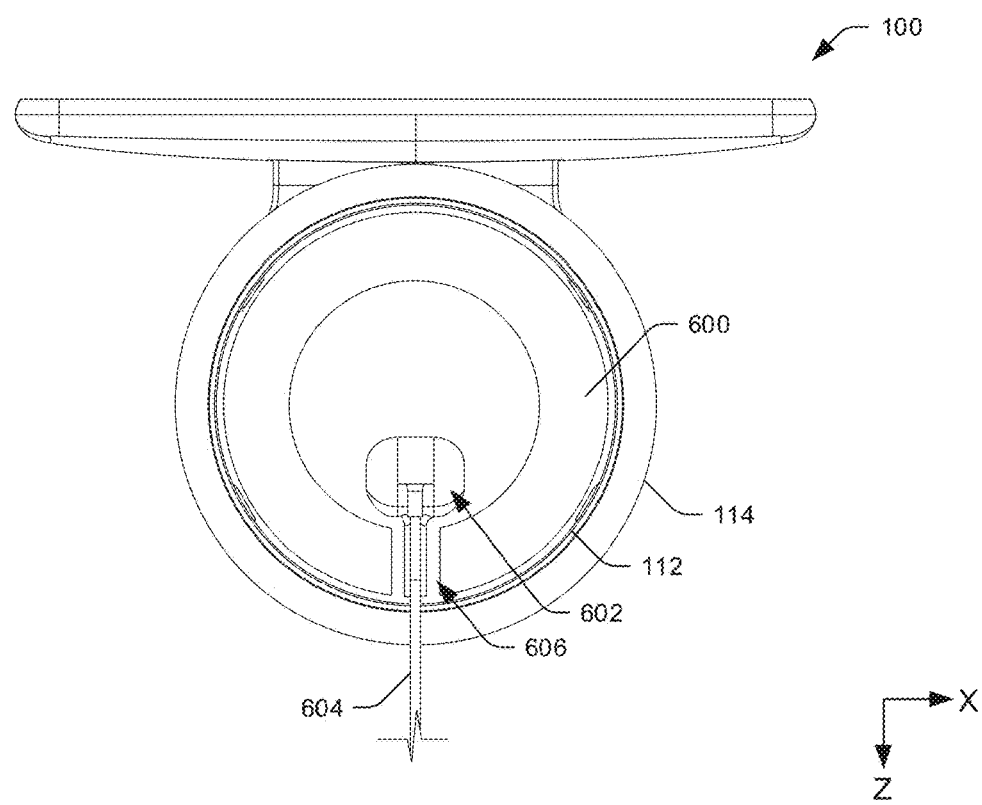
FIG. 6 illustrates a bottom view of the electronic device of FIG. 1, according to an embodiment of the present disclosure.

FIG. 6 illustrates a bottom view of the electronic device 100. In some instances, the electronic device 100 may be supported on a plurality of surface via the base 112. The base 112 may include a pad 600 made of rubber, for instance, that secures the electronic device 100 within an environment, such as on a desk, counter, shelf, etc. The pad 600 may also dampen and/or absorb vibrations of the electronic device 100 and/or may prevent the electronic device 100 from rattling during use (e.g., from the one or more loudspeakers). The pad 600 may also securely position the electronic device 100 while the display 106 rotates.

As shown, the base 112 may include a cavity 602 for receiving a power cord 604. Within the cavity 602 may be a socket or plug-in in which the power cord 604 may couple to the electronic device 100. A channel 606 provides access to the cavity 602 and the power cord 604 may route through the channel 606 to permit the electronic device 100 to sit flat against surfaces.

The base 112 and the grill 114 may have enough tolerance or clearance to permit the grill 114 to rotate during a movement of the housing. That is, discussed in detail herein, the base 112 may remain stationary (i.e., not rotate) during a rotation of the display 106 and portions of the housing sub-assembly 104. The grill 114 may not couple to the base 112, vice versa, and enough tolerance may be disposed between the base 112 and the grill 114 to permit rotation of the housing and prevent rubbing between the base 112 and the grill 114.

Figure 7:
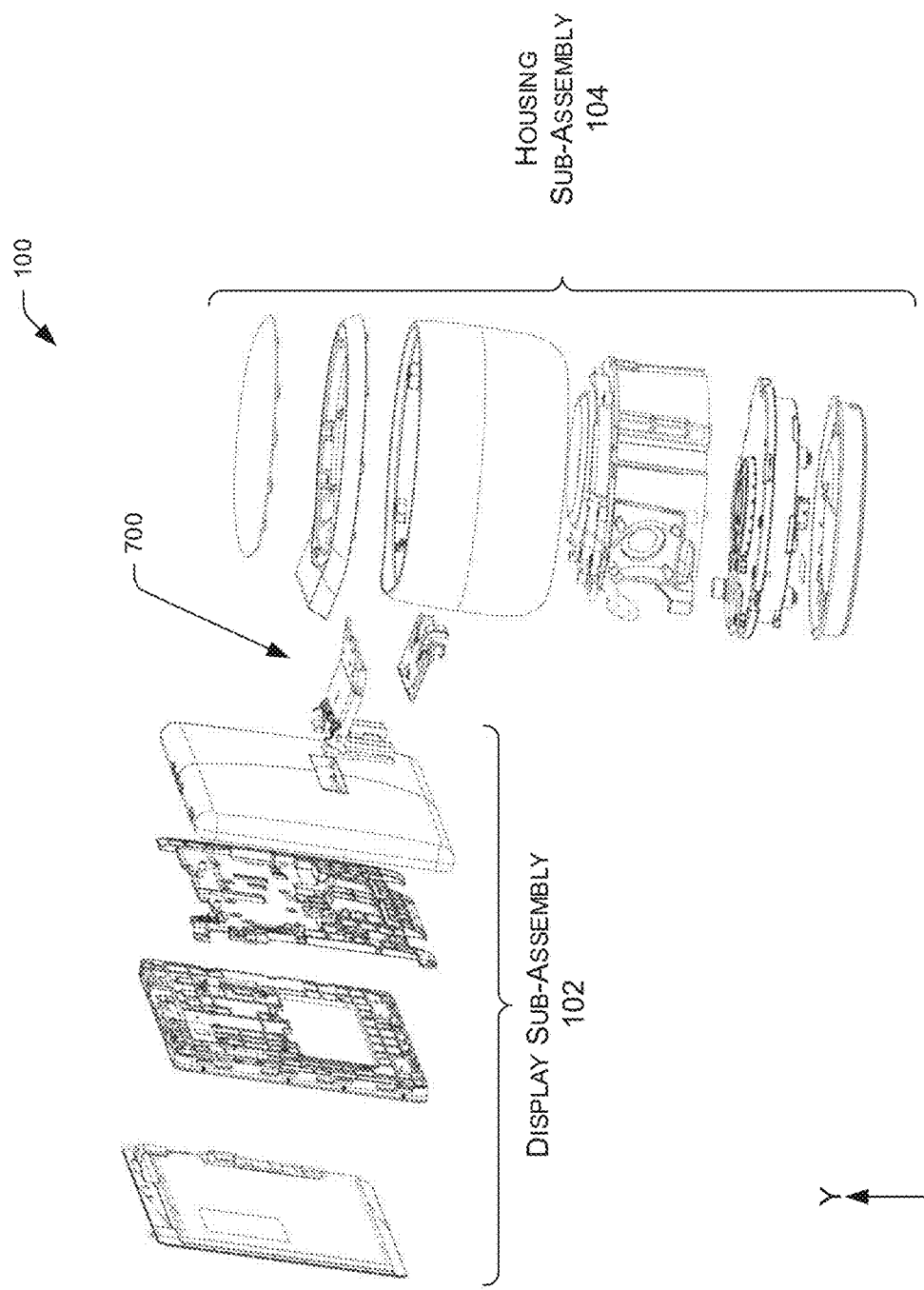
FIG. 7 illustrates a partial exploded view of the electronic device of FIG. 1, showing example components of the electronic device, according to an embodiment of the present disclosure.

FIG. 7 illustrates a partially exploded view of the electronic device 100, showing example components of the electronic device 100. Once assembled, for instance, as shown in FIG. 1, the electronic device 100 may resemble a compact enclosure, potentially minimizing a size of the electronic device 100. In some instances, the components of the electronic device 100 may compactly couple together such that little space exists within an interior of the electronic device 100 once assembled.

Introduced above, the electronic device 100 includes the display sub-assembly 102 and the housing sub-assembly 104. The display sub-assembly 102 and the housing sub-assembly 104 may operably couple to one another via a hinge 700. The hinge 700 may be a component of the display sub-assembly 102 and/or a component of the housing sub-assembly 104. Details, or components, of the display sub-assembly 102 and the housing sub-assembly 104 are discussed in turn herein.

Figure 8:
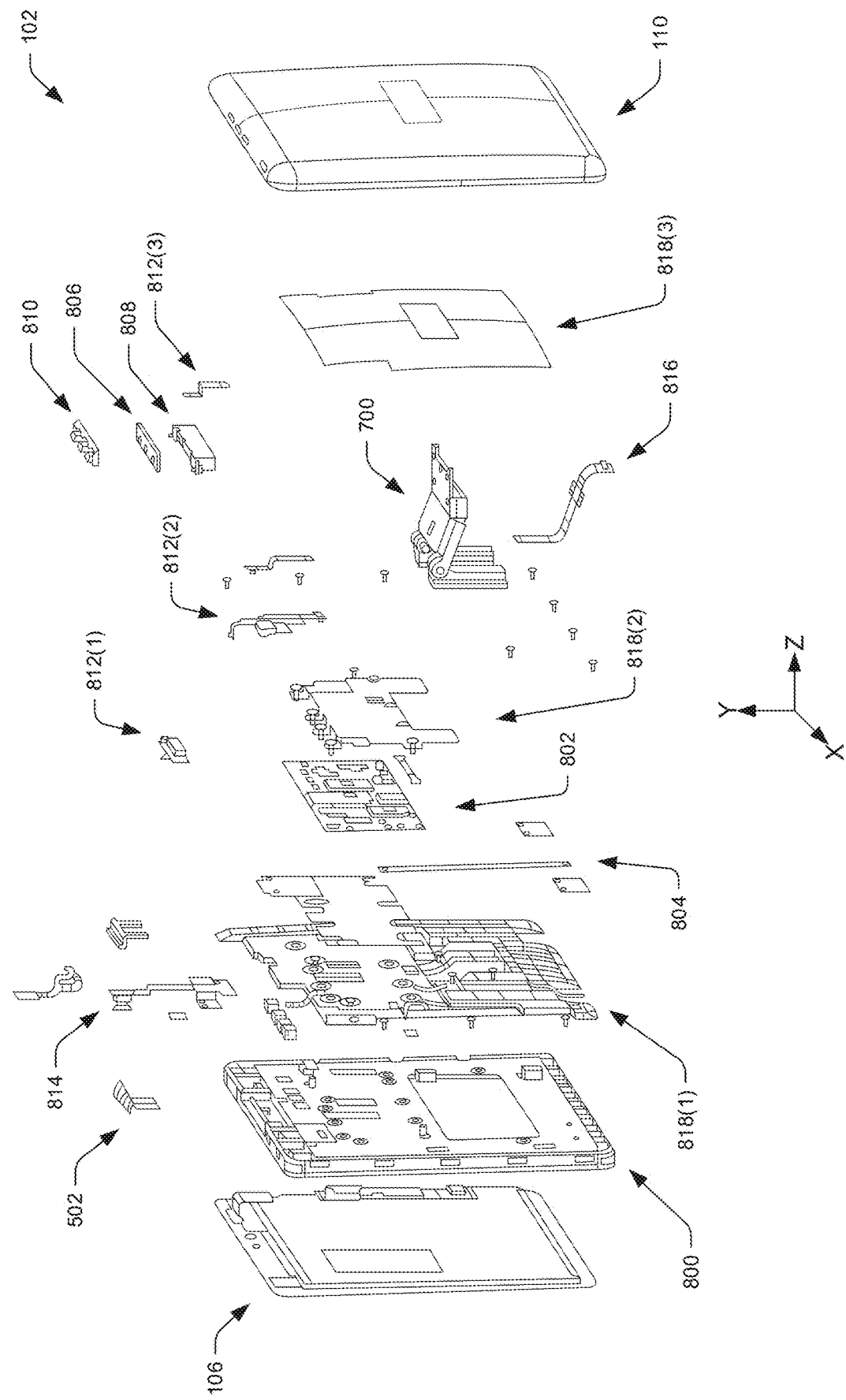
FIG. 8 illustrates a partial exploded view of the electronic device of FIG. 1, showing example components within a display of the electronic device, according to an embodiment of the present disclosure.

FIG. 8 illustrates an exploded view of the display sub-assembly 102, showing example components of the display sub-assembly 102.

The electronic device 100 may include frames or mounts sized and configured to reside within the display sub-assembly 102. The frames and/or mounts may support components within the display sub-assembly 102 and/or the components may otherwise attach to the frames and/or mounts for coupling to the electronic device 100. The frames and/or mounts may also communicatively, electrically, thermally couple, and/or link one or more components of the electronic device 100 to one another. For example, the display sub-assembly 102 may include a midframe 800 that supports the display 106 or to which the display 106 mounts. The display 106 may represent a first exterior (e.g., front) of the display sub-assembly 102. Noted above, the display 106 may include an LCD and may be touch sensitive for receiving input from the user.

The midframe 800 may include openings, ports, sockets, indents, and so forth for receiving components of the display sub-assembly 102. The midframe 800 may also include prongs, tabs, or other alignment features for positioning additional components of the display sub-assembly 102 within the display sub-assembly 102 or to the midframe 800.

The display sub-assembly 102 may include a multilayer board (MLB) 802 that carries out and perform functions of the electronic device 100 and/or the display sub-assembly 102. For example, the MLB 802 may cause content to be presented on the display 106 and/or may recognize touch gestures on the display 106. In some instances, the MLB 802 may include any number of processors, memory, circuits, transformers, power supplies, and so forth.

Additional computing components within the display sub-assembly 102 may couple to the MLB 802. For example, the display sub-assembly 102 may include one or more antennas 804 for communicatively coupling the electronic device 100 to one or more additional computing devices, such as mobile phones, tablets, computers, portable audio input/output devices, and/or any other computing device capable of communication. In some instances, the antennas 804 (or interfaces) may include ZigBee, Bluetooth, Bluetooth Low Energy (BLE), Wi-Fi, adaptive frequency technology (AFT), or the like. In some instances, the electronic device 100 may include multiple antennas to reduce latency in transmissions between the electronic device 100 and/or one or more communicatively coupled computing devices. In some instances, the electronic device 100 may include two Bluetooth antennas, one Wi-Fi antenna, and one ZigBee antenna.

In some instances, the antennas 804 may be located within the display sub-assembly 102, above the housing sub-assembly 104, to increase a received signal strength of data and/or provide increased connections when communicatively coupled to computing devices. The antennas 804 of the Wi-Fi interfaces may be located on the MLB 802, one or more PCBs within the display sub-assembly 102, and/or elsewhere within the electronic device 100 (e.g., the rear cover 110, within the housing sub-assembly 104, etc.).

Discussed above, the electronic device 100 may include buttons 500. To permit operation of the buttons 500, the electronic device 100 (or the display sub-assembly 102) may include a button PCB 806, a button support 808, and/or a button gasket 810. The button PCB 806, the button support 808, and/or the button gasket 810 may reside beneath the rear cover 110 and the rear cover 110 may include openings through which the buttons 500 are disposed. The button PCB 806 may communicatively couple to the MLB 802. The button support 808 may assist in providing a mechanical stroke and/or action to the buttons 500, such as giving the buttons 500 tactility and mechanical action to enable the buttons 500 to be depressed and returned to a resting state. The button gasket 810 may be disposed over, around, beneath the buttons 500 to prevent debris entering an interior of the display sub-assembly 102.

The display sub-assembly 102 may include one or more microphone PCBs which generate audio signals via sound captured by microphones of the electronic device 100. For example, in some instances, the display sub-assembly 102 may include a front microphone PCB 812(1), a top microphone PCB 812(2), and/or a rear microphone PCB 812(3). In some instances, each of the microphone PCBs may include respective microphones of the electronic device 100 or the microphones may communicatively couple to one or more microphone PCBs and/or the MLB 802. For example, the front microphone PCB 812(1) may support and/or include one or more front microphones oriented towards a front of the electronic device 100 (Z-direction), the top microphone PCB 812(2) may support and/or include one or more top microphones oriented towards a top of the electronic device 100 (Y-direction), and the rear microphone PCB 812(3) may support and/or include one or more rear microphones oriented towards a rear of the electronic device 100 (Z-direction). In some instances, the microphone PCBs 812(1)-(3) may couple to one another and/or the microphone PCBs may communicatively couple to the MLB 802.

The display sub-assembly 102 includes a camera 814 for capturing images and/or video within an environment in which the electronic device 100 resides. The camera 814 may be deposed beneath the bevel 108 and oriented towards a front of the electronic device 100. The shutter 502 is further included to provide privacy to users and/or limit a functionality of the camera 814.

A flex circuit 816 may communicatively couple computing components within the display sub-assembly 102 to those within the housing sub-assembly 104. The flex circuit 816 may allow for signals to be sent between the MLB 802 (or other PCBs of the display sub-assembly 102) and one or more PCBs in the housing sub-assembly 104. In addition, the flex circuit 816 may provide power to components within the display sub-assembly 102, as received from components in the housing sub-assembly 104. The flex circuit 816 may route through, over, under, and/or alongside the hinge 700. The band 116 may conceal the flex circuit 816 being visible from an exterior of the electronic device 100. Additionally, the flex circuit 816 may resist wear and include enough slack to permit the display 106 to tilt over a range of vertical angles.

The display sub-assembly 102 may include one or more heat dissipating frames, elements, heatsinks, or pads to dissipate heat generated by components of the display sub-assembly 102. For instance, the processor(s), the display 106, power supply, the antennas 804, the camera(s) 814, and so forth may generate heat during use. To efficiently dissipate heat the display sub-assembly 102 may include one or more heat dissipating elements. The heat dissipating elements may serve to reduce a touch temperature of the electronic device 100. In some instances, the electronic device 100 may include any number of heat dissipating elements.

For example, in some instances, the electronic device 100 may include a first heat dissipating element 818(1) that represents a frame disposed behind the display 106 (Z-direction). The first heat dissipating element 818(1) may couple to the midframe 800 for dissipating heat generated by the display 106. One or more additional components of the display sub-assembly 102 may couple to the first heat dissipating element 818(1), such as the MLB 802. In some instances, the first heat dissipating element 818(1) may include pockets, fins, coils, and/or adequate surface area to dissipate heat generated by components of the display sub-assembly 102.

A second heat dissipating element 818(2) may be disposed behind the MLB 802, in a direction towards the rear cover 110. Additionally, a third heat dissipating element 818(3) may couple to the rear cover 110 to uniformly distribute heat over a surface area of the rear cover 110. In some instances, the first heat dissipating element 818(1), the second heat dissipating element 818(2), and/or the third heat dissipating element 818(3) may include materials for effectively dissipating heat, such as copper and/or aluminum. However, the first heat dissipating element 818(1), the second heat dissipating element 818(2), and/or the third heat dissipating element 818(3) may include other materials as well, such as composites, foams, and/or plastics.

The display sub-assembly 102 may also include shielding plates and/or isolating foams may to guard against incoming or outgoing emissions of electromagnetic frequencies of the electronic device 100. The hinge 700 is further shown as a component of the display sub-assembly 102 and, as discussed herein, may couple to components of the display sub-assembly 102. However, although FIG. 8 illustrates the hinge 700 as part of the display sub-assembly 102, the hinge 700 may be a component of the housing sub-assembly 104.

As noted above, the MLB 802 may include memory. When present, the memory may store one or more software components or instructions that, when executed by one or more processors, configure the electronic device 100 to perform various operations. For instance, the electronic device 100 may be configured to capture and respond to user speech and to carry out speech processing, such as automatic speech recognition (ASR) or natural language understanding (NLU), speech synthesis may be performed by the components of the electronic device 100. By way of illustration, a user may verbally request the electronic device 100 (or another communicatively coupled computing device) to perform a particular task, such as to play music. The electronic device 100 may process the user command and cause one or more operations to be performed, such as playing the requested music over one or more loudspeakers of the electronic device 100. In some instances, to accomplish the operations performable by the electronic device 100, the components may be used in conjunction with network-based support services. Moreover, such speech processing components may be located additionally, or alternatively, in the housing sub-assembly 104.

Figure 9A:
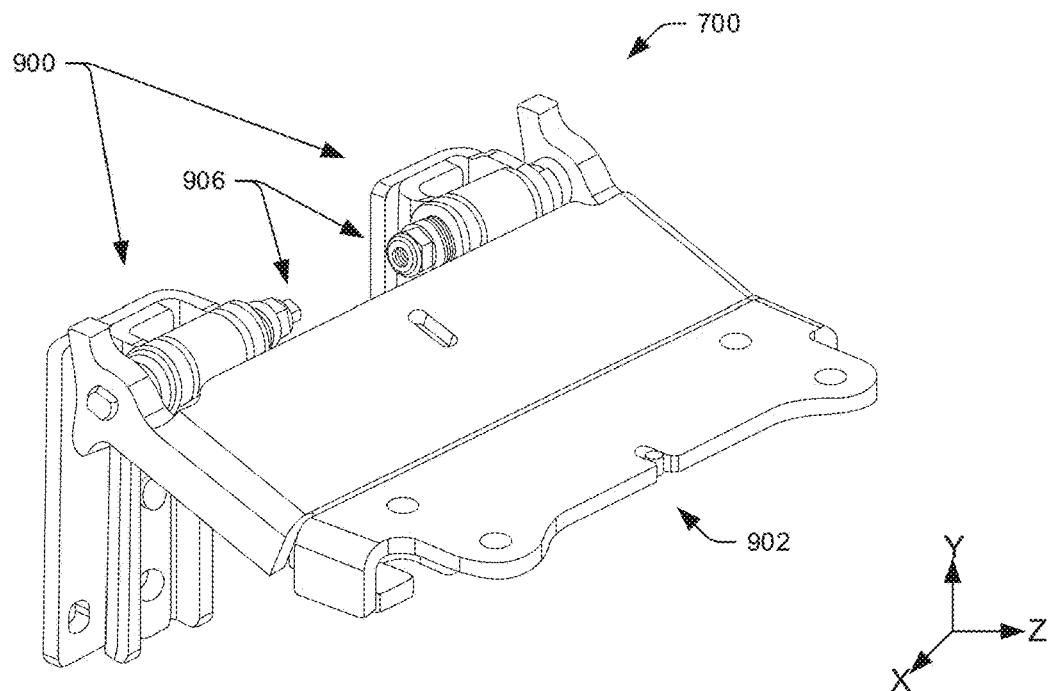
FIG. 9A illustrates a first perspective view of a hinge of the electronic device of FIG. 1, according to an embodiment of the present disclosure.
Figure 9B:
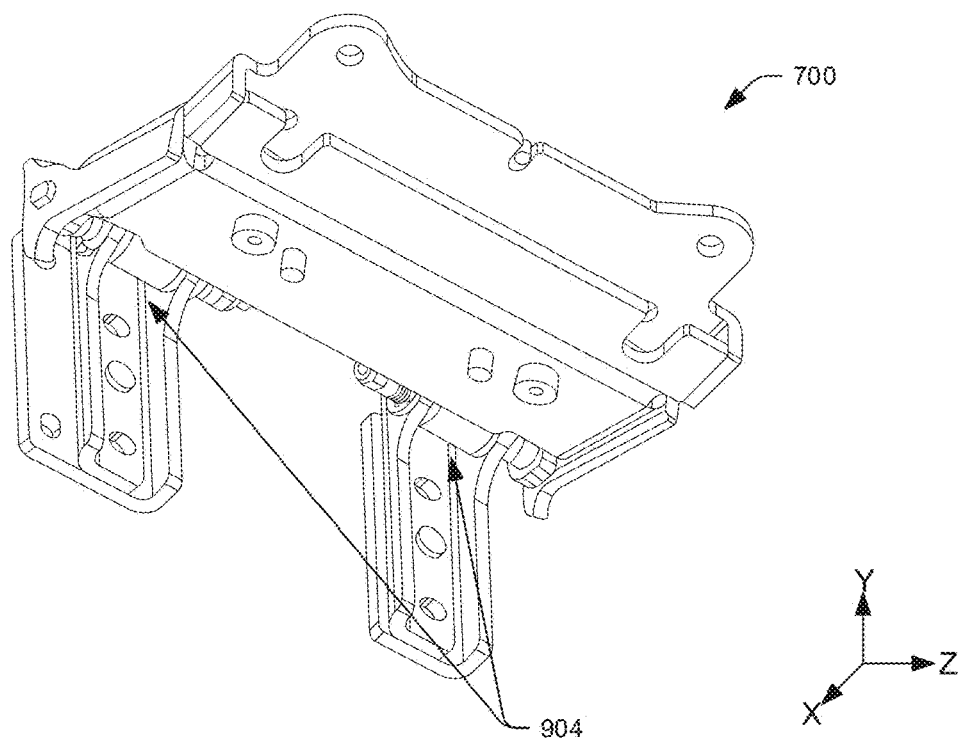
FIG. 9B illustrates a second perspective view of the hinge of FIG. 9A, according to an embodiment of the present disclosure.
Figure 10A:
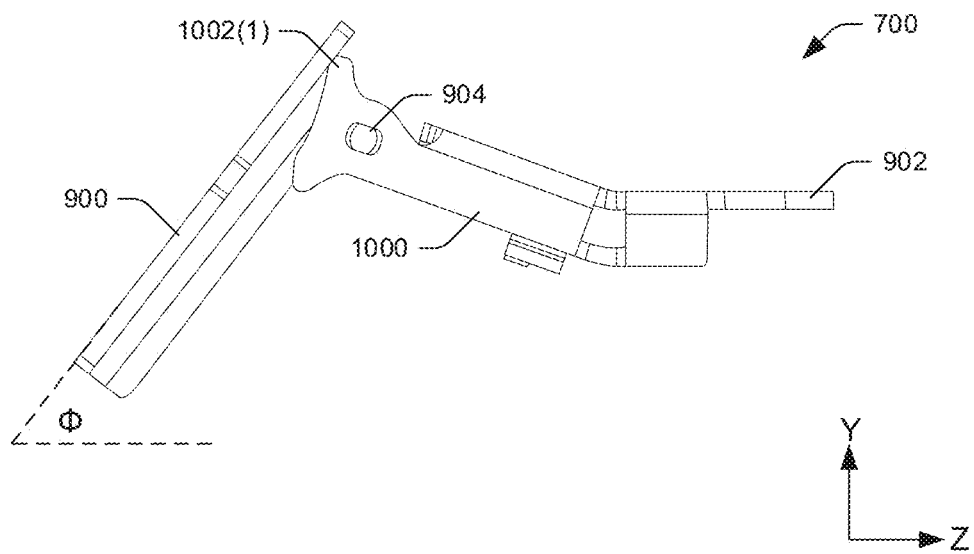
FIG. 10A illustrates a side view of the hinge of FIG. 9A in a first position, according to an embodiment of the present disclosure.
Figure 10B:
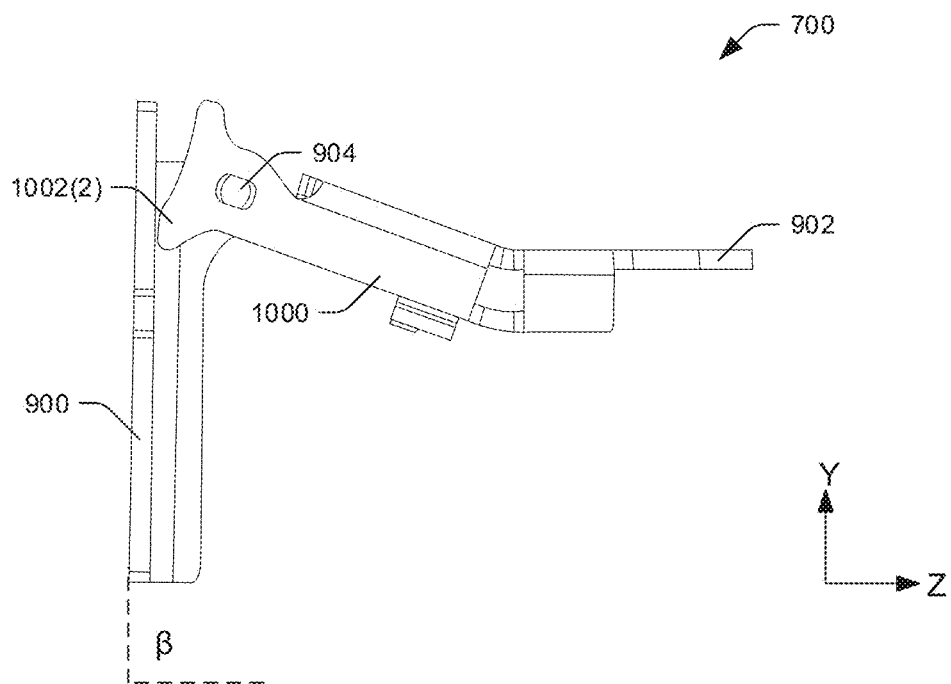
FIG. 10B illustrates a side view the hinge of FIG. 9A in a second position, according to an embodiment of the present disclosure.

FIGS. 9A, 9B, 10A, and 10B illustrate various views of the hinge 700. FIGS. 9A and 9B illustrate perspective views of the hinge 700 while FIGS. 10A and 10B illustrate side views of the hinge 700, showing a range of motion of the hinge 700. The hinge 700 may couple the display sub-assembly 102 and the housing sub-assembly 104 to one another and may provide the display 106 with a degree of pivotable movement (e.g., tilting about the X-axis).

In some instances, the hinge 700 may include one or more brackets 900 and a frame 902. The brackets 900 may couple to the display sub-assembly 102 or components of the display sub-assembly 102 (e.g., midframe 800, first heat dissipating element 818(1), etc.). The frame 902, meanwhile, may couple to the housing sub-assembly 104 or components of the housing sub-assembly 104 (e.g., the housing). One or more pins or shafts 904 may couple the brackets 900 and the frame 902 together to provide the hinge 700 with pivotable movement. Additionally, one or more springs (e.g., torsional springs) may wrap, or be disposed around (e.g., coaxial with), the one or more shafts 904 to provide the hinge 700 with structural rigidity and permit the hinge 700 to hold in position.

The brackets 900 may include features for receiving the shafts 904. As illustrated, the hinge 700 may include two brackets 900, and correspondingly, the hinge 700 may include two shafts 904. The brackets 900 are shown disposed on ends, or proximal to ends (X-direction) of the hinge 700. However, the hinge 700 may include more than or less than two brackets 900 and/or the frame 902 may couple to other portions and/or locations of the brackets 900. In some instances, the brackets 900 may include flanges, lips, or receptacles through which the shafts 904 are disposed and/or the frame 902 may include features through which the shafts 904 are disposed.

The one or more springs may provide torsional resistance to the one or more shafts 904 to hold the one or more shafts 904 in position. For example, during a pressing of the buttons 500 and/or a tapping of the display 106, the hinge 700 may remain stationary and resist deflection. However, noted herein, the torsional resistance applied by the springs may be overcome to dispose the hinge 700 at various positions. The hinge 700 may provide enough stiffness or include enough resistance to avoid repositioning during an operation of the electronic device 100. Moreover, the hinge 700 may prevent vibrations from being transmitted or transferred between the display sub-assembly 102 and the housing sub-assembly 104. For example, the hinge 700 may prevent the camera 814 from vibrating while loudspeakers of the electronic device 100 are firing, or while the electronic device 100 is rotating (e.g., via the motor). For example, a user may apply force to tilt the display 106. In some instances, the torsional resistance may be adjusted via one or more nuts 906 coupled to the shafts 904. For example, the nuts 906 may be tightened and/or loosed to increase and/or reduce a compression of the springs and movement of the hinge 700. Grease, or other substances, may be used for lubricating the hinge 700 (or components of the hinge 700). The hinge 700 may also include bearings or bushing to assist in tilting of the display 106 or movement of the hinge 700. Additionally, the electronic device 100 may be of sufficient weight to prevent lifting while the display 106 is being titled. The frame 902 may be of sufficient size, thickness, etc. to prevent bending or torsional twisting of the hinge 700 to prevent deflections of the display 106.

Moving to FIGS. 10A and 10B, the hinge 700 may be biased about the shafts 904 to adjust a tilt of the display 106 (e.g., about the X-axis). For example, the user may grasp portions of the display 106 (or the display sub-assembly 102) to manually articulate the hinge 700 and position the display 106 over a range of viewing angles. In some instances, the hinge 700 may have a limited degree of movement or a range over which the hinge 700 is moveable, such as between a first position as shown in FIG. 10A and a second position as shown in FIG. 10B. The first position and the second position may represent hard stops of the hinge 700, between which the hinge 700 is moveable for tilting the display 106 at different angles FIG. 10A illustrates the hinge 700 in the first position, which may correspond to an extreme top position. At the extreme top position, the hinge 700 may be disposed at a greatest upward angle, represented by an angle $\Phi$ and the display 106 may not be rotated further in the upward direction (clockwise about the X-axis). In some instances, the angle Φ may correspond to fifty degrees relative to the Z-plane, or extending through the Z-plane. The hinge 700 may therefore be rotated forty degrees upward. In some instances, the angle Φ may be relative to a surface of the bracket 900, as shown in FIG. 10A.

FIG. 10B illustrates the hinge 700 in the second position, which may correspond to an extreme bottom position. At this position, the hinge 700 may be disposed at a least angle, represented by the angle β, and may not be rotated further in the downward direction (counterclockwise about the X-axis). In some instances, the angle β may correspond to ninety degrees relative to the Z-plane (or zero degrees relative to the Y-plane). In the second position, the display 106 may be substantially perpendicular to a surface on which the electronic device 100 rests, or relative to the base 112. In some instances, the angle β may be relative to a surface of the bracket 900, as shown in FIG. 10B.

As such, in some instances, the hinge 700 may have forty degrees of travel to tilt the display 106 at varying degrees. However, in some instances, the display 106 may have less than and/or greater than forty degrees of tilt.

In some instances, the frame 902 may include arms 1000 that may contact or engage surfaces of the bracket 900. Although FIGS. 10A and 10B illustrate one arm 1000 of the frame 902, an opposing side of the frame 902 (X-direction) may include an additional arm. As shown in FIGS. 10A and 10B, an end of the arm 1000 may engage the bracket 900 to provide the hinge 700 with pivotable movement between the first position and the second position. In some instances, the ends of the arms 1000 in contact with the bracket 900 may be cam shaped for engaging the surface of the bracket 900. As shown, the ends of the arms 1000 may include two cam shaped features. The cams may be spaced apart on the arms 1000, such as a top and a bottom of the arm 1000. For example, shown in FIG. 10A, a first cam 1002(1) may contact the bracket 900 in the first position. In the second position, a second cam 1002(2) may contact the bracket 900. In some instances, the ends of the arms 1000, such as the first cam 1002(1) and the second cam 1002(2), may be configured to maintain contact with the bracket 900 to provide resistance against the hinge 700 repositioning.

In some instances, the bracket 900 may be configured to cam over ends of the arm 1000 in the event of excessive force being applied to the hinge 700. Configuring the hinge 700 to cam over may prevent excessive damage to the hinge 700 and/or other components of the electronic device 100. For example, the surface of the bracket 900 in contact with the first cam 1002(1) may further extend upward (clockwise about the X-axis). In such instances, the display 106 may be parallel to a surface on which the electronic device 100 resides. The hinge 700 (and other components of the electronic device 100) may therefore be of sufficient strength to resist and survive drops.

As shown, the frame 902 of the hinge 700 may represent a static component that is not configured to tilt during a movement of the display 106. Rather, the bracket 900 portion of the hinge 700 may be configured to tilt and the frame 902 may remain stationed along with the base 112 of the housing sub-assembly 104.

The hinge 700 may further include areas through which components route. For example, the flex circuit 816 may route through, around, or within the hinge 700 (e.g., the frame 902) to communicatively couple components within the display sub-assembly 102 and the housing sub-assembly 104.

In some instances, the hinge 700 may be manufactured from sheet metal using one or more stamping, bending, and/or cutting processes. Forming the hinge 700 out of sheet metal may reduce a cost and/or complexity of the hinge 700. However, the hinge 700 may be manufactured from other materials and/or using additional processes (e.g., composites, cast-molding, etc.).

Figure 11:
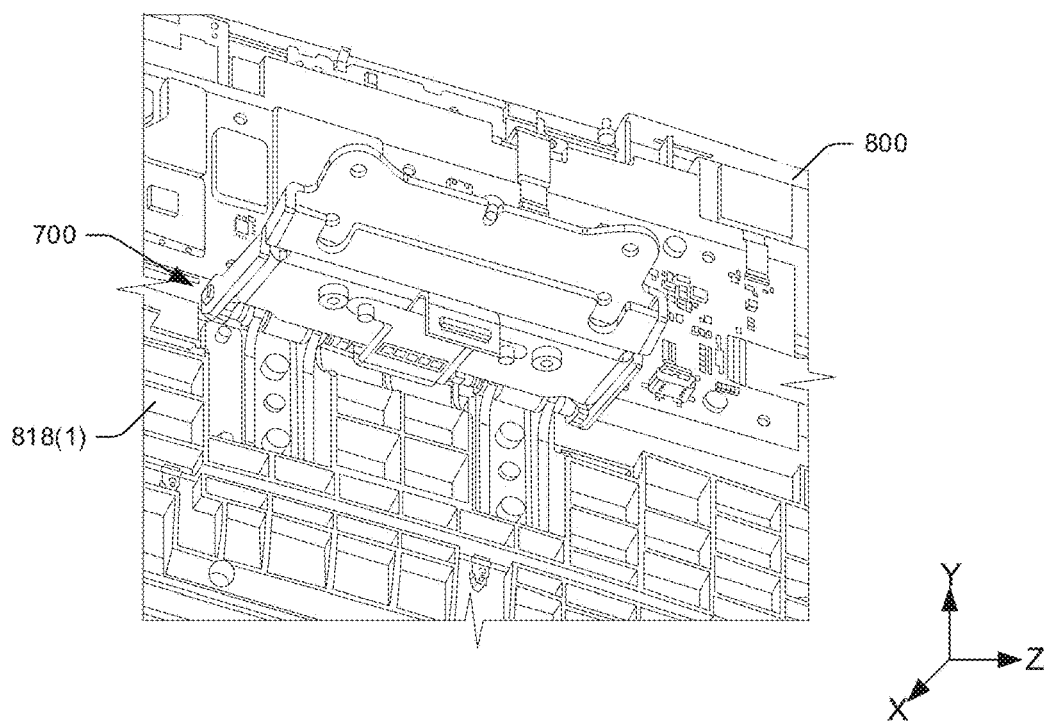
FIG. 11 illustrates the hinge of FIG. 9A coupled to example components of the electronic device of FIG. 1, according to an embodiment of the present disclosure.

FIG. 11 illustrates a coupling of the hinge 700 to the midframe 800 and/or the first heat dissipating element 818(1). The midframe 800 and/or the first heat dissipating elements 818(1) may include receptacles, indents, and/or other features for receiving and/or positioning the hinge 700. For example, one or more pockets and/or alignment pins may receive and position the bracket 900 of the hinge 700 to the midframe 800 and/or the first heat dissipating element 818(1). In some instances, the bracket 900 may be secured to the midframe 800 and/or the first heat dissipating element 818(1) via fasteners (e.g., screws).

Figure 12:
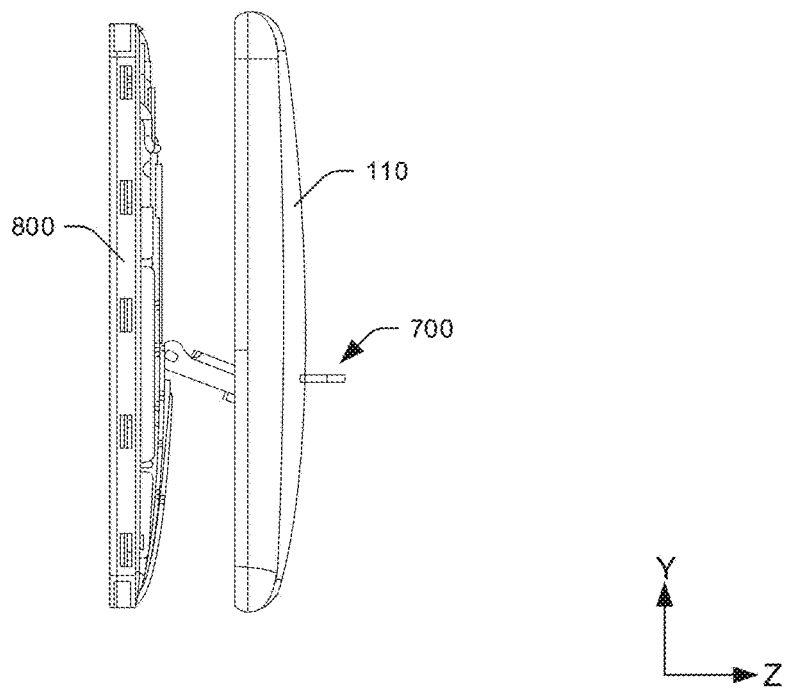
FIG. 12 illustrates a side view of the electronic device of FIG. 1, according to an embodiment of the present disclosure.

FIG. 12 illustrates a coupling of the rear cover 110 to the midframe 800 (or other components) of the display sub-assembly 102. Once coupled, the rear cover 110 may enclose or encapsulate components of the display sub-assembly 102 (e.g., MLB 802).

In some instances, the midframe 800 and the rear cover 110 may snap together. To permit coupling of the midframe 800 and the rear cover 110, the midframe 800 and the rear cover 110 may include attachment mechanisms. For example, the midframe 800 may include first attachment mechanisms that engage with second attachment mechanisms of the rear cover 110. In some instances, individual attachment mechanisms of the first attachment mechanisms may engage with individual attachment mechanisms of the second attachment mechanisms.

The rear cover 110 may include further include openings, apertures, ports, or other holes, slots, or channels for receiving the shutter 502, the buttons 500, the hinge 700, and so forth. For example, as shown in FIG. 12, the rear cover 110 may include a slot or opening though which at least a portion of the hinge 700 extends (e.g., the frame 902).

Figure 13:
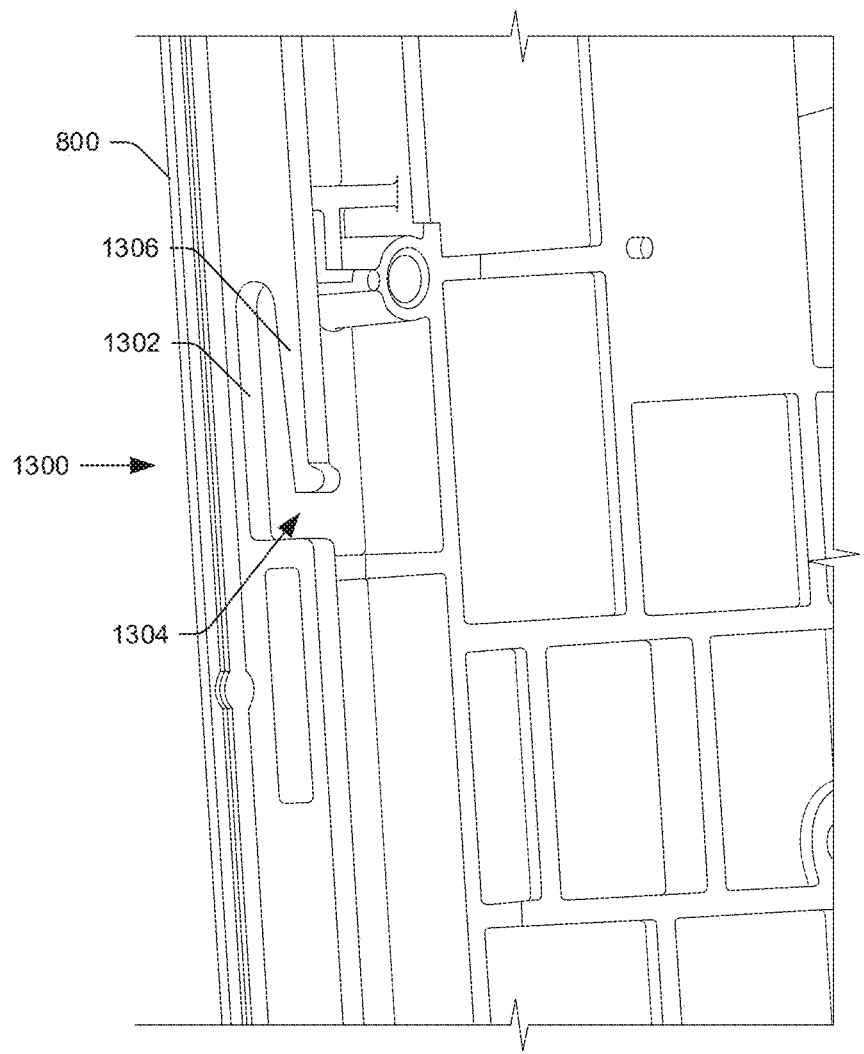
FIG. 13 illustrates an example frame of an example display of the electronic device of FIG. 1, according to an embodiment of the present disclosure.

FIG. 13 illustrates a detailed view of the midframe 800, showing attachment mechanisms of the midframe 800 that couple to attachment mechanisms of the rear cover 110 during an assembly of the display sub-assembly 102. For example, the midframe 800 may include first attachment mechanisms 1300 that extend around a perimeter, border, boundary, or edge of the midframe 800. However, the first attachment mechanisms 1300 may be located elsewhere on the midframe 800 (e.g., interior to the perimeter).

In some instances, the first attachment mechanisms 1300 may resemble tabs, hooks, protrusions, keys, keyways, slots, other male/female connectors, and/or a combination thereof, which are complimentary to engage attachment mechanisms of the rear cover 110. As shown in FIG. 13, the first attachment mechanisms 1300 may include a slot 1302 sized to receive a projection, tab, or flange of the rear cover 110. In some instances, the slot 1302 may receive the flange via the rear cover 110 being slid, guided, and/or pressed into the slot 1302. The slot 1302 may narrow (Y-direction, as shown in FIG. 13) to compress the flange within the slot 1032 and secure the rear cover 110 to the midframe 800. Other coupling mechanisms may be used, however.

FIG. 13 further illustrates that the rear cover 110 (or the first attachment mechanisms 1300) may include a tab having a hump, tab, projection, or nipple 1304. The nipple 1304 may be biased or spring loaded via an arm 1306 of the first attachment mechanisms 1300, which in some instances, may form a portion of the slot 1302 (e.g., periphery). In some instances, the nipple 1304 may be located on an end of the arm 1306, or along any location of the arm 1306. The nipple 1304 may serve to reduce a vibration, chatter, shaking, or other movement of the rear cover 110 once coupled to the midframe 800. As the arm 1306 may be spring loaded, deflected, or biased, the nipple 1304 may serve to maintain contact with an interior surface of the rear cover 110. For example, when coupled, a surface of the rear cover 110 may push the arm 1306 and the nipple 1304 in the Z-direction (i.e., negative Z-direction). As the arm 1306 and the nipple 1304 are pushed (or biased in the Z-direction), the nipple 1304 may provide a counteractive or opposite force in the Z-direction (i.e., positive Z-direction). That is, the deflection of the arm 1306 may function to provide a biasing force to the nipple 1304 such that the arm 1306 is spring loaded. This spring loading nature of the arm 1306 serves to bias the nipple 1304 into the rear cover 110 to maintain contact between the rear cover 110 and the midframe 800. This constant contact prevents a loose fitting between the midframe 800 and the rear cover 110, or gaps therebetween, to avoid vibrations and/or shaking of the rear cover 110.

Although FIG. 13 illustrates a single first attachment mechanism 1300 of the midframe 800, first attachment mechanisms 1300 may extend completely or partially around the midframe 800 and may be spaced apart from one another by any distance. In some instances, the first attachment mechanisms 1300 may be located on all sides or along all edges of the midframe 800, or may only be located on certain sides or edges of the midframe 800. Furthermore, although the arm 1306 and/or the nipple 1304 are disclosed as providing a biasing force to prevent chatter of the rear cover 110, the midframe 800 and/or the rear cover 110 may include springs, pads, or other members to maintain contact between the midframe 800 and the rear cover 110 or otherwise prevent chatter. The arm 1306 and/or the nipple 1304 may also serve to maintain engagement of the first attachment mechanisms 1300 with those of the rear cover 110 (e.g., second attachment mechanisms).

Figure 14:
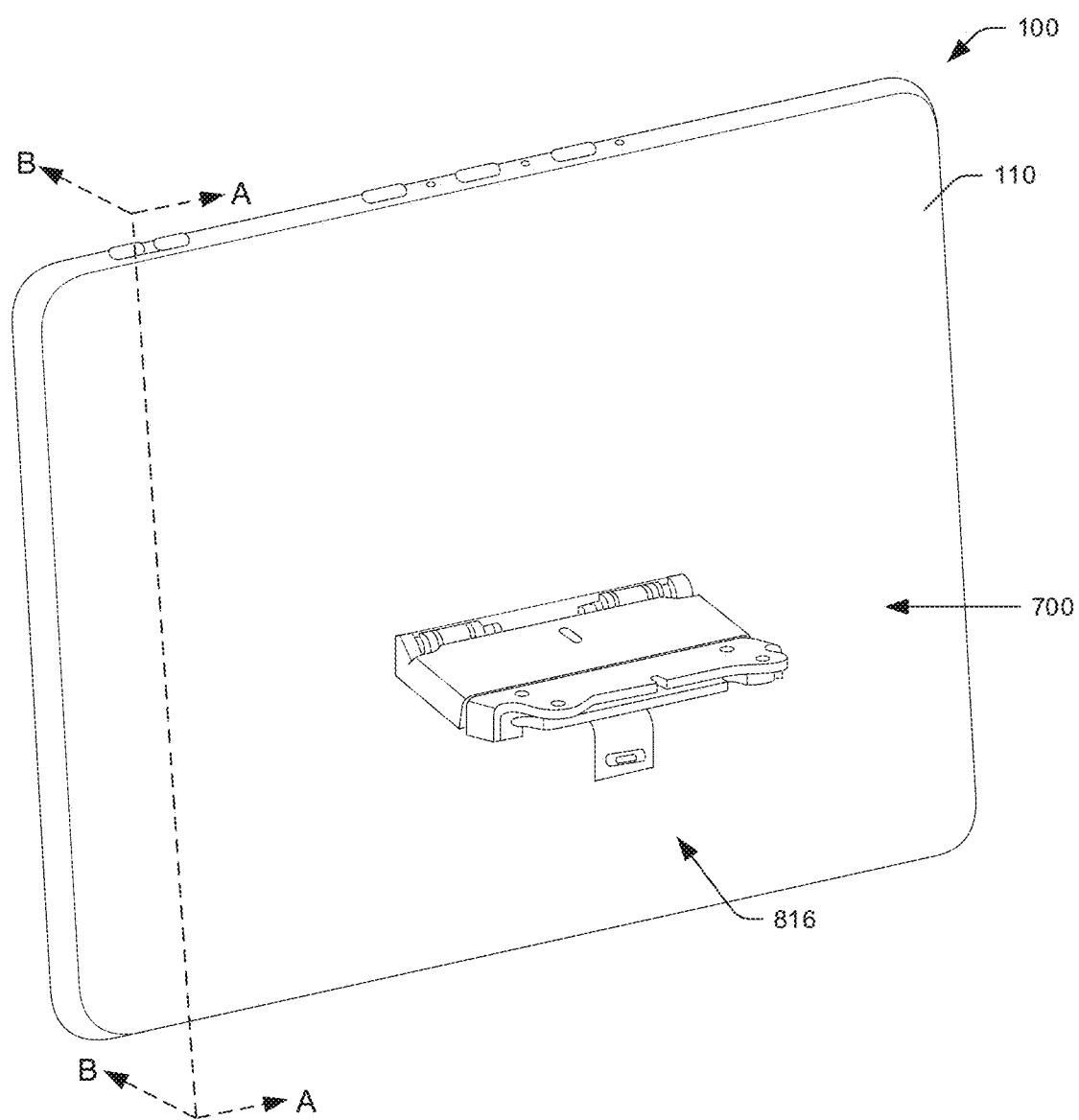
FIG. 14 illustrates a rear perspective view of an example display of the electronic device of FIG. 1, according to an embodiment of the present disclosure.

FIG. 14 illustrates a rear perspective view of the display sub-assembly 102. As shown, when assembled, the hinge 700 may extend into, through, or partially through the rear cover 110. For example, the frame 902 of the hinge 700 protrudes through the rear cover 110 to permit coupling to the housing. In some instances, an actual pivoting portion of the hinge 700 (i.e., the shafts 904) may be disposed interior to, partially interior to, or exterior to the rear cover 110. The slot may be of sufficient size to permit the hinge to pivot.

FIG. 14 further illustrates an end of the flex circuit 816 being exposed external to the rear cover 110 for coupling to computing components of the housing sub-assembly 104.

Figure 15A:
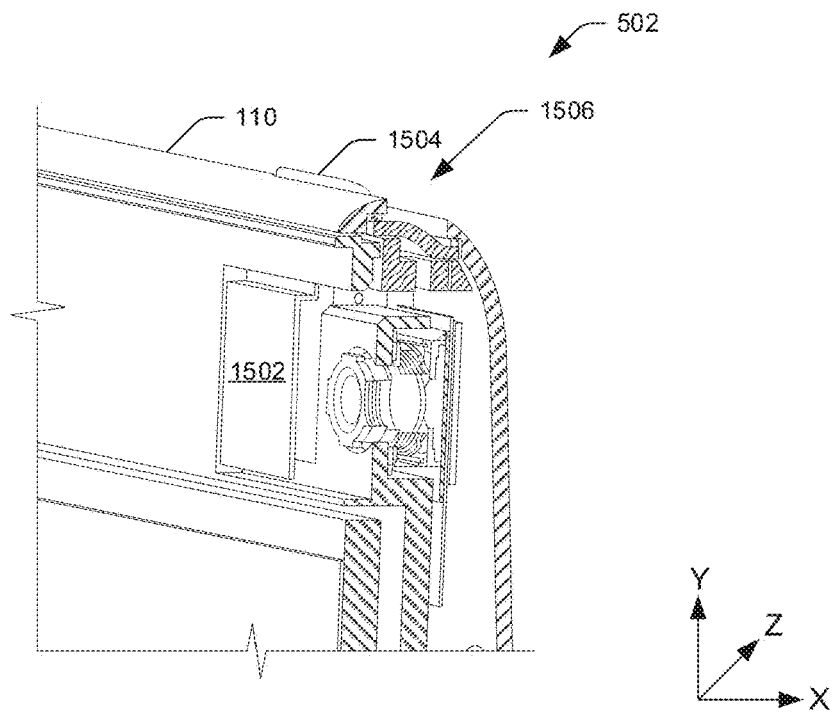
FIG. 15A illustrates a cross-sectional view taken along line A-A of FIG. 14, showing example components of the electronic device of FIG. 1, according to an embodiment of the present disclosure.
Figure 15B:
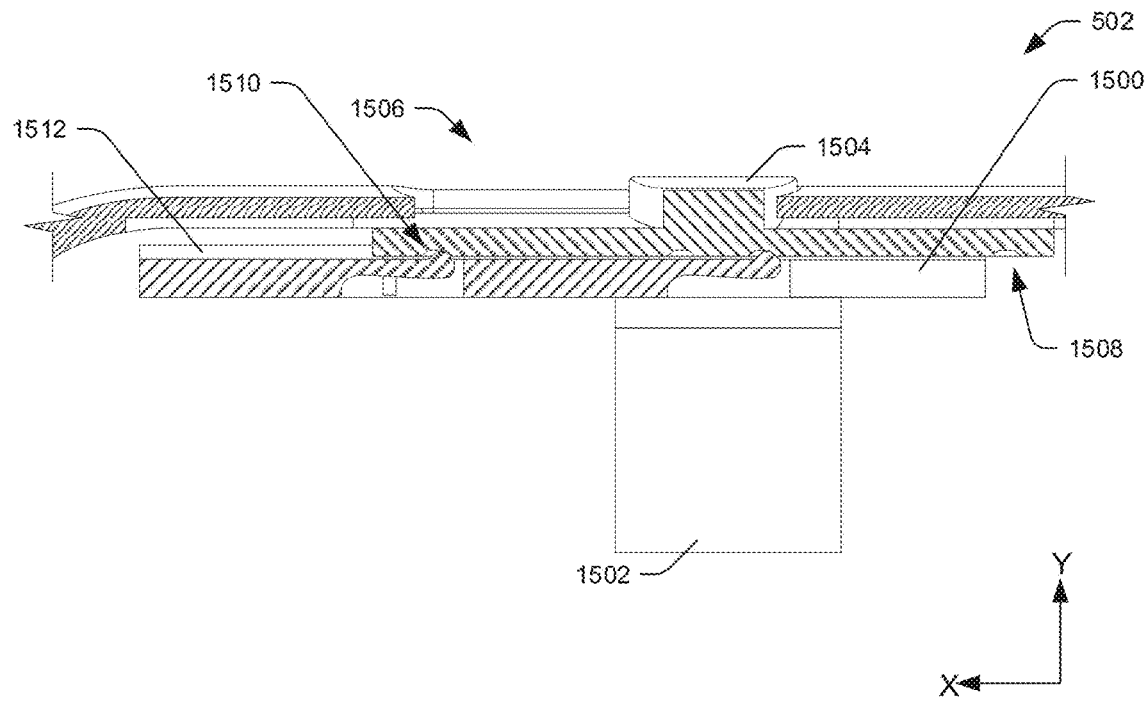
FIG. 15B illustrates a cross-sectional view taken along line B-B of FIG. 14, showing example components of the electronic device of FIG. 1, according to an embodiment of the present disclosure.

FIGS. 15A and 15B illustrate the shutter 502 or components of the shutter 502. In some instances, the shutter 502 may include an assembly that mounts to the rear cover 110. For example, the assembly of the shutter 502, in some instances, may include slide 1500 having a cover 1502 and/or a knob 1504 that is moveable between a first position and a second position within a channel 1506. In FIGS. 15A and 15B the knob 1504 is shown in the first position to permit images to be captured by the camera 814 of the electronic device 100. In the first position, the cover 1502 may not be disposed over, or within, a field of view of the camera 814. However, the knob 1504 may be moveable to the second position to restrict the camera 814 from capturing images. In the second position, the cover 1502 may be disposed over, or within, the field of view of the camera 814 to obstruct the camera 814 from capturing images within the environment. In some instances, when the knob 1504 is the second position, a switch may be triggered to deactivate the camera 814 (e.g., turn off). In some instances, when the electronic device 100 is assembled, the cover 1502 may be disposed through an opening in the midframe 800.

The slide 1500 may also include indents or notches 1508 that engage with tabs 1510 of a support 1512. The support 1512 may couple to the rear cover 110, the midframe 800, or other components within the display sub-assembly 102 and remain stationary. The notches 1508 and the tabs 1510 may engage to secure the shutter 502 within the first position or the second position. In some instances, in the first position and/or the second position, the two tabs 1510 may engage with two notches for securing the shutter 502. However, although FIGS. 15A and 15B illustrate four notches 1508 and two tabs 1510, the shutter 502 may include more than or less than the number of notches 1508 and/or tabs 1510 as shown.

Figure 16A:
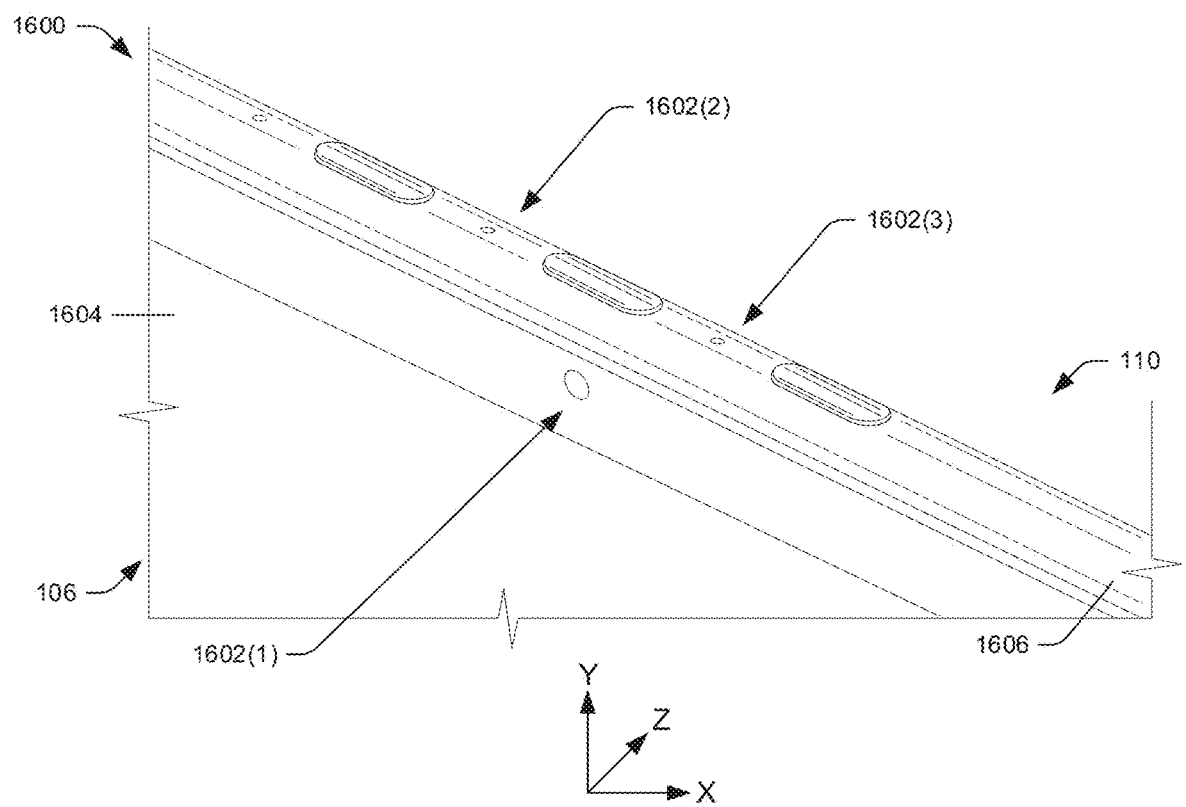
FIG. 16A illustrates example microphones of the electronic device of FIG. 1, according to an embodiment of the present disclosure.
Figure 16B:
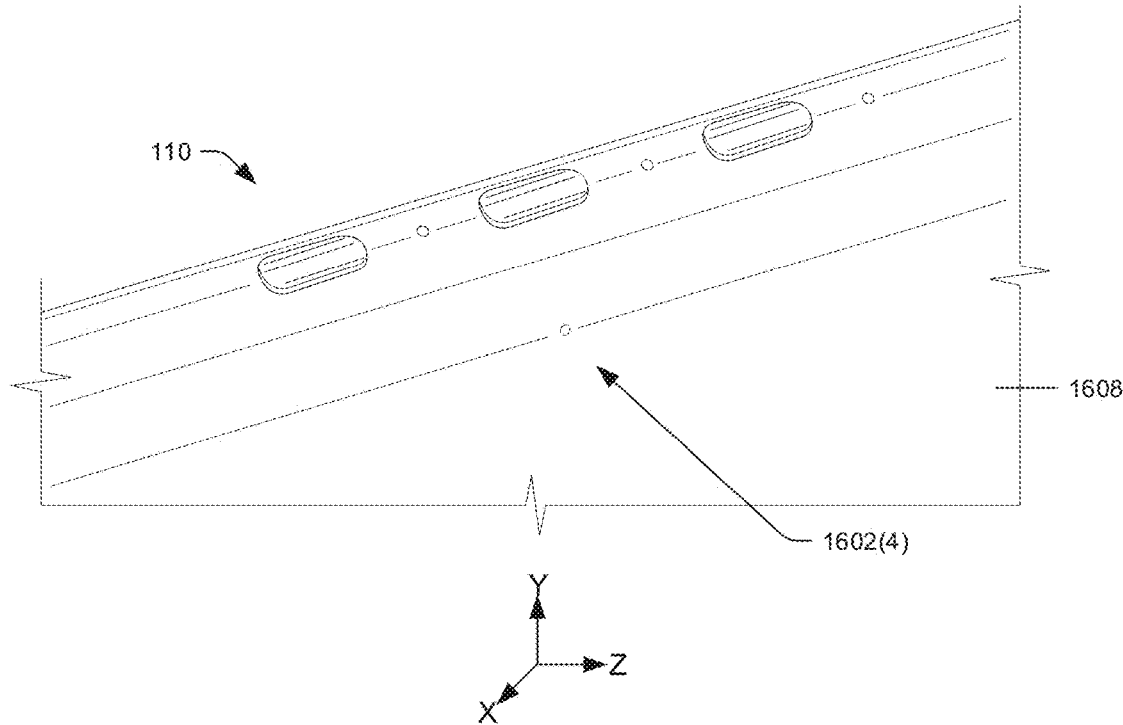
FIG. 16B illustrates example microphones of the electronic device of FIG. 1, according to an embodiment of the present disclosure.

FIGS. 16A and 16B illustrate example microphones of the electronic device 100. In some instances, the electronic device 100 may include four microphones that are proximately located towards a top 1600 of the display 106. The microphones may be disposed, oriented, or may face multiple directions for use in determining a direction of user speech.

For example, the electronic device 100 may include a first microphone 1602(1) located on a front surface 1604 of the display 106, or oriented towards a front of the display 106 (Z-direction). In some instances, the first microphone 1602(1) may be disposed beneath or within the bevel 108 of the display 106. A second microphone 1602(2) and/or a third microphone 1602(3) may be located on a top 1606 of the rear cover 110. The second microphone 1602(2) and/or the third microphone 1602(3) may be oriented towards the top 1600 of the display 106. As shown, in some instances, the second microphone 1602(2) and/or the third microphone 1602(3) may be interposed between the buttons 500 of the electronic device 100. A fourth microphone 1602(4) may be located on a back 1608 of the rear cover 110 and oriented rearward (Z-direction).

In some instances, the microphones 1602(1)-(4) may be equidistantly spaced apart from one another. The microphones 1602(1)-(4) may also be arranged in a generally diamond shape for increased signal processing and voice detection. The diamond pattern may allow the electronic device 100, or another communicatively coupled device, to process the audio signals generated by the microphones 1602(1)-(4) and discern a direction of the user within the environment. Such direction, as noted above, may be utilized to position the electronic device 100.

In some instances, the display 106 and/or the rear cover 110 may include openings, channels, or microphone ports for directing sound to the microphones 1602(1)-(4). The microphone ports may assist in transferring or directing sound that is external to the electronic device 100 to one or more microphones located within the electronic device 100. For example, the display 106 may include a first microphone port for channeling sound to the first microphone 1602(1) and the rear cover may include a second microphone port, a third microphone port, and a fourth microphone port for directing sound to the second microphone 1602(2), the third microphone 1602(3), and the fourth microphone 1602(4), respectively.

In some instances, the electronic device 100 may include less than or more than four microphones 1602(1)-(4). For example, the electronic device 100 may include one or more additional microphones located proximate to the one or more loudspeakers of the electronic device 100 and which are configured to capture sound output by the one or more loudspeakers. Audio captured by these additional microphones may be used for acoustic echo cancellation (AEC) or active noise cancellation.

In some instances, as the display 106 rotates, the relative positioning of the microphones 1602(1)-(4) may alter. For example, when the display 106 is tilted, the top microphones (e.g., the second microphone 1602(2) and the third microphone 1602(3)) may be disposed along a same vertical plane (e.g., Y-plane) as the rear microphone (e.g., the fourth microphone 1602(4)). Alternatively, when the display 106 is tilted to zero degrees, the top microphones may not be disposed along the same vertical plane as the rear microphone. Such relative positioning may impact audio characteristics and/or speech processing techniques used to determine a direction of the user. In some instances, the electronic device 100 may be configured to utilize a position of the display 106 (e.g., tilt) for use in selecting one or more algorithms for processing the speech input. That is, a tilt of the display 106 may be used to determine how to process the audio signals generated by the microphone 1602(1)-(4).

Figure 17:
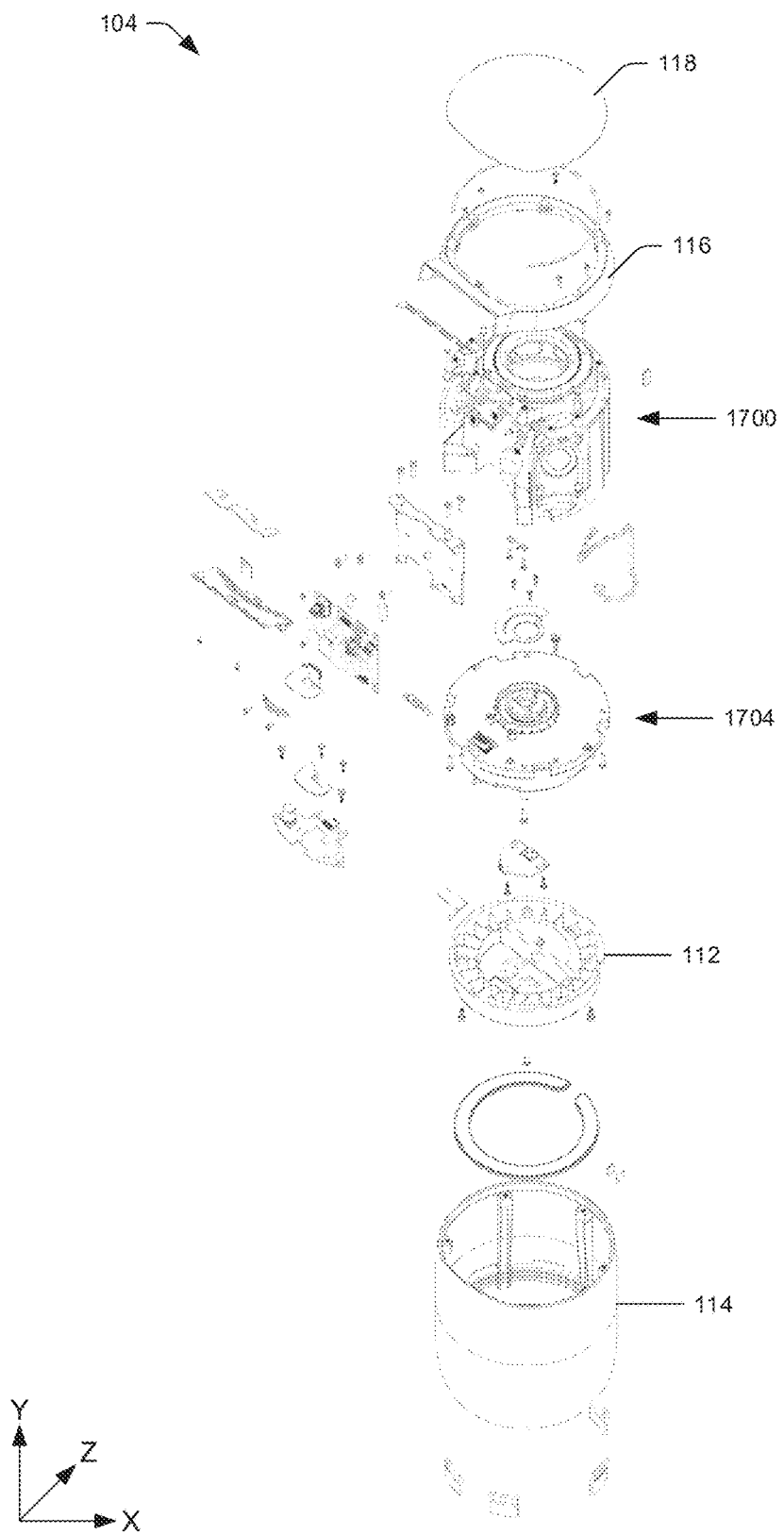
FIG. 17 illustrates an exploded view of the electronic device of FIG. 1, according to an embodiment of the present disclosure.

FIG. 17 illustrates an exploded view of the housing sub-assembly 104. Structurally, the housing sub-assembly 104 may include the base 112, the grill 114, the band 116, the top cover 118, and a housing 1700. The grill 114, the band 116, and/or the top cover 118 may couple to the housing 1700.

A hinge bracket 1702 may receive the hinge 700 for coupling the hinge 700 to the housing 1700. For example, the hinge bracket 1702 may receive the frame 902 of the hinge 700. The hinge bracket 1702 may couple to the housing 1700 using one or more fasteners. Additionally, the hinge bracket 1702 may include alignment tabs for positioning or squaring the hinge 700 to the housing 1700.

The housing sub-assembly 104 may further include a motor 1704 that provides rotational movement. In some instances, the motor 1704 may include a brushless DC motor. The brushless motor may reduce a noise during operation, or rotation, of the motor 1704. The motor 1704 may couple to the housing 1700 and the base 112 so as to be interposed between the housing 1700 and the base 112. When actuated, the motor 1704 may cause the housing 1700 to rotate and correspondingly, the display 106 (or the display sub-assembly 102) may be rotated. However, the base 112 may remain stationary.

Discussed in detail herein, one or more loudspeakers may couple to or be disposed within the housing 1700. Computing components of housing sub-assembly 104 may also couple to the housing 1700. For example, the housing sub-assembly 104 may include processors, memory, transformers, etc. mounted to one or more PCBs. These PCBs may couple to the housing 1700 and may include power PCBs, amplifiers for the loudspeakers, a motor PCB for controlling an operation of the motor 1704, and so forth. One or more flex circuits, wires, fibers, cables, and so forth may communicatively couple computing components within the housing sub-assembly 104 and/or to computing components in the display sub-assembly 102.

Figure 18A:
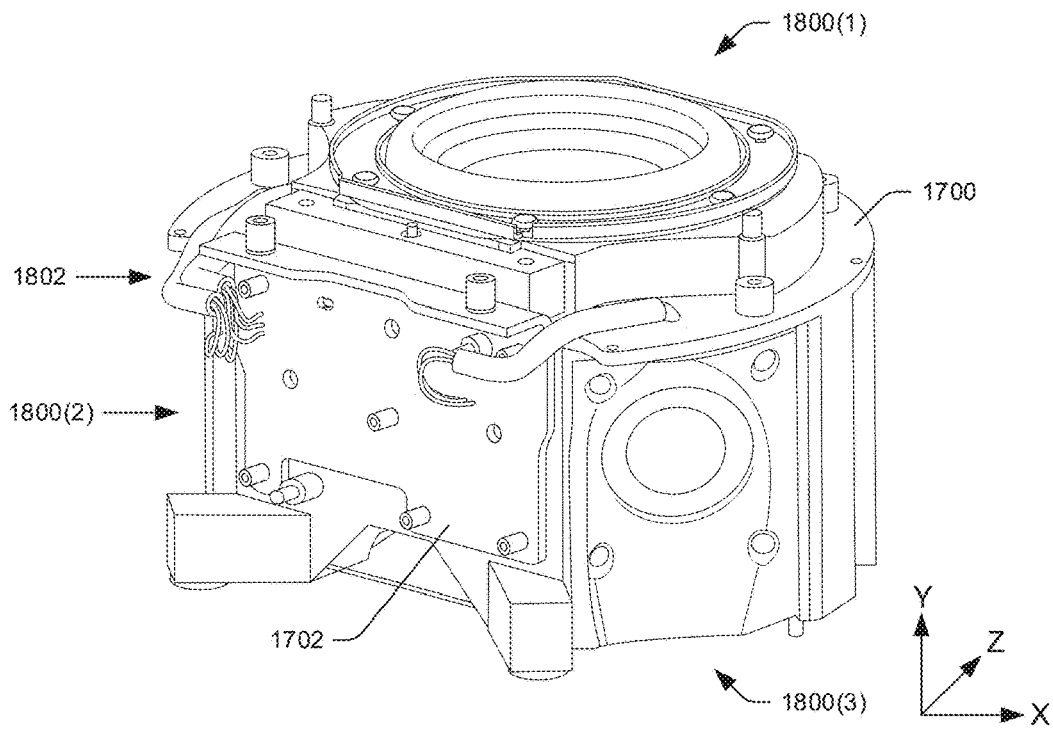
FIG. 18A illustrates a first perspective view of an example housing of the electronic device of FIG. 1, showing example loudspeakers of the electronic device, according to an embodiment of the present disclosure.
Figure 18B:
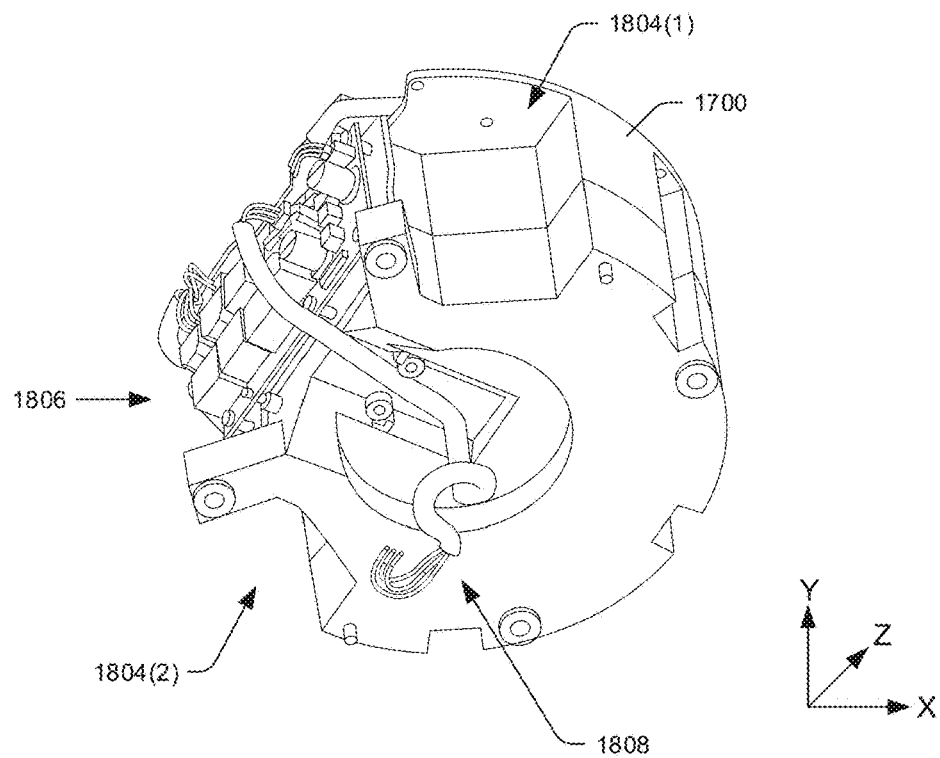
FIG. 18B illustrates a second perspective view of the housing of FIG. 18A, showing the loudspeakers removed, according to an embodiment of the present disclosure.

FIGS. 18A and 18B illustrate various views of the housing 1700, showing example components coupled to the housing 1700. For example, FIG. 18A illustrates example loudspeakers of the electronic device 100. FIG. 18B illustrates the example loudspeakers removed from the housing 1700 to show pockets occupied by the loudspeakers when couple to the housing 1700.

Generally, the housing 1700 may resemble a substantially cylindrical shape that includes surfaces, brackets, mounts, or areas in which components of the electronic device 100 reside. The housing 1700 may also include compartments, enclosures, or cavities for receiving components of the electronic device 100.

In some instances, the electronic device 100 may include a first loudspeaker 1800(1), a second loudspeaker 1800(2), and/or a third loudspeaker 1800(3). The first loudspeaker 1800(1), the second loudspeaker 1800(2), and/or the third loudspeaker 1800(3) may be arranged on the housing 1700 to output audio in different directions relative to electronic device 100 (or the housing 1700) to achieve improved audio characteristics and/or provide stereo or surround-sound effect. For example, the first loudspeaker 1800(1) may couple to a top, or be disposed on the top, of the housing 1700 and arranged to output audio from a top of the electronic device 100. The second loudspeaker 1800(2) and the third loudspeaker 1800(3) may be disposed on opposing sides of the housing 1700. For example, the second loudspeaker 1800(2) may couple to a first side of the housing 1700 and the third loudspeaker 1800(3) may couple to a second side of the housing 1700, opposite the first side of the housing 1700. The second loudspeaker 1800(2) may output audio from a first side of the electronic device 100 (right side) and the third loudspeaker 1800(3) may output audio from a second side of the electronic device 100 (left side).

In some instances, the first loudspeaker 1800(1) may correspond to a subwoofer loudspeaker, while the second loudspeaker 1800(2) and/or the third loudspeaker 1800(3) may correspond to tweeter loudspeakers. When coupled to the housing 1700, the loudspeakers 1800(1)-(3) may project sound outward and away from the electronic device 100. The loudspeakers 1800(1)-(3) may be arranged on the electronic device 100, or on the housing 1700, to provide a stereo or surround-sound effect when sound is output from the loudspeakers 1800(1)-(3). In some instances, the housing 1700 (or an interior thereof) may provide a back volume to one or more loudspeakers of the electronic device 100 (e.g., the first loudspeaker 1800(1)).

FIG. 18A also illustrates the hinge bracket 1702 that couples to the housing 1700. The hinge bracket 1702 may couple to a front of the housing 1700 and may provide a mount for securely coupling the hinge 700 (or the frame 902 of the hinge 700) and the display sub-assembly 102, to the housing 1700. FIG. 18A further illustrates one or more wires 1802 that may route up, through, and/or alongside the housing 1700.

Turning to FIG. 18B, the loudspeakers 1800(1)-(3) are shown removed from the housing 1700. The housing 1700 may include indents, recessions, or pockets within which the loudspeakers reside, or at least partially reside within. For example, the housing 1700 may include a first pocket 1804(1) in which the second loudspeaker 1800(1) resides and a second pocket 1804(2) in which the third loudspeaker 1800(3) resides. The first pocket 1804(1) and the second pocket 1804(2) may include corresponding shapes, sizes, and/or features to receive the second loudspeaker 1800(2) and the third loudspeaker 1800(3), respectively. The first pocket 1804(1) and the second pocket 1804(2) may also dispose the second loudspeaker 1800(2) and the third loudspeaker 1800(3), respectively, at certain angles relative to the housing 1700 such that the second loudspeaker 1800(2) and the third loudspeaker 1800(3) may output sound in certain directions relative to the electronic device 100. The housing 1700 may further include a pocket or cavity for receiving the first loudspeaker 1800(1).

FIG. 18B further illustrates a main PCB 1806 coupled to the front of the housing 1700. In some instances, the main PCB 1806 may couple in front of (Z-direction) or on top of the hinge bracket 1702. The main PCB 1806 may include processor(s), memory, modules, antennas, hardware, circuits, transformers, LEDs, and/or other functional equipment for carrying out an operation of the electronic device 100. The main PCB 1806 may couple to the wires 1802. One or more cables 1808 may also extend from the main PCB 1806 to other components of the electronic device 100, such as components within the base 112.

Figure 19A:
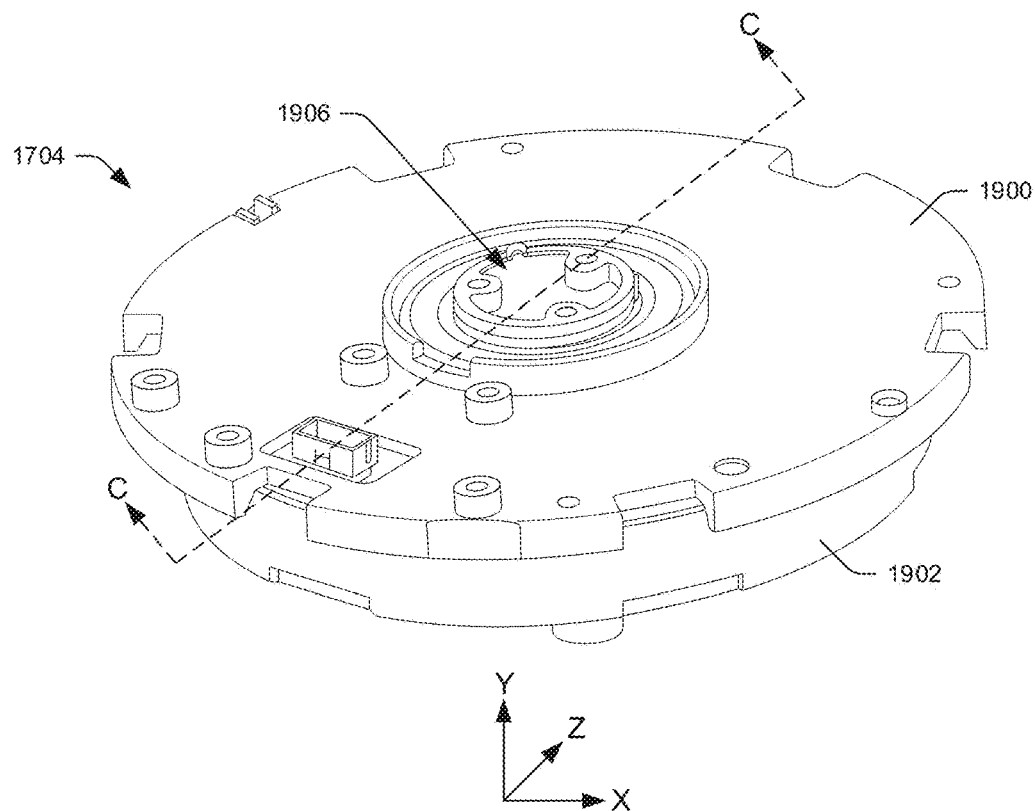
FIG. 19A illustrates a perspective view of an example motor of the electronic device of FIG. 1, according to an embodiment of the present disclosure.
Figure 19B:
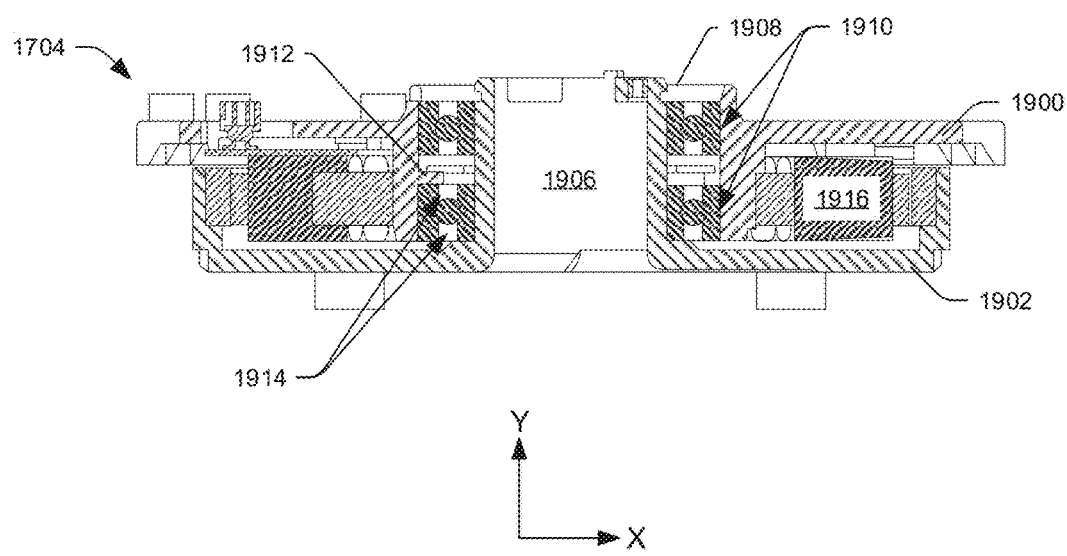
FIG. 19B illustrates a cross-sectional view of the motor of FIG. 19A, taken along line C-C of FIG. 19A, according to an embodiment of the present disclosure.
Figure 19C:
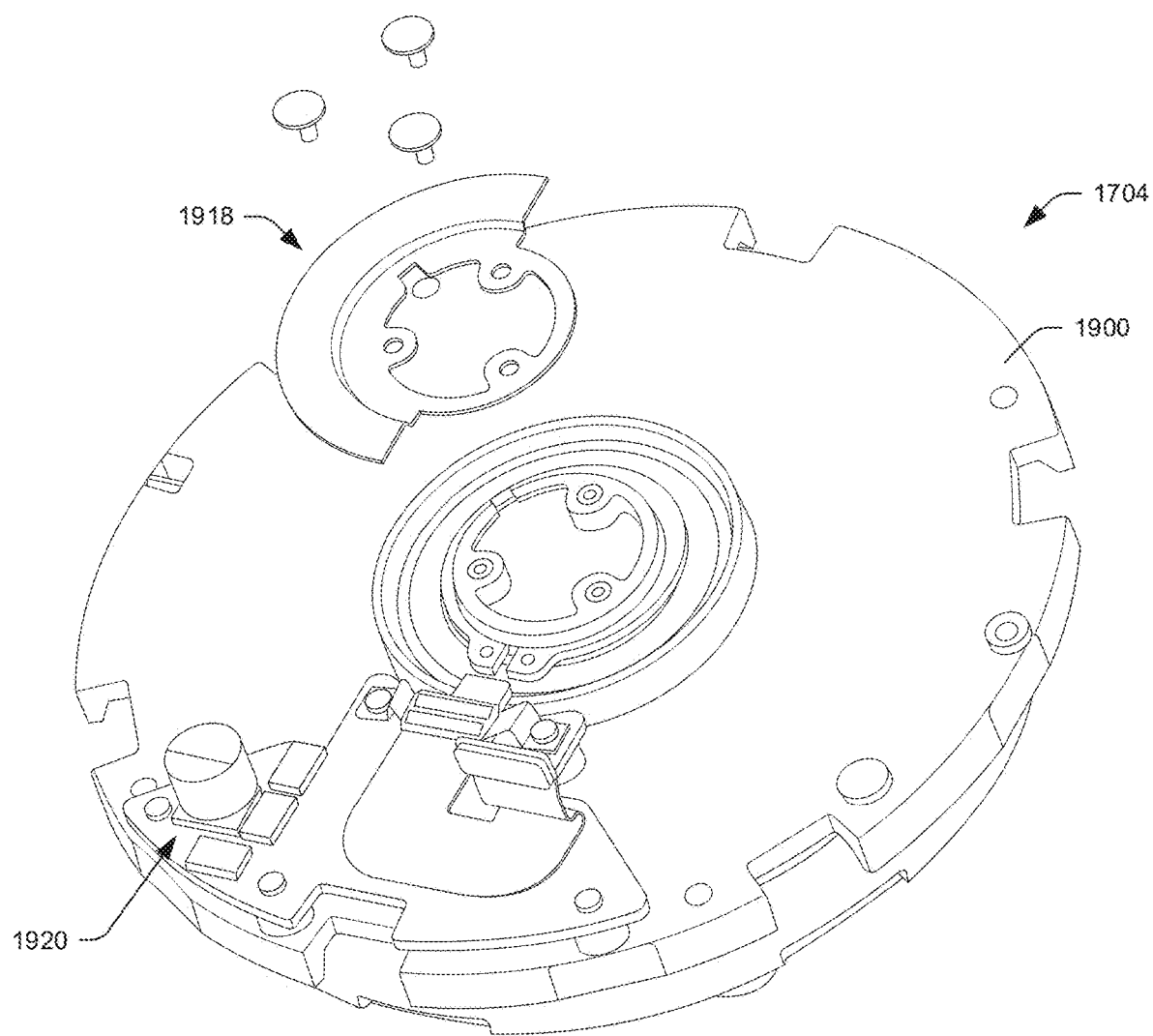
FIG. 19C illustrates a perspective view of the motor of FIG. 19A and an example optical sensor of the electronic device of FIG. 1, according to an embodiment of the present disclosure.
Figure 19C:
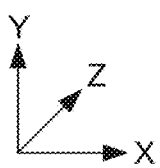

FIGS. 19A, 19B, and 19C illustrate various views of the motor 1704. In some instances, the motor 1704 may include a rotational portion 1900 and a stationary portion 1902. The rotational portion 1900 may be configured to move during an operation of the motor 1704 while the stationary portion 1902 may remain stationary during an operation of the motor 1704. As shown, the rotational portion 1900 may reside above (e.g., Y-direction) the stationary portion 1902. Additionally, the rotational portion 1900 may rotate around and/or within the stationary portion 1902. Generally, the motor 1704 includes a cylindrical or disc shape, however, other shapes are envisioned.

FIG. 19B illustrate a cross-sectional view of the motor taken along line C-C of FIG. 19A. The stationary portion 1902 may include a passageway 1906. However, the passageway 1906 may be formed at least through portions of the rotational portion 1900 and/or the stationary portion 1902. The passageway 1906 provides an area through which one or more wires, cables, or fibers may route for communicatively coupling one or more computing components within the base 112 (or the display 106) to one or more computing components within the housing 1700. Additional details of the passageway 1906 are discussed in FIG. 20, however, as shown, the passageway 1906 may be circular in shape and the rotational portion 1900 may include an opening or collar 1908 that is disposed around the passageway 1906. In some instances, the collar 1908 may be concentric within the passageway 1906 for permitting the rotational portion 1900 to rotate around the passageway 1906.

In some instances, one or more bearings may permit movement between the rotational portion 1900 and the stationary portion 1902. For example, FIG. 19B illustrates that two ball bearings 1910 may be disposed around the passageway 1906 and may assist in the rotational movement of motor 1704 (e.g., about Y-axis). The bearings 1910 may be in stacked relationship to one another. In some instances, the rotational portion 1900 may include shelves or flange(s) 1912 within which, or on which, the bearings 1910 reside.

The bearings 1910 may provide vertical stiffness to the motor 1704 to prevent the motor 1704 from shifting, teetering, or wobbling during a movement or operation of the electronic device 100. In some instances, the motor 1704 (or the bearings 1910) may include springs 1914 that assist in providing the vertical stiffness. In some instances, the springs 1914 may be disposed between the balls of the ball bearings 1910, a gasket of the bearings 1910, the flange(s) 1912, surfaces of rotational portion 1900, and/or surfaces of the stationary portion 1902. As shown, the springs 1914 may be disposed on either side of the bearings 1910.

Given that the rotational portion 1900 couples to the housing 1700 having the loudspeakers, the one or more springs 1914 may serve to prevent vertical movement of the motor 1704 during a firing of the loudspeakers. Preventing this movement may avoid or limit vibrations and/or chattering being imparted to the camera 814, which may increase an image quality of the images being captured. The springs 1914 (or other biasing members) may bias and/or stabilize the rotational portion 1900 in the vertical and/or horizontal direction. In this sense, the springs 1914 may counteract movement generated by the loudspeakers during firing.

The motor 1704, and the cross-section shown in FIG. 19B, further illustrates a coil 1916 that may be used to rotate the electronic device 100. The coil 1916 is shown included within or being mounted to the rotational portion 1900 of the motor 1704, and may encircle at least a portion of the rotational portion 1900. The coil 1916 may be charged or supplied with current via computing components of the electronic device 100. The coil 1916 may interact with magnetic elements disposed on and interior surface of the grill 114, or the coil 1916 may include a magnetic element and the grill 114 (or other portions of the housing 1700 and/or the housing sub-assembly 104) may include coils for causing the motor 1704 to rotate. Once the electronic device 100 is assembled, these magnetic elements may be disposed around the coil 1916 for permitting an operation of the motor 1704 for rotating the electronic device 100.

FIG. 19C illustrates a mechanism utilized to determine a position of the motor 1704 and/or a relative rotational or angular position of the electronic device 100. For example, as the motor 1704 rotates the housing 1700, the angular displacement of the display 106 (or the housing 1700) is adjusted. Knowing the rotational position of the display 106 and/or the housing 1700 permits the electronic device 100 to know which direction to rotate (e.g., clockwise or counterclockwise) to track the user. That is, because the electronic device 100 may have a limited range of rotational movement in both clockwise and/or counterclockwise directions, the electronic device 100 may determine a position of the housing 1700 for use in determining which direction to rotate.

For example, an optical index 1918 may couple to the stationary portion 1902 of the motor 1704 and may remain stationary during a movement of the motor 1704. An optical sensor 1920, however, may couple to the rotational portion 1900 and may rotate during a movement of the motor 1704. In some instances, the optical sensor 1920 may include a light sensor or imaging sensor. FIG. 19C illustrates that the optical index 1918 may include a half-disc shape or half-moon shape disposed on one half (or substantially one half) of the motor 1704. Along this half-moon shaped portion, the optical sensor 1920 may sense the optical index 1918 and determine which half of rotational movement the motor 1704 is disposed. Additionally, the motor 1704 may include encoders for determining an amount of rotational movement. Additionally, or alternatively, hull effect sensors may be used for determining a rotational displacement of the motor 1704 or a degree to which the motor 1704 has rotated.

To further elaborate, the optical sensor 1920 may image the optical index 1918 to know which half of rotation the motor 1704 is located. For example, when the optical sensor 1920 images the optical index 1918, the electronic device 100 may determine that the motor 1704 is rotated to the right (clockwise). An encoder may be used to determine an amount by which the motor 1704 is rotated clockwise. Alternatively, when the motor 1704 is actuated to an opposite side that does not include the optical index 1918, the electronic device 100 may determine that the motor 1704 has rotated to the left (counterclockwise) or is within an opposite half of rotation. The encoder may be used to determine an amount by which the motor 1704 is rotated counterclockwise. Therefore, initially, the optical sensor 1920 may be used to determine on which half (or position) the motor 1704 is rotated to by sensing the optical index 1918 or through a lack of sensing the optical index 1918.

Knowing which half the motor 1704 is rotated within permits the motor 1704 to correctly rotate to follow the user. For example, as the motor 1704 has a limited range of movement and may not be rotatable by 360 degrees, if the motor 1704 is nearing a limit of rotational movement in the clockwise direction and the user moves further in the clockwise direction, the motor may have to rotate substantially 360 degrees in the counterclockwise direction to follow the user. That is, because the motor 1704 cannot further rotate in the clockwise direction the motor 1704 may rotate in the counterclockwise direction. However, to make this determination, the electronic device 100 may utilize a sensing of the optical index 1918 (or a lack thereof) to know rotational parameters. Therefore, the electronic device 100 may use the optical index 1918 to know on which half of rotation the electronic device 100 is, and therein, know which way to rotate. The electronic device 100 may also include a hard stop on the housing 1700, the motor 1704, and/or the base 112 that prevents the motor 1704 from over rotating in clockwise and/or counterclockwise directions.

In some instances, upon initiating of the electronic device 100 (e.g., turning on) the electronic device 100 may move to a reference point or zero degree displacement (e.g., centered between the two half of rotation movement). In this reference point, the electronic device 100 may be capable of rotating substantially 180 degrees clockwise (e.g., 176 degrees) and substantially 180 degrees (176 degrees) counterclockwise. Zeroing the electronic device 100 in this manner may initialize the electronic device 100 for use in determining the rotational parameters. The electronic device 100 may utilize the optical index 1918 for knowing which may to rotate to reach the reference point.

In some instances, the optical sensor 1920 may have a resolution of between 0.1 degrees and 0.3 degrees. Additionally, when powered off and/or powered on, the electronic device 100 (or the motor 1704) may be configured to be mechanical rotated by the user. Upon powering, the motor 1704 may rotate to the reference point via imaging, or a lack thereof, of the optical index 1918.

Figure 20:
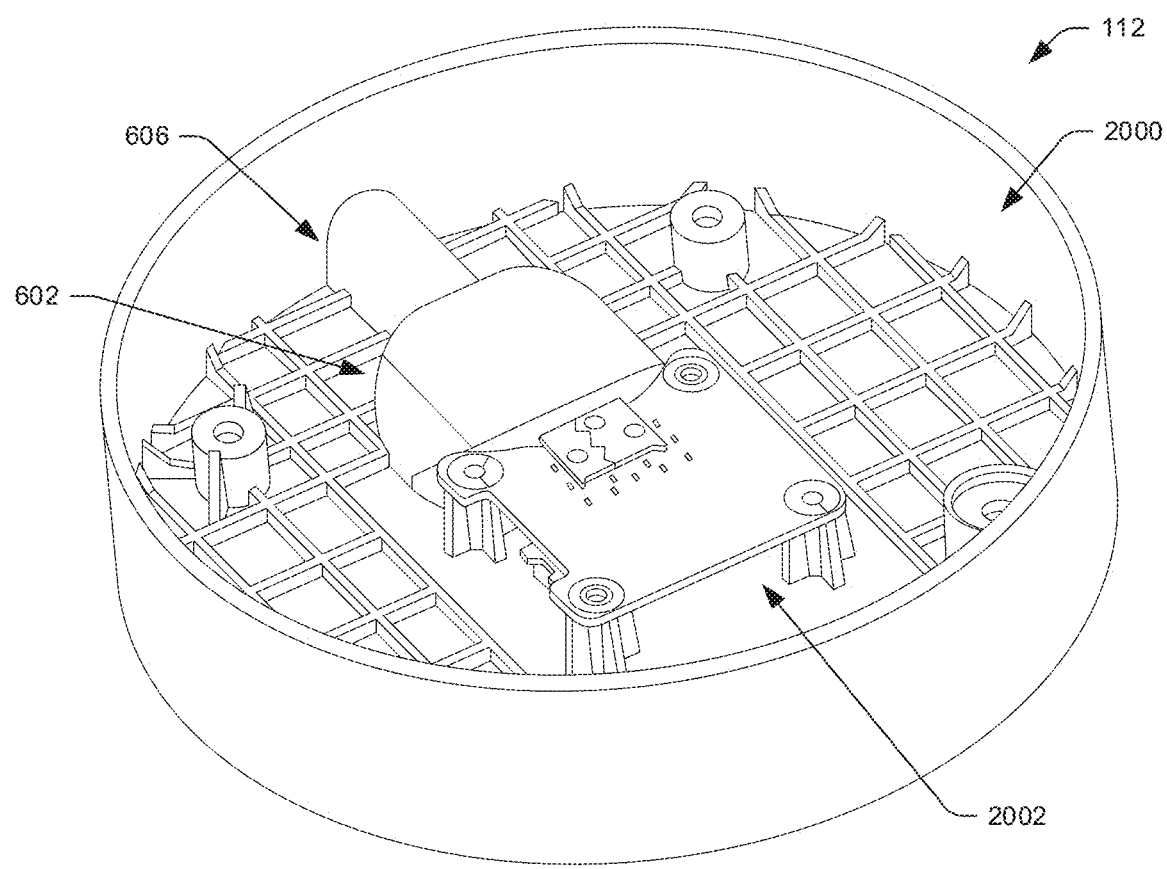
FIG. 20 illustrates a perspective view of an example base of the electronic device of FIG. 1, according to an embodiment of the present disclosure.
Figure 20:
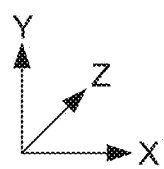

FIG. 20 illustrates an interior 2000 of the base 112. As shown, in some instances, the base 112 may comprise a generally circular shape and the interior 2000 may be substantially hollow. The base 112 also includes features for routing the power cord 604, for instance, to a power PCB 2002 of the electronic device 100. That is, the base 112 provides the cavity 602 and the channel 606 for routing the power cord 604 to the power PCB 2002. These features allow the electronic device 100 to sit flush and securely upon surfaces. As shown, the power PCB 2002 may couple to the base 112, within the interior 2000.

In some instances, the base 112 may additionally or alternatively include additional components (e.g., microphones, processors, antennas, radios, circuitry, light sources, etc.). Furthermore, the base 112 or other portions of the electronic device 100, such as the display 106, may include one or more additional ports, such as audio jacks and/or a USB port. Moreover, in some instances, the electronic device 100 may include a rechargeable battery for cordless operation. In some instances, the electronic device 100 may be capable of wirelessly transmitting power and/or signals between components within the housing 1700 and the base 112.

Figure 21:
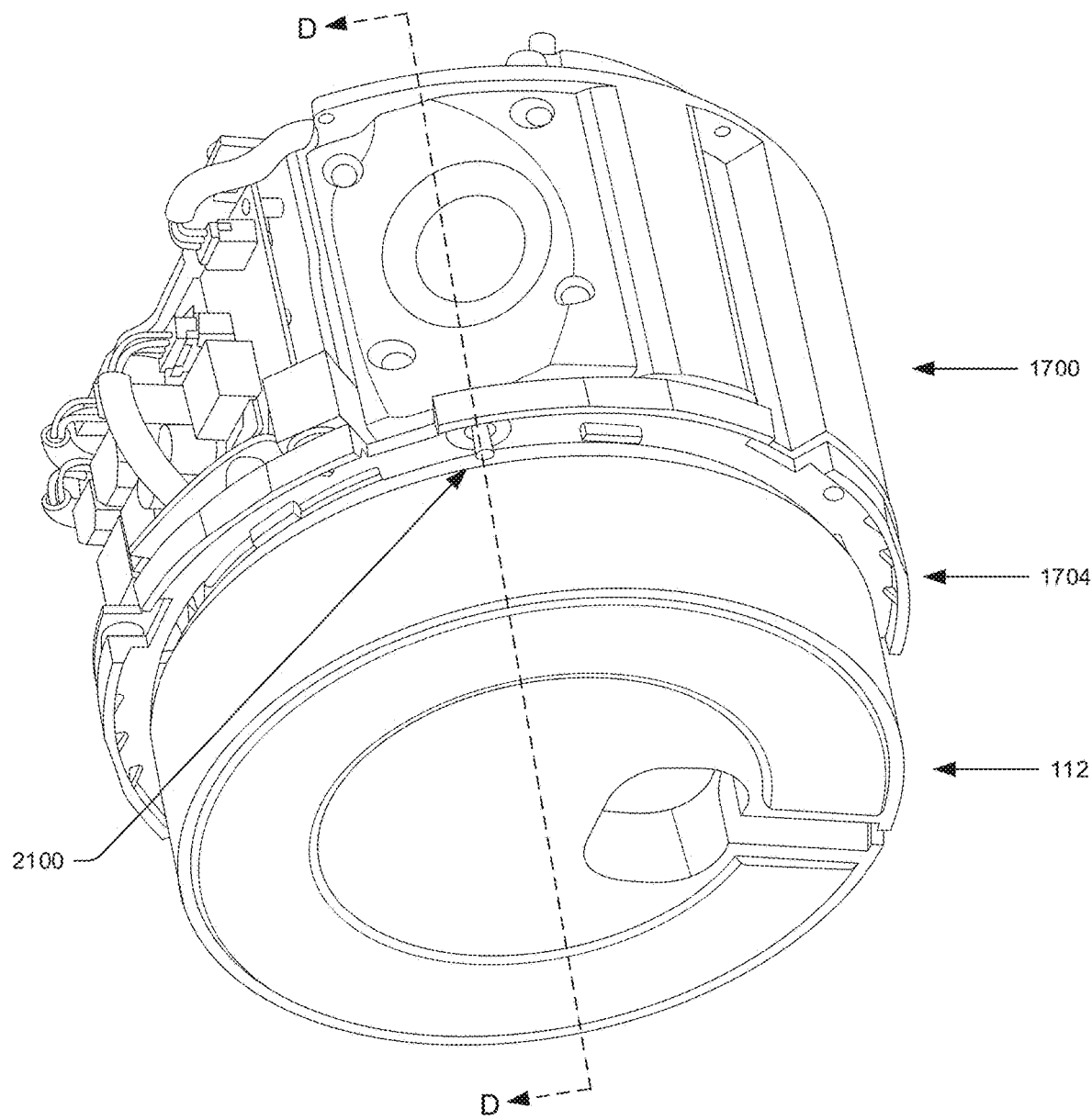
FIG. 21 illustrates a perspective view of a partially assembled electronic device of FIG. 1, showing the base of FIG. 20 coupled to the motor of FIG. 19A, and the motor of FIG. 19A coupled the housing of FIG. 18A, according to an embodiment of the present disclosure.

FIG. 21 illustrates the housing 1700, the motor 1704, and the base 112 being coupled together. The housing 1700 may couple to the rotational portion 1900 of the motor 1704 and the base 112 may couple to the stationary portion 1902 of the motor 1704. When the electronic device 100 rotates, the base 112 remains stationary while the housing 1700 (and the display 106) rotate.

The housing 1700 and the base 112 may be communicatively coupled via one or more wires, optical fibers, connectors, and so forth, to exchange processing and/or distribute power, for instance (e.g., the cables 1808). For example, the housing 1700 may include the loudspeakers 1800(1)-(3), while the base 112 may receive power (e.g., via the power PCB 2002, one or more ports, plugs, jacks, etc.) that is supplied to the loudspeakers 1800(1)-(3) and/or other components (e.g., microphones, processors, antennas, radios, circuitry, light sources, etc.) of the electronic device 100. Electronics of the electronic device 100 may therefore be disposed on both sides of the motor 1704.

To conceal the wires, for instance, the wires may extend through an interior of the motor 1704, within the passageway 1906. For example, as discussed above with regard to FIGS. 19A, 19B, and 19C, the motor 1704 may include the passageway 1906 that communicatively couples the housing 1700 (and/or components therein) with the base 112 (and/or components therein). The cables 1808 route through the motor 1704, via the passageway 1906, to communicatively couple components of the electronic device 100.

The housing 1700, the motor 1704, and/or the base 112 may include attachment mechanisms and/or alignment mechanisms for engaging or coupling with corresponding attachment mechanisms on one another. For example, attachment mechanisms of the housing 1700 may couple to or engage with attachment mechanism of the rotational portion 1900 of the motor 1704, while attachment mechanisms of the base 112 may couple to or engage with attachment mechanisms of the stationary portion 1902 of the motor 1704. In some instances, coupling of the housing 1700, the motor 1704, and/or the base 112 may additionally or alternatively come by way of fasteners (e.g., screws), adhesives, welding, and so forth.

FIG. 21 further illustrates a hard stop 2100 that may protrude from the housing 1700. In some instances, hard stop 2100 may represent a pin or protrusion that extends from the housing 1700 and which engages with features (e.g., stops) of the motor 1704 (e.g., the rotating portion 1900). Additionally, or alternatively, the hard stop 2100 may extend from the motor 1704 (e.g., the rotating portion 1900) and engage with features of the housing 1700. Regardless, the hard stop 2100 may be used to indicate an end of rotation in either clockwise and/or counterclockwise directions to prevent over rotation of the motor 1704.

Figure 22:
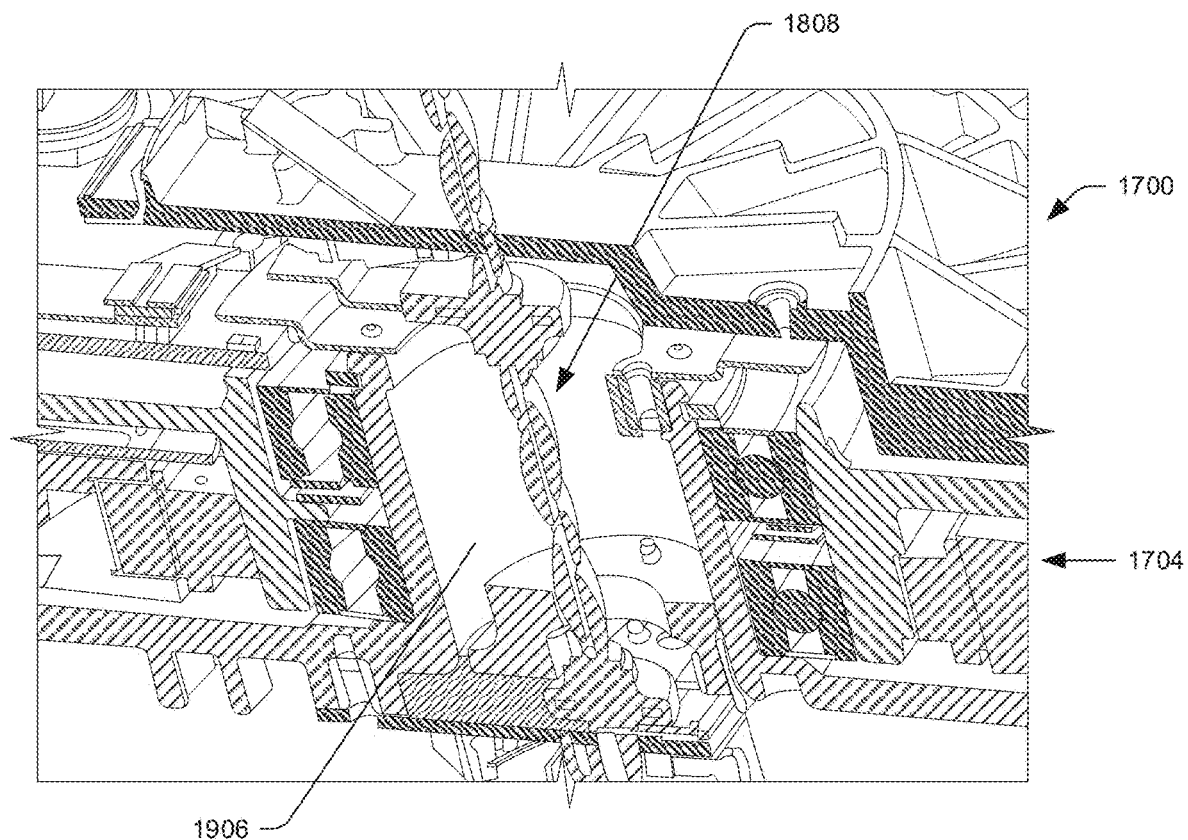
FIG. 22 illustrates a partial cross-sectional view of the housing of FIG. 17, taken along line D-D of FIG. 21, showing wires routed through the motor of FIG. 19A, according to an embodiment of the present disclosure.
Figure 22:
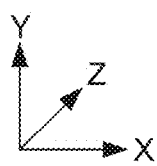

FIG. 22 illustrates a cross-sectional view of the electronic device 100, taken along line D-D of FIG. 21. As shown, the cables 1808 may extend through the passageway 1906 of the motor 1704. In some instances, the cables 1808 may include three cables, where two of the cables route power and one of the cables is used to transmit and receive signals. FIG. 22 illustrates a particular embodiment of the cables 1808 that may resist degradation or wear during the rotational movement of the motor 1704, however, other embodiments are envisioned. For example, the cables 1808 may include helical wires and/or cables that are helically wound and which coil and/or uncoil during a rotation of the motor 1704. In some instances, additionally, or alternatively, the cables 1808 may be overmolded and/or the motor 1704 and/or the cables 1808 may include a clockspring.

Furthermore, the cables 1808 may not be wound together, as shown in FIG. 22, but may include separate wires that traverse the passageway 1906. These wires may be twisted or straight wires. Additionally, the cables 1808 and/or the individual wires may include strands that are wound together, as compared to a single wire. The stranded wires may increase a strength and flexibility of the cables, wires, or chords that route through the passageway 1906. Additionally, or alternatively, in some instances, one or more FPCs may be routed through the passageway 1906. The FPCs may be bent and/or coiled into a helix shape.

In some instances, a slip ring may be used for permitting the electronic device 100 to rotate 360 degrees. In such instances, the slip ring may replace the need for the cables 1808 and power and signals may be routed through the slip ring.

Figure 23:
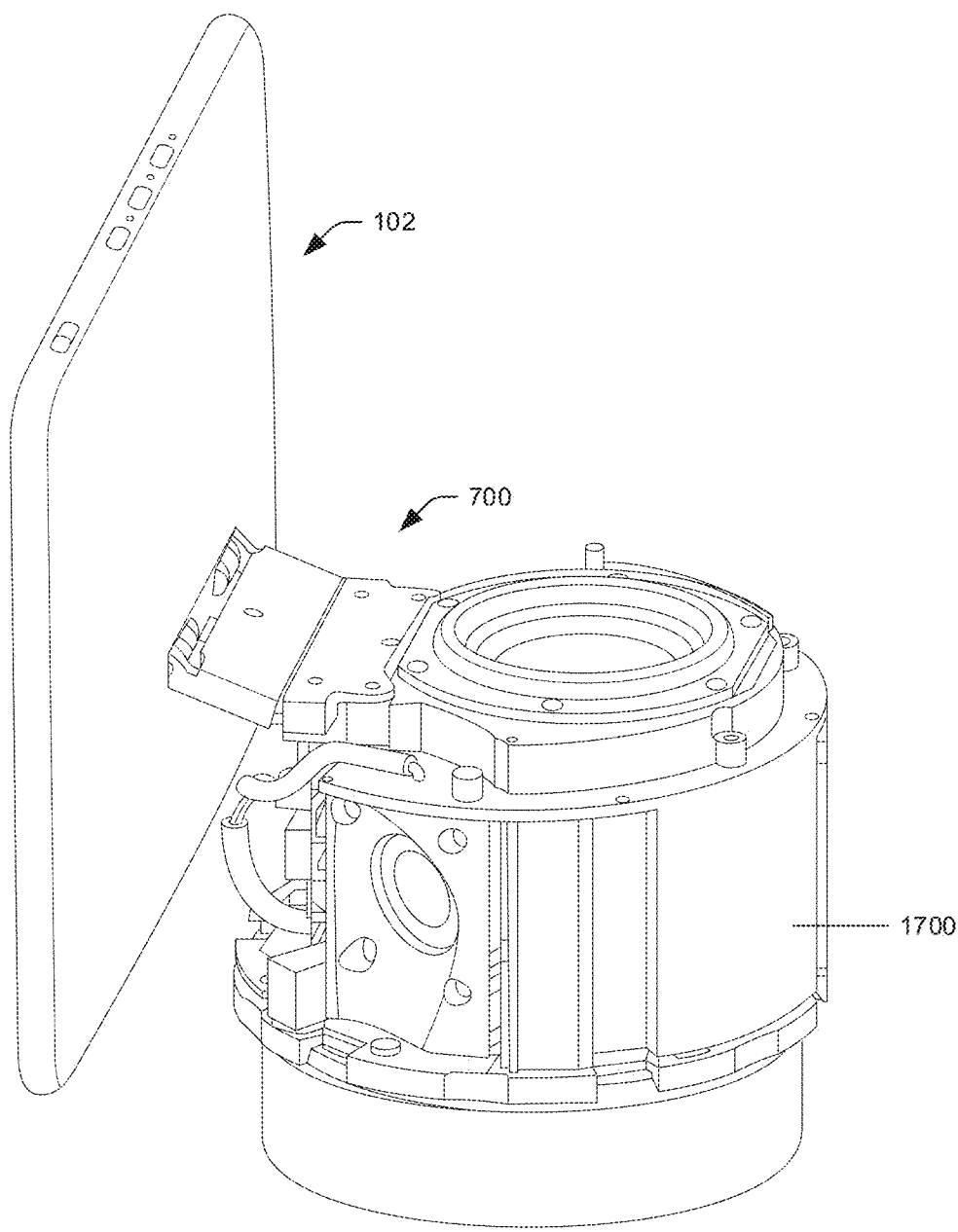
FIG. 23 illustrates a perspective view of a partially assembled electronic device of FIG. 1, showing the display of FIG. 14 coupled to the housing of FIG. 17, according to an embodiment of the present disclosure.

FIG. 23 illustrates a coupling of the display sub-assembly 102 to the housing sub-assembly 104 via the hinge 700. Discussed above, the bracket 900 portion of the hinge 700 may couple to the display sub-assembly 102 (e.g., the midframe 800) while the frame 902 portion of the hinge 700 may couple to the housing 1700. In some instances, the frame 902 may couple to the housing 1700, or the hinge bracket 1702, via fasteners (e.g., screws). Additionally, one or more alignment elements on the frame 902 and/or the housing 1700 may position the hinge 700 to and/or on the housing 1700.

Figure 24C:
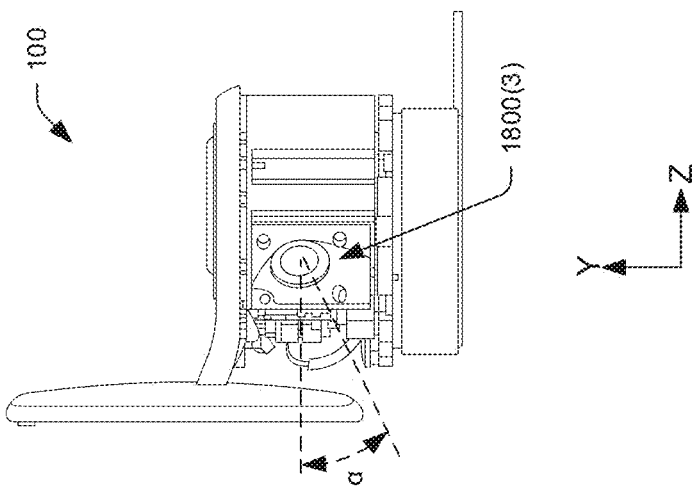
FIG. 24C illustrates a side view of a partially assembled electronic device of FIG. 1, showing example loudspeakers of the electronic device, according to an embodiment of the present disclosure.
Figure 24B:
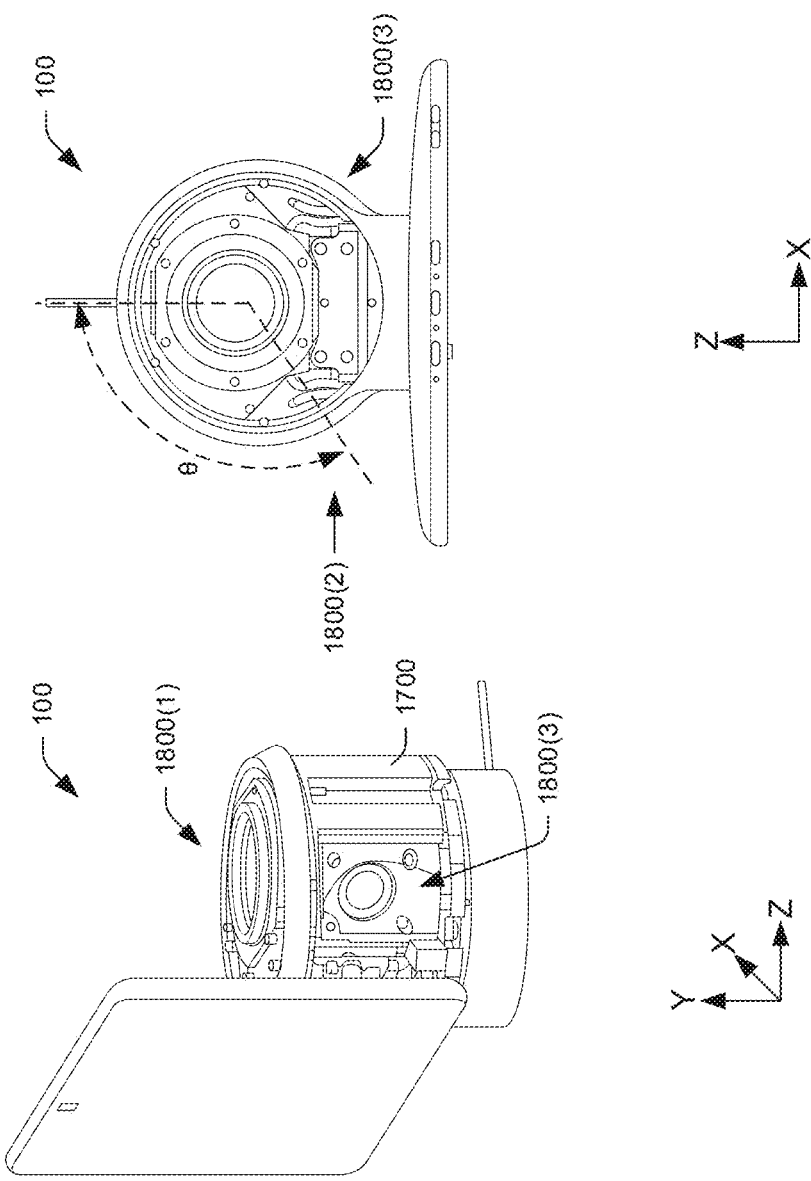
FIG. 24B illustrates a top view of a partially assembled electronic device of FIG. 1, showing example loudspeakers of the electronic device, according to an embodiment of the present disclosure.
Figure 24A:
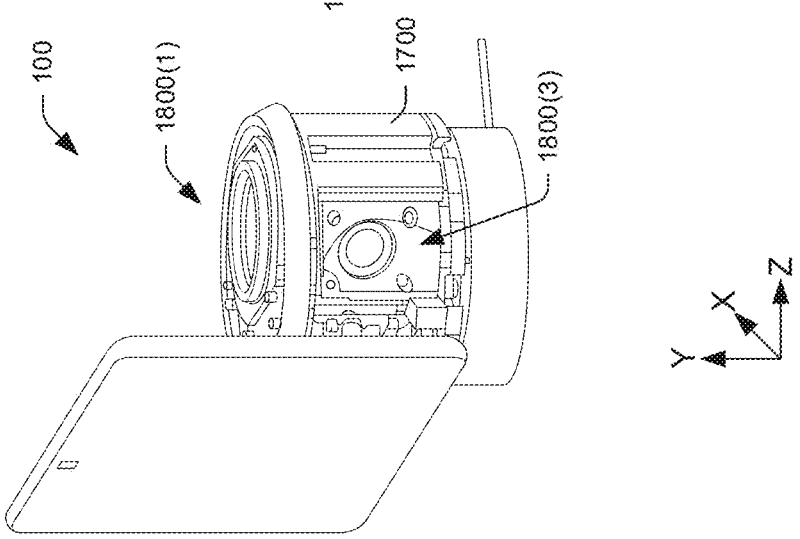
FIG. 24A illustrates a perspective view of a partially assembled electronic device of FIG. 1, showing example loudspeakers of the electronic device, according to an embodiment of the present disclosure.

FIGS. 24A, 24B, and 24B illustrate various views of the electronic device 100, showing one or more loudspeakers of the electronic device 100. In some instances, the electronic device 100 may include three loudspeakers, such as a first loudspeaker 1800(1), a second loudspeaker 1800(2), and/or a third loudspeaker 1800(3). The first loudspeaker 1800(1), the second loudspeaker 1800(2), and the third loudspeaker 1800(3) may be coupled to the housing 1700 and/or at least partially reside within the housing 1700.

As shown, the first loudspeaker 1800(1) may reside on a top of the housing 1700 and may be oriented to emit sound outward from the top of the electronic device 100. In some instances, the first loudspeaker 1800(1) may include a subwoofer loudspeaker. Furthermore, as shown in FIG. 24B, in some instances the first loudspeaker 1800(1) may be displaced backward (Z-direction) from a central longitudinal axis (X-Z axis) of the housing 1700. For example, a central longitudinal axis of the first loudspeaker 1800(1) may not be concentric with the central longitudinal axis of the housing 1700. Offsetting the first loudspeaker 1800(1) in this manner, towards a back of the electronic device 100, may counteract or counterbalance a weight of the display 106. That is, by the first loudspeaker 1800(1) may prevent the electronic device 100 from tipping over from a weight of the display 106. The first loudspeaker 1800(1) may be oriented perpendicularly to the X, Y, and/or Z plane.

The second loudspeaker 1800(2) and the third loudspeaker 1800(3) may be radially arranged around the first loudspeaker 1800(1), and may be disposed on opposite sides of the electronic device 100 (or the housing 1700). For example, the second loudspeaker 1800(2) may be disposed on a first side of the electronic device 100 and the third loudspeaker 1800(3) may be disposed on a second side of the electronic device 100, opposite the first side. The second loudspeaker 1800(2) and/or the third loudspeaker 1800(3) may include tweeter loudspeakers.

In some instances, the second loudspeaker 1800(2) and/or the third loudspeaker 1800(3) may be oriented at different angles relative to the central longitudinal axis (or plane) of the housing 1700 to radially disperse sound away from the electronic device 100. Orientating the second loudspeaker 1800(2) and/or the third loudspeaker 1800(3) may increase audio characteristics of the electronic device 100. For example, referring to FIG. 24B, the second loudspeaker 1800(2) and/or the third loudspeaker 1800(3) may be disposed at an angle $\theta$ relative to a vertical plane (Y-plane) disposed through a center of the housing 1700 (or relative to a central longitudinal axis extending through the housing 1700). In some instances, the angle $\theta$ may be approximately or substantially 100 degrees. However, in some instances, the angle $\theta$ may be greater than or less than 100 degrees. Horizontally disposing the second loudspeaker 1800(2) and/or the third loudspeaker 1800(3) in this manner may allow sound generated by the second loudspeaker 1800(2) and/or the third loudspeaker 1800(3) to emit around the display 106 (e.g., avoid the sound hitting the back 1608 of the display 106 or the rear cover 110).

Additionally, or alternatively, referring to FIG. 24C, the second loudspeaker 1800(2) and/or the third loudspeaker 1800(3) may be disposed at an angle $\alpha$ relative to a horizontal plane (Z-plane) (or relative to a top of the housing 1700). Although FIG. 24C only illustrates the third loudspeaker 1800(3), it is to be understood that the second loudspeaker 1800(2) may be disposed at a similar angle as the third loudspeaker 1800(3). In some instances, the angle $\alpha$ may be approximately or substantially 10 degrees. However, in some instances, the angle $\alpha$ may be greater than or less than 10 degrees. Vertically disposing the second loudspeaker 1800(2) and/or the third loudspeaker 1800(3) in this manner may allow sound generated by the second loudspeaker 1800(2) and/or the third loudspeaker 1800(3) to emit around the display 106. Additionally, sound generated by the second loudspeaker 1800(2) and/or the third loudspeaker 1800(3) may be directed toward a surface on which the electronic device 100 resides. Sound generated by the second loudspeaker 1800(2) and/or the third loudspeaker 1800(3) may bounce or deflect off the surface to provide enhanced audio characteristics.

In some instances, the loudspeakers may be oriented to fire in additional or alternative directions than illustrated and/or the loudspeakers may include other types of loudspeakers. For example, the electronic device 100 may include one or more mid-range loudspeakers.

Figure 25A:
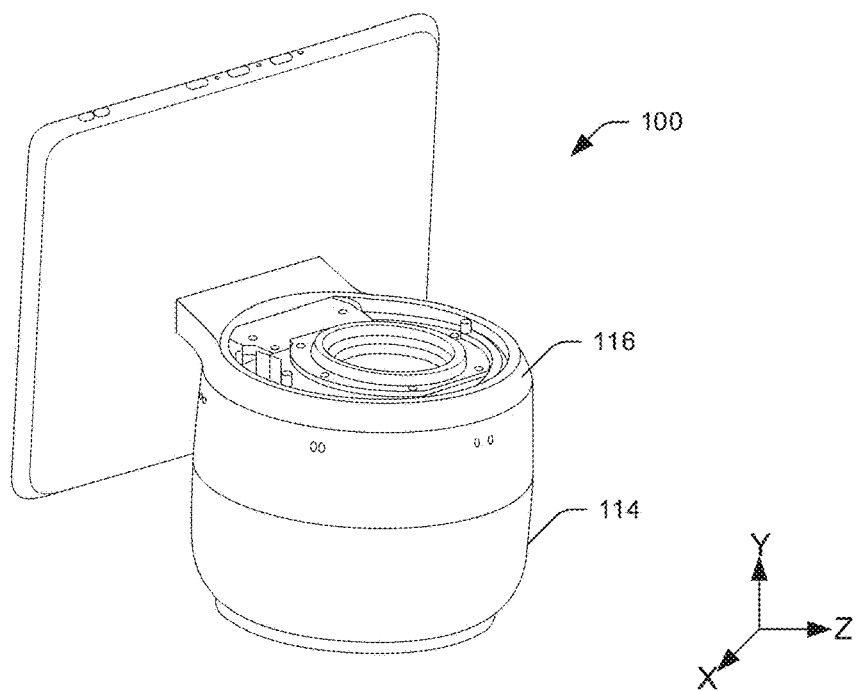
FIG. 25A illustrates a first rear perspective view of a partially assembled electronic device of FIG. 1, showing an example band and an example grill coupled to the housing of FIG. 17, according to an embodiment of the present disclosure.
Figure 25B:
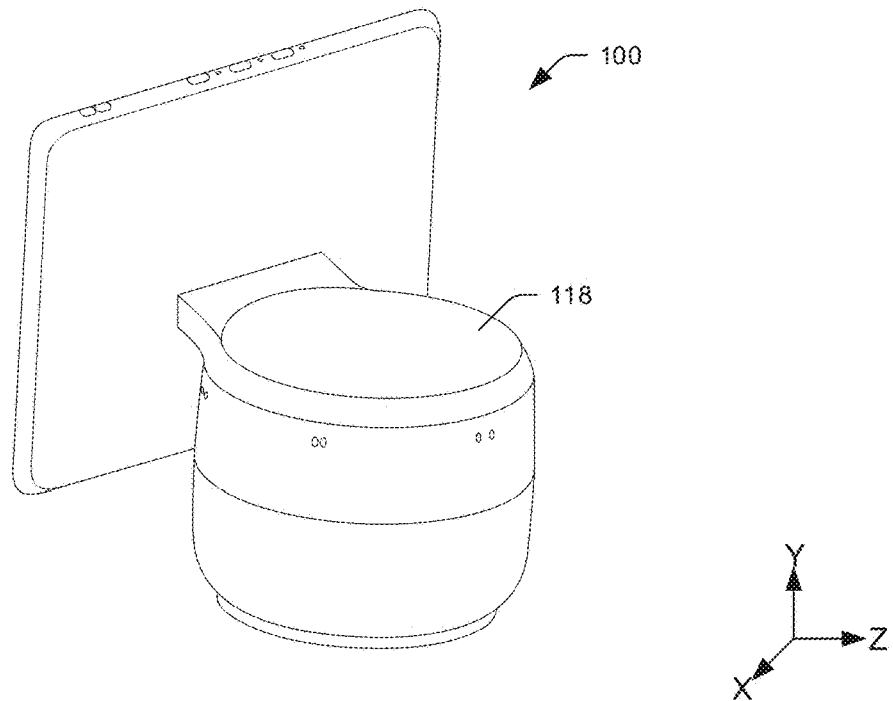
FIG. 25B illustrates a second rear perspective view of the electronic device of FIG. 1, showing an example cover coupled to the housing of FIG. 17, according to an embodiment of the present disclosure.

FIGS. 25A and 25B illustrate perspective views of the electronic device 100. In FIG. 25A, the grill 114 and the band 116 are shown coupled to the housing 1700, while in FIG. 25B the top cover 118 is further shown coupled to the housing 1700. In some instances, the grill 114, the band 116, and/or the top cover 118 may couple to the housing 1700 via fasteners, adhesives, snap fit, pressure fit, magnets, etc. The band 116 may conceal wires, fibers, cable (e.g., the flex circuit 816) communicatively coupling the display sub-assembly 102 and the housing sub-assembly 104. Once coupled, the grill 114, the band 116, and/or the top cover 118 may at least partially provide the exterior surface of the electronic device 100.

When coupled to the electronic device 100, the grill 114 may be disposed adjacent to the second loudspeaker 1800(2) and the third loudspeaker 1800(3) (e.g., in front of, over, etc.). Similarly, when coupled to the electronic device 100, the top cover 118 may be disposed adjacent to the first loudspeaker 1800(1) (e.g., above). The grill 114 and/or the top cover 118 may include loudspeaker cloth, acoustic fabric, acoustic cloth, grill cloth, and/or speaker mesh to prevent the collection of dust or other debris on the loudspeakers and to allow sound to pass therethrough. Accordingly, when the first loudspeaker 1800(1), the second loudspeaker 1800(2), and the third loudspeaker 1800(3) fire, the holes may permit sound to pass through.

The grill 114, the top cover 118, the housing 1700, the base 112, and/or other portions of the electronic device 100 may include alignment elements or other features for aligning the grill 114 and/or the top cover to the housing 1700 of the electronic device 100.

Figure 26:
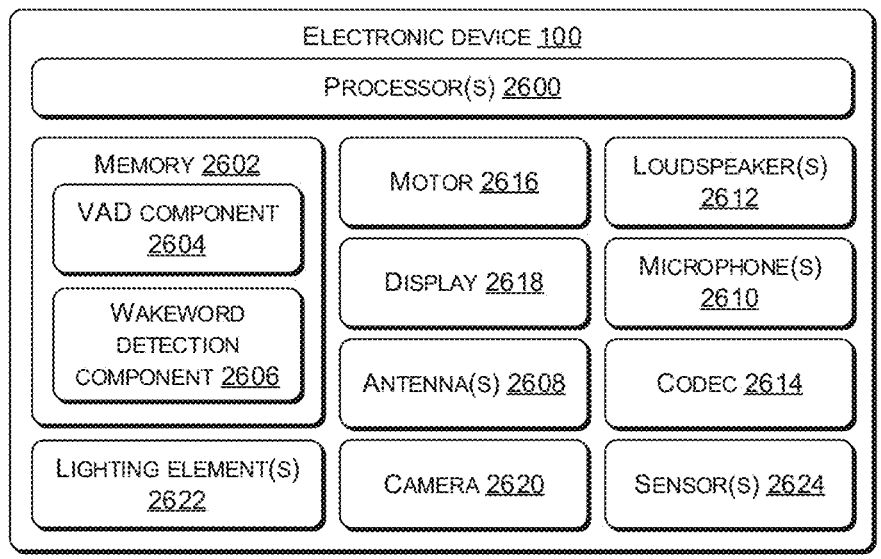
FIG. 26 illustrates example computing components of the electronic device of FIG. 1, according to an embodiment of the present disclosure.

FIG. 26 illustrates selected functional components of the electronic device 100. The electronic device 100 may include one or more processor(s) 2600 and memory 2602, which stores or otherwise has access to a voice activity detection (VAD) component 2604 and/or a wakeword detection component 2606. The electronic device 100 may use various techniques to detect user speech and determine voice commands issued by a user. The VAD component 2604 and/or the wakeword detection component 2606 may work in conjunction with other components of the electronic device 100. For example, the one or more processor(s) 2600 of the electronic device 100 may convert captured audio into audio data, and process the audio data with the VAD component 2604 and/or the wakeword detection component 2606.

The VAD component 2604 may utilize one or more VAD algorithms based on channel energy with long-term and short-term energies, sub-band long- and short-term energies with combination logic, Deep Neural Network (DNN) based VADs, or any other type of VAD algorithms, with hangover windows, to determine whether the audio signal represents user speech.

The wakeword detection component 2606 may be utilized to detect predetermined utterances, voice commands, and/or wake words within user speech. Such process may be referred to as keyword detection, with the wake word being a specific example of a keyword. For instance, in capturing and generating audio data, the audio data is analyzed to determine if specific characteristics of the user speech match preconfigured acoustic waveforms, audio signatures, keyword-spotting technology, ASR techniques, or other expression detectors "matches" stored audio data corresponding to a keyword. Additionally, or alternatively, the wakeword detection component 2606 may include application program interfaces (APIs), speech-processing application(s), a digital signal processor, and/or other components to detect commands and wake words uttered by a user. The wakeword detection component 2606 may therefore detect a predefined trigger expression or words (e.g., "awake," "Alexa," etc.), which may be followed by instructions or directives (e.g., "please play song A," "please give me directions to the grocery store," "enable walkie-talkie mode," etc.).

In some instances, the electronic device 100 may format or otherwise prepare the audio data for speech processing upon detecting the wake word. Formatting the audio data may include, for example, audio beamforming, signal optimization, and/or associating metadata with the audio data. In some instances, the audio data including the user speech and/or the wake word may be tagged or indications may otherwise be provided along with the audio data indicating which portion of the audio data corresponds to the wake word and/or which portion of the audio data represents the remainder of the user utterance.

In some instances, the electronic device 100 may transmit the audio data to remote computing resource(s) for speech processing. Accordingly, once the wake word is detected, the electronic device 100 may begin transmitting audio data corresponding to audio captured at the electronic device 100. Audio data corresponding to that audio may be sent to remote computing resource(s) for interpreting the user speech (either for purposes of enabling voice-communications and/or for purposes of executing a command in the speech), as will be discussed herein.

The electronic device may include antenna(s) 2608 (e.g., the antenna(s) 804) to communicate over a network to directly or indirectly send and receive data with various computing devices, such as mobile phones, the remote computing resource(s), etc. The antenna(s) 2608 may enable the electronic device 100 to communicate over any type of network, such as wireless networks (e.g., Wi-Fi, Bluetooth, Personal Area Networks, Wide Area Networks, and so forth).

The electronic device may include one or more microphone(s) 2610 (e.g., the microphones 1602) to capture user speech and generate audio data associated with user utterances and/or commands. In some instances, the microphone(s) 2610 may include multiple microphones arranged in a diamond-shaped pattern for discerning a direction of user speech. The microphone(s) 2610 may be arranged about the display sub-assembly 102, in some instances.

The electronic device includes one or more loudspeakers(s) 2612 (e.g., the loudspeakers 1800) to output audio data received from the remote computing resource(s), other devices, and so forth. The loudspeaker(s) 2612 may include tweeter loudspeakers, mid-range loudspeakers, and/or subwoofer loudspeakers. In some instances, the loudspeakers 2612 may be arranged at different angles relative to the electronic device 100 to output sound in different directions.

A codec 2614 may communicatively couple to the microphone(s) 2612 and/or the loudspeaker(s) 2612 to encode and decode audio signals, respectively. The codec 2614 may also convert audio data between analog and digital formats. In some instances, the codec 2614 may encode user speech and transfer the audio data to other components of the electronic device 100, such as the wake word detection component 206.

The electronic device 100 includes a motor 2616 (e.g., the motor 1704) for providing rotational movement to the electronic device 100.

The electronic device 100 further includes a display 2618 for presenting content (e.g., images, videos, etc.) to the user. The display 2618 may be touch sensitive capable of receiving touch input from the user.

A camera 2620 is further provided to capture images of the environment in which the electronic device 100 resides. In some instances, the camera 2620 may include a high-resolution camera. The electronic device 100 may additionally, or alternatively, include a depth sensor, IR sensor, and/or other imagining devices and/or sensors.

Lighting element(s) 2622 may further be provided to output information associated with an operational state of the electronic device 100. Various sensor(s) 2624 may be provided to sense lighting conditions, a position of the motor 2616 and/or the display 2618 (e.g., the optical sensor 1920 and/or the optical index 1918) a speed of the motor 2616, and so forth. The electronic device 100 may further include other hardware, modules, and/or components for carrying out a functionality of the electronic device 100 (e.g., power module, acoustic echo cancellation (AEC) component, beamforming component, PCBs, etc.).

As used herein, a processor, such as processor(s) 2600 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 2602 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 27:
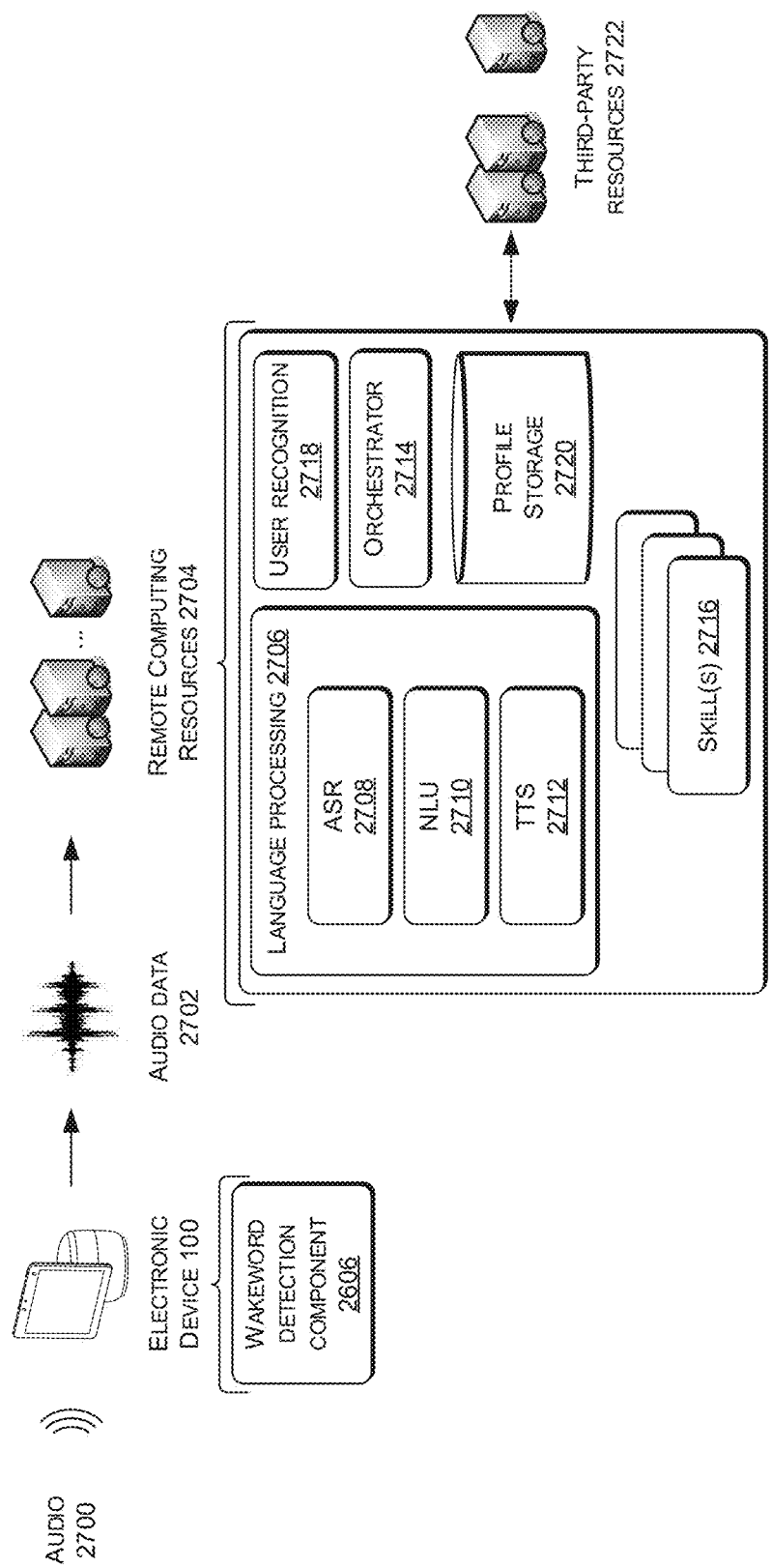
FIG. 27 illustrates a conceptual diagram for language processing, according to an embodiment of the present disclosure.

FIG. 27 is a conceptual diagram of audio capture component(s), such as a microphone or array of microphones, of the electronic device 100. The electronic device 100 captures audio 2700 and the electronic device 100 processes audio data, representing the audio 2700, to determine whether speech is detected. The electronic device 100 may use various techniques to determine whether audio data includes speech. For example, the electronic device 100 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. Additionally, or alternatively, the electronic device 100 may implement a limited classifier configured to distinguish speech from background noise. The classifier may be implemented by techniques such as linear classifiers, support vector machines, and decision trees. In some instances, the electronic device 100 may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. However, other techniques may be used to determine whether speech is present in audio data.

Once speech is detected in audio data representing the audio 2700, the electronic device 100 may use the wakeword detection component 2606 to perform wakeword detection to determine when a user intends to speak an input. An example wakeword is "Alexa." As used herein, a "wakeword" may refer to a single word or more than one consecutive words in speech and different wakewords other than "Alexa" may be recognized. The wakeword detection component 2606 may also recognize more than one wakeword for performing different functionalities.

Wakeword detection is typically performed without performing linguistic analysis, textual analysis, or semantic analysis. Instead, the audio data, representing the audio 2700, is analyzed to determine if specific characteristics of the audio data match preconfigured acoustic waveforms, audio signatures, or other data to determine if the audio data "matches" stored audio data corresponding to a wakeword.

Thus, the wakeword detection component 2606 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 2606 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the electronic device 100 may "wake" and begin transmitting audio data 2702, representing the audio 2700, to remote computing resources 2704. The audio data 2702 may include data corresponding to the wakeword, or the electronic device 100 may remove the portion of the audio corresponding to the wakeword prior to sending the audio data 2702 to the remote computing resources 2704.

The remote computing resources 2704 may include a language processing components 2706 (e.g., speech processing components). The language processing components 2706 may include an automatic speech recognition (ASR) component 2708 a natural language understanding (NLU) component 2710, and a text-to speech (TTS) component 2712. The ASR component 2708 may transcribe audio data into one or more ASR hypotheses embodied in ASR output data. For example, the ASR component 2708 may transcribe one or more different textual or symbolic representations of the speech contained in the audio data 2702. The ASR output data can include a ranked list of ASR hypotheses or the top-scoring ASR hypothesis when multiple ASR hypotheses are generated for a single natural language input. The ASR output data may be used by various components of the remote computing resources 2704 for various purposes. A top-scoring ASR hypothesis (and/or other ASR hypotheses), which includes the text data or symbolic data corresponding to the most likely transcription of the audio data 2702 may be sent from the ASR component 2708 to the NLU component 2710.

The NLU component 2710 receives the ASR output data and interprets the ASR output data to determine one or more NLU hypotheses embodied in NLU output data. For example, NLU results data may include one or more different intents and entities contained in the transcribed audio data. The NLU output data may include a ranked list of NLU hypotheses or the top-scoring NLU hypothesis when multiple NLU hypotheses are generated for a single natural language input. The NLU output data may be used by various components of the remote computing resources 2704 for various purposes. A top-scoring NLU hypothesis (and/or other NLU hypotheses), which includes NLU output data such as the intent data and/or entity data corresponding to the most likely interpretation of the user input (such as represented by audio data 2702) may be sent from the NLU component 2710 to an orchestrator 2714 for forwarding to other components of the remote computing resources 2704 for processing. Further details of the operation of the NLU component 2710 are described below in FIG. 28.

The remote computing resources 2704 may include one or more skill(s) 2716. A skill may be software running on the remote computing resources 2704 that is akin to a software application running on a traditional computing device. That is, skill(s) 2716 may enable the remote computing resources 2704 to execute user commands involving specific functionality in order to provide data or produce some other requested output. The remote computing resources 2704 may be configured with more than one skill(s) 2716. A skill 2716 may operate in conjunction between the computing resources 2704 and other devices, such as the electronic device 100, in order to complete certain functions. Inputs to a skill 2716 may come from speech processing interactions or through other interactions or input sources. A skill 2716 may include hardware, software, firmware, or the like that may be dedicated to a particular skill 2716 or shared among different skills 2716.

In some examples, the skill 2716 may perform an action by interacting with other computing resources, databases, other software, and/or the like. For example, the skill 2716 may send an instruction to third-party computing resources to execute specific functionality in order to provide data or perform some other action requested by a user. In some instances, the skill 2716 may send a request for data (e.g., request for information) to the third-party computing resources and may receive the requested data from the third-party computing resources that enables the skill 2716 to perform an action requested by the user. In other examples, the skill 2716 may send an instruction to the third-party computing resources and the third-party computing resources may perform the action requested by the user. By way of example, a weather skill may enable the electron device 100 to provide weather information.

The remote computing resources 2704 may communicate with third-party computing resources, databases, and so forth via Hypertext Transfer Protocol (HTTP) or HTTPS over one or more computer networks (e.g., Internet), although the disclosure is not limited thereto. In some cases, communication between the remote computing resources 2704 and the third-party computing resources occurs over one or more third-party network (e.g., a computer network maintained by a provider not associated with the remote computing resources 2704 or the third-party computing resources other than by use of the third-party network.

Additionally, or alternatively, a skill 2716 may be implemented by the electronic device 100. This may enable the electronic device 100 to execute specific functionality in order to provide data or perform some other action requested by a user. The electronic device 100 may host a skill 2716 in the form of an application or application executing on the electronic device 100 or another device. Such a device may include, for example, a mobile device on a mobile network or a local area network (LAN).

A skill may be configured to execute with respect to NLU output data. For example, for NLU results data including a <GetWeather> intent, a weather skill may determine weather information for a geographic location represented in a user profile or corresponding to a location of the electronic device 100 that captured a corresponding natural language input. A skill 2716 may operate in conjunction with the remote computing resources 2704, the third-party resources 2722, and/or other devices in order to complete certain functions. Inputs to a skill 2716 may come from speech processing interactions or through other interactions or input sources.

A skill 2716 may be associated with a domain. A non-limiting list of illustrative domains includes a smart home domain, a music domain, a video domain, a flash briefing domain, a shopping domain, and/or a custom domain (e.g., skills not associated with any pre-configured domain).

The remote computing resources 2704, the third-party resources 2722, and/or devices may each host or otherwise execute instances of same or different skills. In some cases, a single skill—for example, a music skill—may have instances executing on more than one of the remote computing resources 2704, the third-party resources 2722, and/or devices. For example, the third-party resources 2722 may host a default instance of a skill while a device hosts personal instance of a skill. The personal instance of a skill may be a skill instance under development or test on a machine local to and/or operated by a skill developer. In another example, the remote computing resources 2704 may host a default instance of a skill while a device hosts a personal instance of the skill in the form of an app or application executing on the device.

Unless expressly stated otherwise, reference herein to a "skill" may include a skill 2716 operated by the remote computing resources 2704, the third-party resources 2722, and/or by a device. Moreover, the functionality described herein as a skill may be referred to using many different terms, such as an action, bot, app, application, or the like.

The remote computing resources 2704 may include a user recognition component 2718 that recognizes one or more users associated with data input to the remote computing resources 2704. The user recognition component 2718 may take as input the audio data 2702 and/or the text data. The user recognition component 2718 may perform user recognition by comparing speech characteristics in the audio data 2702 to stored speech characteristics of users. The user recognition component 2718 may additionally or alternatively perform user recognition by comparing biometric data (e.g., fingerprint data, iris data, etc.), received by the remote computing resources 2704 in correlation with a user input, to stored biometric data of users. The user recognition component 2718 may additionally or alternatively perform user recognition by comparing image data (e.g., including a representation of at least a feature of a user), received by the remote computing resources 2704 in correlation with a user input, with stored image data including representations of features of different users. The user recognition component 2718 may perform other or additional user recognition processes, including those known in the art. For a particular user input, the user recognition component 2718 may perform processing with respect to stored data of users associated with the electronic device 100 that captured the natural language user input.

The user recognition component 2718 determines whether a user input originated from a particular user. For example, the user recognition component 2718 may generate a first value representing a likelihood that a user input originated from a first user, a second value representing a likelihood that the user input originated from a second user, etc. The user recognition component 2718 may also determine an overall confidence regarding the accuracy of user recognition operations.

The user recognition component 2718 may output a single user identifier corresponding to the most likely user that originated the natural language user input. Alternatively, the user recognition component 2718 may output multiple user identifiers (e.g., in the form of an N-best list) with respective values representing likelihoods of respective users originating the natural language user input. The output of the user recognition component 2718 may be used to inform NLU processing, processing performed by a skill 2716, as well as processing performed by other components of the remote computing resources 2704 and/or other systems.

In some implementations, however, the user recognition component 2718 may be turned off, inactive, or otherwise not engaged to perform user recognition. In such cases, the natural language processing system may assign input audio data to a default account, or a user or group account associated with the electronic device 100 or otherwise determine a user/group account to which to assign incoming data.

The remote computing resources 2704 may include profile storage 2720. The profile storage 2720 may include a variety of information related to individual users, groups of users, devices, etc. that interact with the remote computing resources 2704. A "profile" refers to a set of data associated with a user, group of users, device, etc. The data of a profile may include preferences specific to the user, group of users, device, input and output capabilities of one or more devices, internet connectivity information, user bibliographic information, subscription information, as well as other information.

The profile storage 2720 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the remote computing resources 2704 with permission to allow the skill to execute with respect to the user's inputs. If a user does not enable a skill, the remote computing resources 2704 may not permit the skill to execute with respect to the user's inputs.

The profile storage 2720 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 2720 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household. In some implementations, the user recognition component 2718 may associate a particular electronic device 100 to a particular end user (or device) profile in the profile storage 2720.

The remote computing resources 2704 may include the orchestrator 2714 configured to receive the audio data 2702 (and optionally an account identifier corresponding to the electronic device 100) from the electronic device 100. The orchestrator 2714 may include memory and logic that enables the orchestrator 2714 to transmit various pieces and forms of data to various components of the remote computing resources 2704, the electronic device 100, computing devices, as well as perform other operations. For example, the orchestrator 2714 may send the audio data 2702 to the ASR component 2708 and the NLU component 2710. The orchestrator 2714 may receive text or symbolic data from the ASR component 2708 and forward them to the NLU component 2710. The orchestrator 2714 may receive the NLU results data from the NLU component 2710 and forward them to a skill 2716. The orchestrator 2714 may cause performance of one or more actions in response to the output data. In some examples, the orchestrator 2714 forwards the output data to the TTS component 2712 for generating a spoken-word response to the input audio data 2702. The orchestrator 2714 may receive output audio data from the TTS component 2712, and may transmit the output audio data back to the electronic device 100 for output to the user.

The TTS component 2712 may generate audio data (e.g., synthesized speech) from text data using one or more different methods. Text data input to the TTS component 2712 may come from a skill 2716, third-party resources 2722, the orchestrator 2714, or other components.

In some instances, synthesis called unit selection, the TTS component 2712 matches text data against a database of recorded speech. The TTS component 2712 selects matching units of recorded speech and concatenates the units together to form audio data. Additionally, or alternatively, synthesis called parametric synthesis, the TTS component 2712 varies parameters such as frequency, volume, and noise to generate audio data including an artificial speech waveform. Parametric synthesis uses a computerized voice generator, sometimes called a vocoder.

In some instances, the speech processing may be performed not only at the remote computing resources 2704 but also on the electronic device 100 (and/or other devices). Such on-device speech processing may occur separately from or in addition to speech processing performed on the remote computing resources 2704. In some instances, both the electronic device 100 and the remote computing resources 2704 may perform speech processing and the results of each processing may be evaluated to determine which speech processing results to use to actually execute a command. Such a combined system may be referred to as hybrid language processing (e.g., hybrid speech processing).

Figure 28:
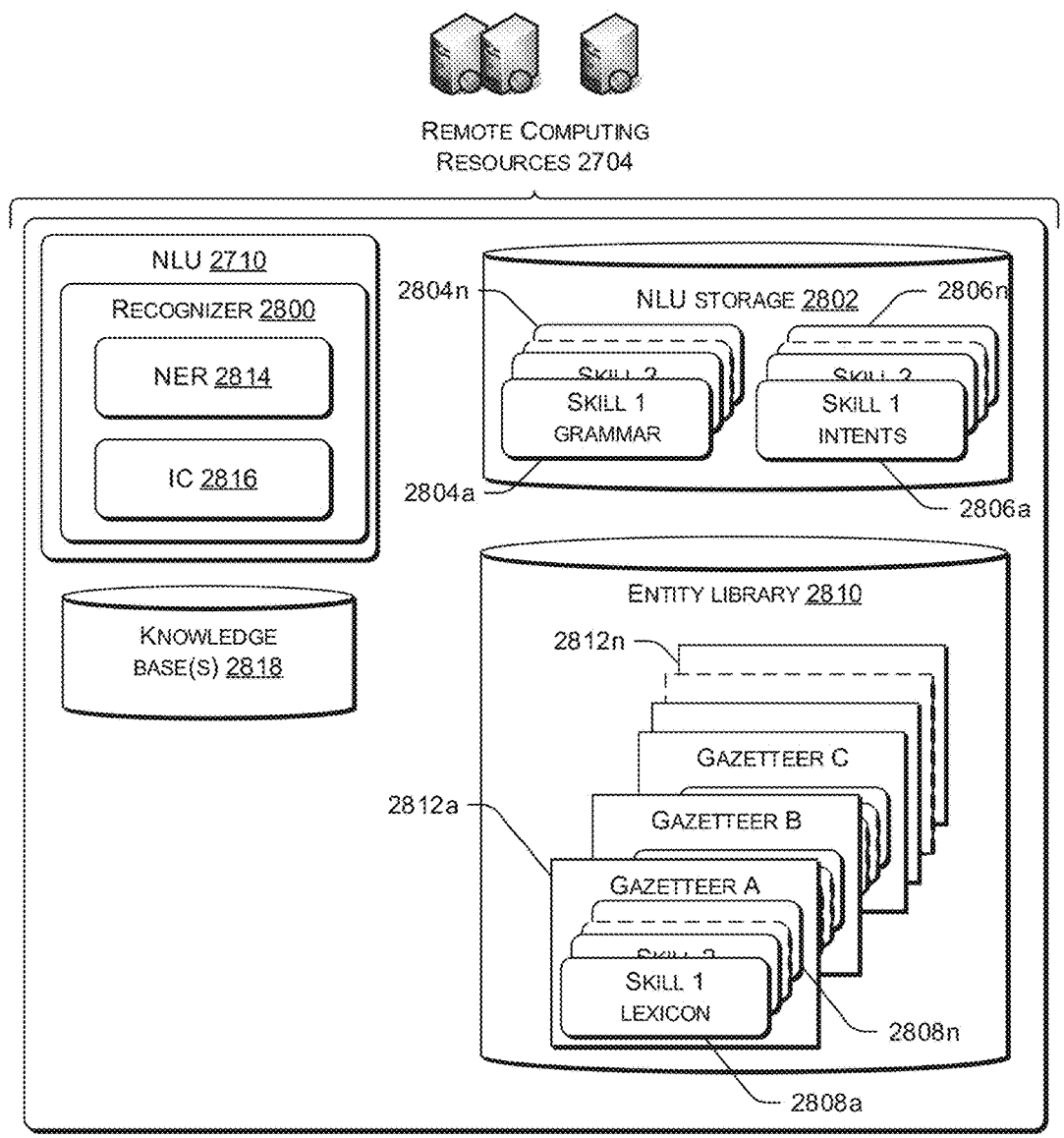
FIG. 28 illustrates a conceptual diagram for performing natural language processing, according to an embodiment of the present disclosure.

FIG. 28 is a conceptual diagram showing how natural language processing is performed by the NLU component 2710, according to embodiments of the present disclosure. The NLU component 2710 may include one or more recognizers 2800. In some instances, a recognizer 2800 may be associated with the third-party resources 2722 (e.g., the recognizer may be configured to interpret text data to correspond to the third-party resources 2722). Additionally, a recognizer 2800 may be associated with a domain (i.e., the recognizer may be configured to interpret text data to correspond to the domain). The recognizer 2800 may serve as a search provider interface to the skills and/or domains such as a music domain.

The recognizers 2800 may process text data in parallel, in series, partially in parallel, etc. For example, a recognizer corresponding to a first domain may process text data at least partially in parallel to a recognizer corresponding to a second domain. Additionally, a recognizer corresponding to a first skill may process text data at least partially in parallel to a recognizer corresponding to a second skill. Thus, the remote computing resources 2704 may distribute searches related to entity recognition and resolution across the recognizers 2800.

The NLU component 2710 may communicate with various storages. For example, the NLU component 2710 may communicate with an NLU storage 2802, which includes skill grammar models (2804a-2804n), representing how natural language inputs may be formulated to invoke skill intents (e.g., intents databases 2806-2806n) representing intents supported by respective third-party resources 2722.

Each recognizer 2800 may be associated with a particular grammar model 2804, a particular intents database 2806, and a particular personalized lexicon 2808 (stored in an entity library 2810). A gazetteer 2812 may include skill-indexed lexical information associated with a particular user. For example, Gazetteer A (2812a) may include skill-indexed lexical information 2808a to 2808n. A user's music skill lexical information might include album titles, artist names, and song names, for example, whereas a user's contact list skill lexical information might include the names of contacts. Since every user's music collection and contact list is presumably different, this personalized information may improve entity resolution.

Each recognizer 2800 may include a named entity recognition (NER) component 2814 that attempts to identify grammars and lexical information that may be used to construe meaning with respect to text data input therein. The NER component 2814 identifies portions of text data that correspond to a named entity that may be recognizable by the remote computing resource 2704. The NER component 2814 may also determine whether a word refers to an entity that is not explicitly mentioned in the text, for example "him," "her," "it" or other anaphora, exophora or the like.

The NER component 2814 applies grammar models 2804 and lexical information included in lexicons 2808 that are associated with one or more skills 2716 to determine a mention of one or more entities in text data input therein. In this manner, the NER component 2814 identifies "slots" (i.e., particular words in text data) that may be needed for later processing. The NER component 2814 may also label each slot with a type (e.g., noun, place, city, artist name, song name, etc.).

Each grammar model 2804 may include the names of entities (i.e., nouns) commonly found in speech about a particular skill 2716 to which the grammar model 2804 relates, whereas lexicon 2808 may include lexical information personalized to the user identifier output by the user recognition component 2718 (described herein with reference to FIG. 27) for the natural language input. For example, a grammar model 2804 associated with a shopping skill may include a database of words commonly used when people discuss shopping.

A downstream process called named entity resolution actually links a portion of text data (identified by the NER component 2814) to a specific entity known to the remote computing resources 2704. To perform named entity resolution, the NLU component 2710 may use gazetteer information (2812a-2812n) stored in the entity library storage 2810. The gazetteer information 2812 may be used to match text data (identified by the NER component 2814) with different entities, such as song titles, contact names, etc. Gazetteers may be linked to users (e.g., a particular gazetteer may be associated with a specific user's music collection), may be linked to certain skills 2716 (e.g., a shopping skill, a music skill, a video skill, a communications skill, etc.), or may be organized in another manner.

Each recognizer 2800 may also include an IC component 2816 that processes text data input thereto to determine an intent(s) of a skill 2716 that potentially corresponds to the natural language input represented in the text data. An intent corresponds to an action to be performed that is responsive to the natural language input represented by the text data. The IC component 2816 may communicate with the intents database 2806 that includes words linked to intents. For example, a music intent database may link words and phrases such as "quiet," "volume off," and "mute" to a <Mute> intent. The IC component 2816 identifies potential intents by comparing words and phrases in text data to the words and phrases in the intents database 2806 associated with the skill 2716 that is associated with the recognizer 2800 implementing the IC component 2816.

The intents identifiable by a specific IC component 2816 may be linked to one or more skill-specific grammar models 2804 (e.g., grammar frameworks) with "slots" to be filled. Each slot of a grammar model 2804 corresponds to a portion of text data that the NER component 2814 believes corresponds to an entity. For example, a grammar model 2804 corresponding to a <Play Music> intent may correspond to text data sentence structures such as "Play {Artist Name}," "Play {Album Name}," "Play {Song name}," "Play {Song name} by {Artist Name}," etc. However, to make resolution more flexible, grammar models 2804 may not be structured as sentences, but rather based on associating slots with grammatical tags.

For example, the NER component 2814 may identify words in text data as subject, object, verb, preposition, etc. based on grammar rules and/or models prior to recognizing named entities in the text data. The IC component 2816 (implemented by the same recognizer 2800) may use the identified verb to identify an intent. The NER component 2814 may then determine a grammar model 2804 associated with the identified intent. For example, a grammar model 2804 for an intent corresponding to <Play Music> may specify a list of slots applicable to play the identified "object" and any object modifier (e.g., a prepositional phrase), such as {Artist Name}, {Album Name}, {Song name}, etc. The NER component 2814 may then search corresponding fields in a lexicon 2808, attempting to match words and phrases in the text data the NER component 2814 previously tagged as a grammatical object or object modifier with those identified in the lexicon 2808.

The NER component 2814 may perform semantic tagging, which is the labeling of a word or combination of words according to their type/semantic meaning. The NER component 2814 may parse text data using heuristic grammar rules, or a model may be constructed using techniques such as hidden Markov models, maximum entropy models, log linear models, conditional random fields (CRF), and the like. For example, the NER component 2814, implemented by a music skill or music domain recognizer 2800, may parse and tag text data corresponding to "play mother's little helper by the rolling stones" as {Verb}: "Play," {Object}: "mother's little helper," {Object Preposition}: "by," and {Object Modifier}: "the rolling stones." The NER component 2814 may identify "Play" as a verb based on a word database associated with the music skill or music domain, which the IC component 2816 may determine corresponds to a <PlayMusic> intent. At this stage, no determination has been made as to the meaning of "mother's little helper" and "the rolling stones," but based on grammar rules and models, the NER component 2814 has determined that the text of these phrases relates to the grammatical object (i.e., entity).

The frameworks linked to the intent are then used to determine what database fields should be searched to determine the meaning of these phrases, such as searching a user's gazetteer 2812 for similarity with the framework slots. For example, a framework for a <Play Music> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 2812 does not resolve a slot/field using gazetteer information, the NER component 2814 may search a database of generic words (in a knowledge base 2818). For example, if the text data corresponds to "play songs by the rolling stones," after failing to determine an album name or song name called "songs" by "the rolling stones," the NER component 2814 may search a music skill vocabulary for the word "songs." In the alternative, generic words may be checked before the gazetteer information, or both may be tried, potentially producing two different results.

In some instances, the recognizer 2800 may tag text data to attribute meaning thereto. For example, the recognizer 2800 may tag "play mother's little helper by the rolling stones" as: {skill} Music, {intent} Play Music, {artist name} rolling stones, {media type} SONG, and {song title} mother's little helper. As an additional example, the recognizer 2800 may tag "play songs by the rolling stones" as: {skill} Music, {intent} Play Music, {artist name} rolling stones, and {media type} SONG.

As described above, more than one recognizer 2800 may process with respect to text data representing a single natural language input. In such examples, each recognizer 2800 may output at least one NLU hypothesis including an intent indicator (determined by the IC component 2816 of the recognizer 2800) and at least one tagged named entity (determined by the NER component 2814 of the recognizer 2800).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. An audiovisual electronic device comprising:
   a display sub-assembly including:
      a substantially rectangular display;
      a camera;
      one or more microphones arranged disposed on the display sub-assembly; and
      one or more buttons arranged proximal to the top of the display sub-assembly;
   a housing sub-assembly including:
      a substantially cylindrical housing;
      a subwoofer loudspeaker coupled to the substantially cylindrical housing and oriented to emit sound outward from a top of the substantially cylindrical housing;
      a first tweeter loudspeaker coupled to the substantially cylindrical housing and oriented to emit sound radially outward from a first side of the substantially cylindrical housing;
      a second tweeter loudspeaker coupled to the substantially cylindrical housing and oriented to emit sound radially outward from a second side of the substantially cylindrical housing;
      a substantially cylindrical base; and
      a motor disposed at least partly between the substantially cylindrical housing and the substantially cylindrical base, the motor being configured to provide rotational movement to the audiovisual electronic device; and
   a hinge that pivotably couples the display sub-assembly and the housing sub-assembly, the hinge being configured to provide tilt motion to the display sub-assembly.

2. The audiovisual electronic device of claim 1, wherein:
   the motor comprises:
      a rotational portion coupled to the substantially cylindrical housing;
      a stationary portion coupled to the substantially cylindrical base;
      a passageway extending though at least one of the rotational portion or the stationary portion; and
      one or more bearings disposed around the passageway; and
   one or more wires of the audiovisual electronic device route through the passageway to communicatively couple one or more first components residing within the substantially cylindrical housing and one or more second components residing within the substantially cylindrical base.

3. The audiovisual electronic device of claim 1, wherein:
   the one or more microphones comprise a first microphone, a second microphone, a third microphone, and a fourth microphone;
   the first microphone is disposed on a front surface of the display sub-assembly;

the second microphone is disposed on a top surface of the display sub-assembly;
the third microphone is disposed on the top surface of the display sub-assembly;
the fourth microphone is disposed on a rear surface of the display sub-assembly, the rear surface being opposite the front surface, and
the first microphone, the second microphone, the third microphone, and fourth microphone are disposed in a diamond-shaped pattern.

4. A device comprising:
a display including one or more microphones;
a housing including:
a first loudspeaker; and
a second loudspeaker;
a hinge coupling the display and the housing, the hinge being operable to provide the display with varying degrees of tilt;
a base; and
a motor including:
a rotational portion coupled to the housing;
a stationary portion coupled to the base, wherein the housing and the display are configured to rotate based on actuation of the motor and the base is configured to remain stationary; and
an opening that extends through at least a portion of the rotational portion or the stationary portion.

5. The device of claim 4, wherein the first loudspeaker is oriented to emit sound outward from the device in a first direction, the second loudspeaker is oriented to emit sound outward from the device in a second direction that is different than the first direction, the device further comprising:
a third loudspeaker oriented to emit sound outward from the device in a third direction that is different than the second direction and the first direction.

6. The device of claim 4, further comprising one or more wires that communicatively couple one or more first computing components residing within the housing and one or more second computing components residing within the base and wherein the one or more wires traverse the opening.

7. The device of claim 6, further comprising:
one or more bearings disposed around the opening; and
springs disposed between the one or more bearings and at least one or more surfaces of the rotational portion or the stationary portion.

8. The device of claim 4, wherein the one or more microphones comprise:
a first microphone disposed on a front surface of the display;
a second microphone disposed on a top surface of the display;
a third microphone disposed on the top surface of the display; and
a fourth microphone disposed on a rear surface of the display, the rear surface being opposite the front surface.

9. The device of claim 4, wherein the hinge comprises:
a bracket coupled to the display;
a frame coupled to the housing;
one or more pins coupling the bracket and the frame; and
one or more biasing members disposed around the pins, the one or more biasing members providing a torsional resistance to the hinge allowing the hinge to rest at various positions along its range of motion.

10. The device of claim 4, further comprising:
at least one camera;
at least one microphone;
one or more processors; and
one or more non-transitory computer-readable media storing computer-executable instructions that, when executed by the one or more processors, cause the one or more processors to perform acts comprising:
receiving at least one of:
image data from the at least one camera representing a user within an environment; or
audio data from the at least one microphone representing speech input from the user;
determining, based at least in part on the image data or the audio data, a location of the user with respect to the device; and
causing the motor to rotate the housing and the display in a direction towards the location.

11. The device of claim 4, further comprising:
a midframe coupled to the display, the midframe including a first attachment mechanism; and
a rear cover including a second attachment mechanism configured to engage the first attachment mechanism to couple the rear cover to the midframe, the rear cover including a slot through which at least a portion of the hinge extends.

12. The device of claim 11, wherein at least one of the midframe or the rear cover includes one or more biasing members configured to apply a force to the rear cover to maintain engagement between the first attachment mechanism and the second attachment mechanism.

13. The device of claim 4, wherein at least one of:
the hinge provides the display with at least 40 degrees of vertical tilt; and
the motor provides the display with at least 300 degrees of rotational movement.

14. An audiovisual device comprising:
a first sub-assembly including a display;
a second sub-assembly including:
one or more loudspeakers; and
a motor configured to rotate the first sub-assembly and at least a portion of the second sub-assembly, the motor including an opening through which one or more wires traverse; and
a hinge operably coupling the first sub-assembly and the second sub-assembly.

15. The audiovisual device of claim 14, wherein the one or more loudspeakers comprise:
a first loudspeaker oriented in a first direction;
a second loudspeaker oriented in a second direction that is different than the first direction; and
a third loudspeaker oriented in a third direction that is different than the second direction and the first direction.

16. The audiovisual device of claim 15, wherein:
the second sub-assembly further includes a housing having a front and a back;
the hinge couples to the front of the housing;
the first loudspeaker is offset from a central longitudinal axis of the housing towards the back of the housing; and
at least one of:
the second loudspeaker and the third loudspeaker are oriented outward from the central longitudinal axis; or
the second loudspeaker and the third loudspeaker are oriented downward from a top of the housing.

17. The audiovisual device of claim 14, wherein:
the second sub-assembly further includes a housing and a base, the hinge coupling to the housing; and
the motor comprises a rotating portion and a stationary portion, the rotating portion coupling to the housing and being configured to rotate based on actuation of the motor, the stationary portion coupling to the base and being configured to remain stationary.

18. The audiovisual device of claim 14, further comprising:
a first microphone disposed on a front surface of the audiovisual device;
a second microphone disposed on a top surface of the audiovisual device;
a third microphone disposed on the top surface of the audiovisual device; and
a fourth microphone disposed on a rear surface of the audiovisual device, the rear surface being opposite the front surface.

19. The audiovisual device of claim 14, wherein:
the hinge is moveable to dispose the display over a range of viewing angles; and
at least one of fibers, wires, or a flex circuit routes through at least a portion of the hinge.

20. The audiovisual device of claim 14, further comprising:
at optical index; and
an optical sensor configured to image the optical index to determine a rotational position of the motor.

\* \* \* \* \*